US012314897B2

(12) United States Patent
Robertson et al.

(10) Patent No.: US 12,314,897 B2
(45) Date of Patent: May 27, 2025

(54) APPARATUS AND METHOD FOR HIGH THROUGHPUT MEASUREMENT OF LODGING RESISTANCE IN CROPS

(71) Applicant: University of Idaho, Moscow, ID (US)

(72) Inventors: Daniel J. Robertson, Moscow, ID (US); Austin R. Bebee, Moscow, ID (US); George Clayton Bennett, Moscow, ID (US); Christopher J. Stubbs, Moscow, ID (US)

(73) Assignee: University of Idaho, Moscow, ID (US)

( * ) Notice: Subject to any disclaimer, the term of this patent is extended or adjusted under 35 U.S.C. 154(b) by 890 days.

(21) Appl. No.: 17/465,623

(22) Filed: Sep. 2, 2021

(65) Prior Publication Data

US 2022/0076197 A1      Mar. 10, 2022

Related U.S. Application Data

(60) Provisional application No. 63/076,716, filed on Sep. 10, 2020.

(51) Int. Cl.
*G06Q 10/087*    (2023.01)
*G01L 1/26*      (2006.01)
(Continued)

(52) U.S. Cl.
CPC .............. *G06Q 10/087* (2013.01); *G01L 1/26* (2013.01); *G06Q 50/02* (2013.01); *G06V 20/188* (2022.01)

(58) Field of Classification Search
CPC .... G06Q 10/087; G06Q 50/02; G06V 20/188; G01L 1/26
See application file for complete search history.

(56) References Cited

U.S. PATENT DOCUMENTS 6,041,582 A  *  3/2000  Tiede ................... A01B 79/005
                                            56/10.2 A
7,412,880 B2 *  8/2008  Barreiro ................... A01G 7/06
                                            73/170.15
(Continued)

OTHER PUBLICATIONS

Berry, P. M., J. Spink, M. Sterling, and A. A. Pickett. 2003. "Methods for Rapidly Measuring the Lodging Resistance of Wheat Cultivars," *Journal of Agronomy and Crop Science*, 189(6): 390-401. https://doi.org/10.1046/j.0931-2250.2003.00062.x.
(Continued)

*Primary Examiner* — Octavia Hollington
(74) *Attorney, Agent, or Firm* — Klarquist Sparkman, LLP

(57) ABSTRACT

An apparatus and embodiments of a method for using the apparatus to evaluate crop lodging resistance are disclosed. An exemplary apparatus includes a body having a height adjustable force bar coupled thereto and a force sensor configured to detect forces acting on the force bar. Further, the apparatus includes or is configured to be coupled to a movement mechanism that enables movement of the force bar through a plot of stems. The force sensor generates force signals that can be utilized to generate force data. The force data, along with stem density data, stem height data, force bar height data, can be input into one or more models to generate flexural stiffness data. The one or more models can include an Interacting Model and/or a Non-Interacting Model.

21 Claims, 40 Drawing Sheets
(30 of 40 Drawing Sheet(s) Filed in Color)

(51) Int. Cl.
G06Q 50/02 (2024.01)
G06V 20/10 (2022.01)

(56) References Cited

U.S. PATENT DOCUMENTS

2022/0117158 A1* 4/2022 Lamprecht ............. A01B 79/02
2024/0385163 A1* 11/2024 Steele ................ G01N 33/0098

OTHER PUBLICATIONS

Cook, Douglas D., Witold de la Chapelle, Ting-Che Lin, Shien Yang Lee, Wenhuan Sun, and Daniel J. Robertson. 2019. "DARLING: A Device for Assessing Resistance to Lodging in Grain Crops," *Plant Methods*, 15(102), 8 pages.

Erndwein, Lindsay, Douglas D. Cook, Daniel J. Robertson, and Erin E. Sparks. 2020. "Field-Based Mechanical Phenotyping of Cereal Crops to Assess Lodging Resistance," *Applications in Plant Sciences*, 8(8), 11 pages.

Feng, Suwei, Dechuan Kong, Weihua Ding, Zhengang Ru, Gan Li, and Liyuan Niu. 2019. "A Novel Wheat Lodging Resistance Evaluation Method and Device Based on the Thrust Force of the Stalks," *PLOS One*, 14(11): e0224732 https://doi.org/10.1371/journal.pone.0224732, 23 pages.

Guo, Qingqian, Ruipeng Chen, Xiaoquan Sun, Min Jiang, Haifeng Sun, Shun Wang, Liuzheng Ma, Yatao Yang, and Jiandong Hu. 2018. "A Non-Destructive and Direction-Insensitive Method Using a Strain Sensor and Two Single Axis Angle Sensors for Evaluating Corn Stalk Lodging Resistance," *Sensors*, 18(1852), 11 pages.

Heuschele, D. Jo, Jochum Wiersma, Leonard Reynolds, Amy Mangin, Yvonne Lawley, and Peter Marchetto. 2019. "The Stalker: An Open Source Force Meter for Rapid Stalk Strength Phenotyping," *HardwareX*, e00067, 9 pages.

Robertson, Daniel, Simeon Smith, Brian Gardunia, and Douglas Cook. 2014. "An Improved Method for Accurate Phenotyping of Corn Stalk Strength," *Crop Science*, 54(5): 2038. https://doi.org/10.2135/cropsci2013.11.0794, 7 pages.

Robertson, Daniel J., Margaret Julias, Brian W. Gardunia, Ty Barten, and Douglas D. Cook. 2015. "Corn Stalk Lodging: A Forensic Engineering Approach Provides Insights into Failure Patterns and Mechanisms," *Crop Science*, 55(6): 2833-2841. https://doi.org/10.2135/cropsci2015.01.0010.

Robertson, Daniel J., Shien Yang Lee, Margaret Julias, and Douglas D. Cook. 2016. "Maize Stalk Lodging: Flexural Stiffness Predicts Strength," *Crop Science*, 56(4): 1711-1718. https://doi.org/10.2135/cropsci2015.11.0665.

Robertson, Daniel J., Margaret Julias, Shien Yang Lee, and Douglas D. Cook. 2017. "Maize Stalk Lodging: Morphological Determinants of Stalk Strength," *Crop Science*, 57(2): 926-934. https://doi.org/10.2135/cropsci2016.07.0569.

Shah, D. U., T. P. S. Reynolds, and M. H. Ramage. "The Strength of Plants: Theory and Experimental Methods to Measure the Mechanical Properties of Stems," 2016. *Journal of Experimental Botany*, 68(16): 4497-4516. https://doi.org/10.1093/jxb/erx245.

Thompson, D. L. 1963. "Stalk Strength of Corn as Measured by Crushing Strength and Rind Thickness," *Crop Science*, 3(4): 323-29. https://doi.org/10.2135/cropsci1963.0011183X000300040013x.

Zuber, M. S., and C. O. Grogan. 1961. "A New Technique for Measuring Stalk Strength in Corn," *Crop Science*, 1(5): 378-80. https://doi.org/10.2135/cropsci1961.0011183X000100050028x.

* cited by examiner

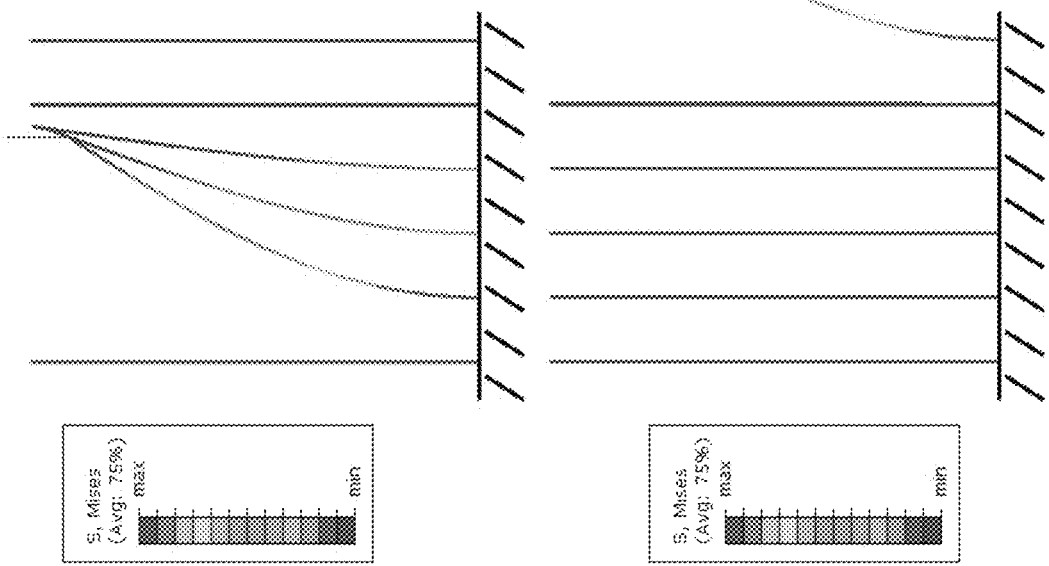
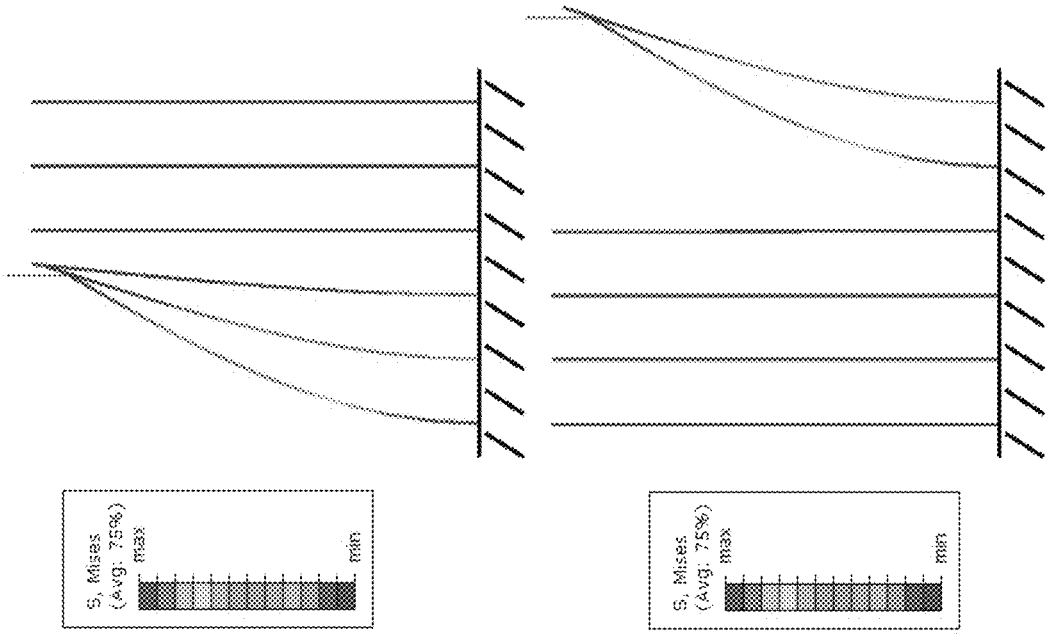
FIG. 8A  FIG. 8B  FIG. 8C  FIG. 8D

APPARATUS AND METHOD FOR HIGH THROUGHPUT MEASUREMENT OF LODGING RESISTANCE IN CROPS

CROSS REFERENCE TO RELATED APPLICATION

The present application claims the benefit under 35 U.S.C. § 119(e) of the earlier filing date of U.S. provisional application No. 63/076,716, filed on Sep. 10, 2020, which is incorporated herein by reference in its entirety.

ACKNOWLEDGMENT OF GOVERNMENT SUPPORT

This invention was made with government support under EPSCOR Award No. 1826715 awarded by National Science Foundation. The government has certain rights in the invention.

FIELD

The present relates to embodiments of an apparatus and method for its use for assessing plant lodging resistance, such as, for example, via high throughput measurement of estimated flexural stiffness.

BACKGROUND

Many crops, particularly cereal or grains, provide humanity with the most popular food staples, food sweeteners, livestock feed, and fuel (e.g., producing ethanol from maize). Maize (i.e., corn), wheat, and rice collectively provide over half of the world's caloric intake. The demand for biofuel from grains (primarily maize and some wheat) continues to increase.

A phenomenon known as lodging has a significant effect on crop production and efficiency. Lodging refers to the mechanical failure of crops prior to harvest, which decreases crop yield and grain quality. Farmers and plant breeders around the world report lodging resistance as one of their greatest concerns, as it has a tremendous economic impact. Lodging results in an estimated 5-20% annual yield loss of maize globally. In the United States, lodging in maize alone is estimated to cause losses of $3.8 billion dollars each year. Wheat lodging in the United Kingdom typically results in estimated losses of $64 million per year. During more severe wheat lodging years (every three to four years in the UK), 15-20% of the planted area is affected, leading to losses of approximately $218 million. Reduced yield consequently increases the costs of food, consumer goods, fuel, and other agricultural products.

Lodging can be further classified into either root lodging or stalk lodging, which can each have different failure mechanics. Root lodging describes the failure of the root anchorage system, while stalk lodging describes the stem buckling. In root lodging, the soil, anchorage roots, or a combination thereof fail, resulting in stem displacement. Stalk lodging occurs when bending moments along the stem exceed the bending strength of the stem, leading to stem failure, often in the form of buckling. The bending moment is usually produced from a combination of self-loading, wind, or rain.

FIG. 1 illustrates the free body diagram of a deflected stem, in which loads are depicted at the grain head and the stem's center of gravity. The weight loads from both the stem and grain head represent self-loading. Notice that as deflection increases, the moments at the plant's base will increase due to both weight loads.

Due to different stem structures and characteristics among different types of crops, the location of stem failure varies. Cereals generally consist of long, hollow internodes linked together by solid nodes. In small grains, buckling is typically observed near the lower internodes, whereas for maize, failure is often close to a node with the type of failure (e.g., buckling, snapping, creasing, tissue failure) depending on the stage of development. Regardless of the specifics, if stalk lodging occurs, the plant may not recover.

Globally, crop lodging, the structural failure of crops due to external (e.g., rain, wind) and internal loading (e.g., grain weight), has significant, negative impacts on crop quality and supply. To reduce crop lodging, crops with high lodging resistance must be developed through selective breeding. However, numerous confounding factors make it difficult to evaluate lodging resistance accurately and efficiently.

SUMMARY

The present apparatus and method for its use allow rapid evaluation of plant lodging, thereby allowing high lodging resistance to be developed by selective breeding. Certain disclosed apparatus embodiments are configured to evaluate crop lodging resistance and typically comprise a body having at least one force bar associated therewith. The force bar may be coupled to the body via a height adjustment mechanism to enable adjustment of the force bar height relative to a ground surface. The force bar is configured to be moved through and contacted by plants in a row, such as a plot of stems. At least one force sensor is coupled to the force bar and is configured to detect a force acting on the force bar. Disclosed embodiments also typically include a processor in communication with the force sensor to receive force signals therefrom that are indicative of forces acting on the force bar. Force signals data is used to calculate and/or analyze flexural stiffness of the plot of stems.

The apparatus may further comprise a displacement sensor in communication with the processor apparatus that detects a distance the apparatus travels while detecting force. The apparatus also may comprise a movement mechanism in communication with the displacement sensor to allow the force bar to be moved through plants, such as a plot of stems. The movement mechanism can be a manually operated movement mechanism, such as a wheeled mechanism that is manually moved through the plot of stems. For example, for a manually operated movement mechanism the apparatus body may comprise a frame and one or more wheels, where the frame comprises a laterally disposed elongate member and a upwardly projecting elongate member. The one or more wheels comprise a first wheel rotatably attached to a first end of the laterally disposed elongate member and a second wheel rotatably attached to a second end of the laterally disposed elongate member. The apparatus may further comprise at least a third wheel to facilitate movement of the apparatus. A force bar may be coupled to the laterally disposed elongate member and disposed in a parallel orientation relative to the laterally disposed elongate member. The upwardly projecting elongate member also may advantageously include a hand grip disposed at a top end thereof to enable a user to drive movement of the force bar through plants, such as a plot of stems. Alternatively, the movement mechanism may comprise an automated movement mechanism configured to move the force bar through plants, such as a plot of stems. As yet another alternative, the apparatus can be associated with a vehicle for movement relative to plants, such as a combine, with the displacement sensor being configured to detect vehicle movement.

Disclosed embodiments may further comprise one or more additional sensors in communication with the processor apparatus, such as, for example: one or more height sensors associated with the force bar and configured to detect and/or set the height of the force bar relative to the ground surface; a camera; an optical sensor; a LiDAR sensor; a photogate sensor; an ultrasonic sensor; a temperature sensor; a humidity sensor; a gyroscope; an accelerometer; a GPS sensor; and any and all combinations thereof. For certain embodiments the one or more additional sensors comprise at least one of the camera, the optical sensor, the LiDAR sensor, or the photogate sensor, to allow the device to detect an estimated stem height for a plot of stems. Moreover, where the one or more additional sensors comprise at least one of the camera, the optical sensor, the LiDAR sensor, or the photogate sensor, the device can detect an estimated stem density for the plot of stems. Data related to estimated stem height and/or density may be used to estimate plant or stem flexural stiffness.

The apparatus may further comprise a data communication interface in communication with the processor apparatus. The processor apparatus may comprise non-transitory memory having a plurality of stored computer-executable instructions configured to, when executed, cause the processor apparatus to: process force signals to generate data related to the force signals; and cause transmission, via the data communication interface, data related to the force signals to a computerized user device configured to calculate an estimation of flexural stiffness of the plot of stems. The processor apparatus also may comprise non-transitory memory having a plurality of stored computer-executable instructions to, when executed, cause the processor apparatus to: process the force signals to generate data related to the force signals; identify data related to one or more parameters, such as data to estimate stem density of the plot of stems, data related to estimate average stem length of the plot of stems, and/or data related to force bar height while collecting force signals; and/or inputting data related to the force signals and data related to the one or more parameters into one more data models to calculate an estimation of flexural stiffness of the plot of stems. The data models may comprise a non-interacting model and an interacting model. Estimating flexural stiffness of the plot of stems may include averaging flexural stiffness data from the non-interacting model with flexural stiffness data from the interacting model. The plurality of computer-executable instructions may be further configured to, when executed, cause the processor apparatus to calculate a plurality of flexural stiffness values. Each of a plurality of flexural stiffness values may be associated with a displacement value related to a position of the apparatus within the plot of stems.

An additional disclosed embodiment concerns a computerized apparatus configured to evaluate crop lodging resistance. The device comprises at least one force bar and at least one force bar sensor. The force bar can be moved through plants, such as a plot of stems, to detect forces acting on the force bar and to generate a corresponding force signal. The computerized apparatus may also comprise one or more processors comprising non-transitory memory having a plurality of stored computer-executable instructions. Stored computer-executable instructions may cause the computerized apparatus to: generate data related to the force signals; identify data for an estimated stem density of a plot of stems; identify data for an estimated average stem length of the plot of stems; obtain data related to the force bar height while collecting force signals; and input the data related to the force signals and the data related to the one or more parameters into one more data models to calculate an estimation of plant or stem flexural stiffness. The data model may comprise an interacting model and a non-interacting model. For such embodiments, estimating plot stems flexural stiffness may comprise averaging flexural stiffness data from a non-interacting model with flexural stiffness data from the interacting model. The apparatus may further include a plurality of computer-executable instructions further configured to, when executed by the processor apparatus, cause the computerized apparatus to calculate a plurality of flexural stiffness values. Each of the plurality of flexural stiffness values may be associated with a displacement value related to a position of the device within the plot of stems.

Yet another embodiment of the apparatus comprises a body; a force bar coupled to the body via a height adjustment mechanism, wherein the height adjustment mechanism enables force bar height adjustment relative to a ground surface; a force sensor coupled to the force bar and configured to detect an amount of force acting on the force bar; a movement mechanism configured to move the force bar through plants, such as a plot of stems; a displacement sensor in communication with the processor apparatus to detect displacement of the apparatus; and one or more processor apparatuses in communication with each of the force sensor and the displacement sensor to receive force signals from the force sensor and displacement signals from the displacement sensor.

The present disclosure also contemplates a method for using disclosed apparatus embodiments to evaluate crop lodging resistance.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 8A-8D are schematic illustrations of exemplary inline cantilever beams, which can be used to model crop interactions, according to the present disclosure.

DETAILED DESCRIPTION

I. Terms

Figure 1:
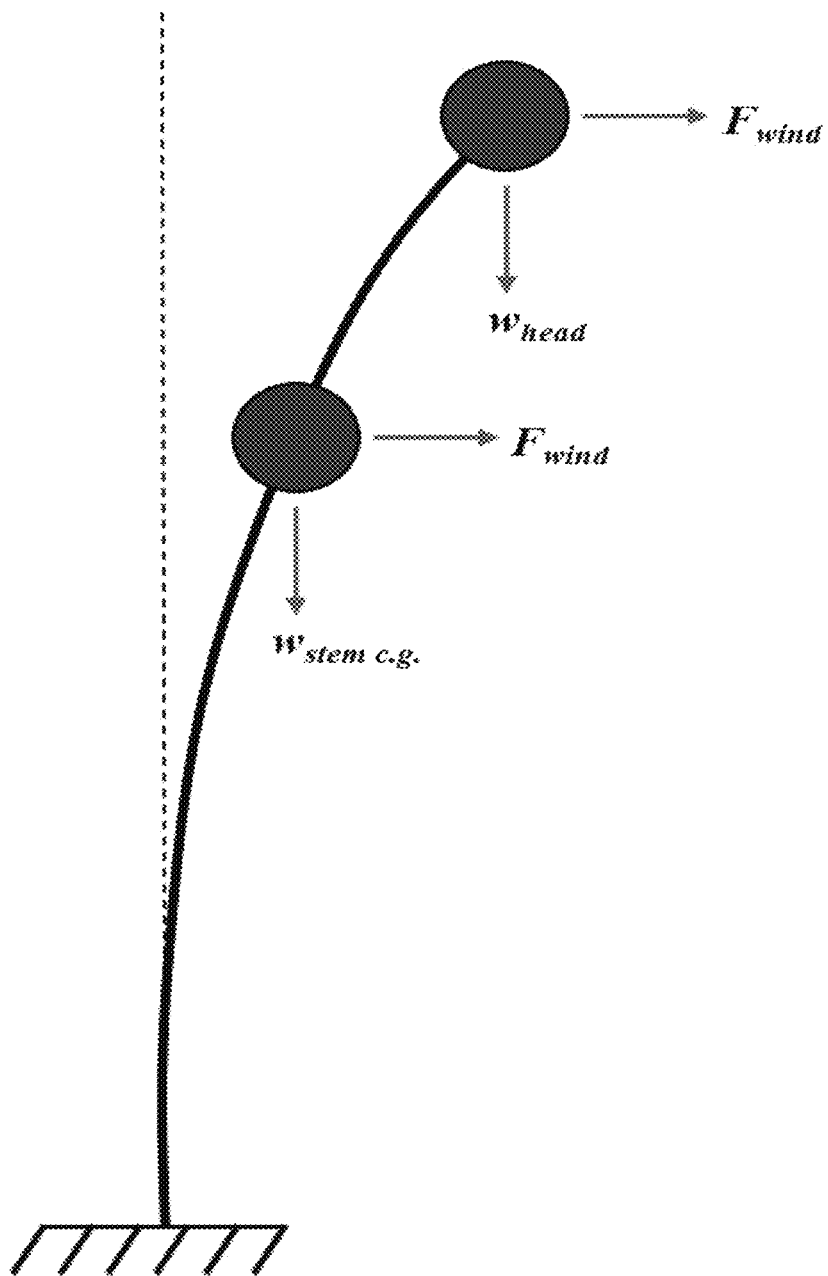
FIG. 1 is a schematic illustration of an exemplary model of a plant and natural forces acting thereon.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used to practice or test the present disclosure, suitable methods and materials are described below. The materials, methods, and examples are illustrative only and are not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions or methods as apparent to those of ordinary skill in the art. When directly and explicitly distinguishing embodiments from discussed prior art, the embodiment numbers are not approximates unless the word "about" is expressly recited.

II. Overview

As discussed above, one method to reduce stalk lodging is to phenotype plants for stalk strength and then breed selected plants for lodging resistant plants. Stalk strength must be made a priority in such breeding programs. Plants must possess a structure capable of enduring the internal and external forces (e.g., wind, rain, hail) that act upon them while meeting the plant's metabolic needs. Great strides have already been made to combat crop lodging. For example, the introduction of semi-dwarfing varieties has increased the mechanical stability of several cereals. Not only did shorter stems increase stability and reduce lodging, but more nutrients were also delivered to the heads, increasing crop yield as a result. However, despite these advances, lodging is still a major recurring problem. New, alternative adaptations for breeding lodging resistant crops are required, especially as grain yield and weight increase. Unfortunately, this is no simple task due to the unique hierarchical, non-prismatic, nonlinear, and anisotropic structure of plants. Properly and rapidly evaluating stalk strength is necessary to enable more efficient and effective breeding processes. However, existing methods are unreliable or have limited throughput.

Specifically, many conventional lodging assessments are conducted manually, such as lodging counts and/or laboratory analyses (e.g., crushing tests, rind penetration resistance, and bending tests). Additionally, several field devices have been developed to assess lodging resistance. Many field devices estimate stalk bending strength or flexural stiffness. So far, existing devices were designed solely for either large grains (e.g., maize or sorghum) or small grains (e.g., wheat, rice, or barley). Devices for large grains test single stems, but with small grains, a single stem typically does not provide enough resistance for reliable measurements. Therefore, devices for small grains test multiple stems at a time.

Exemplary existing lodging resistance assessment devices are shown in FIGS. 2A-2D. A first exemplary device shown in FIG. 2A measures resistance forces as it pulls maize stalks to specific angles. To operate the first device shown in FIG. 2A, a component is attached to the stalk at a defined height to record its angle as the user pulls the component and stalk via a connected belt. As the stalk is pulled to discrete angles, a strain sensor attached to the belt measures the pull force. The maximum equivalent force perpendicular to the stalk is determined and used to evaluate lodging resistance, which has been shown to be correlated to stalk lodging resistance in maize.

Figure 2A:
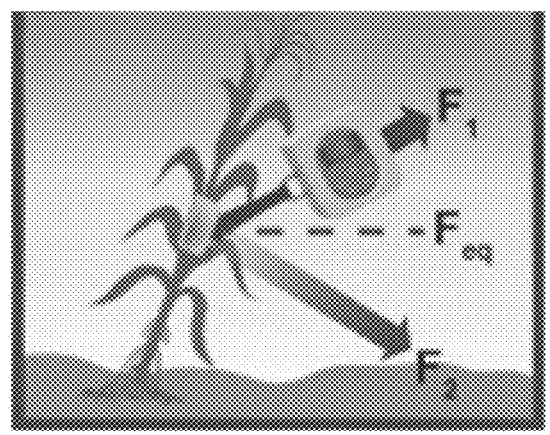
FIGS. 2A-2D are illustrations of exemplary known crop lodging resistance measurement devices.
Figure 2B:
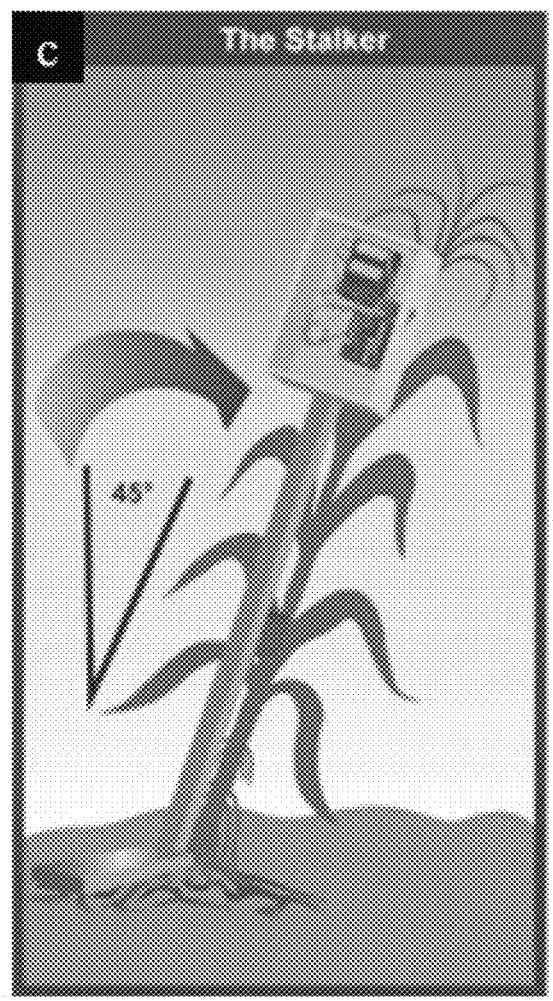
Figure 2C:
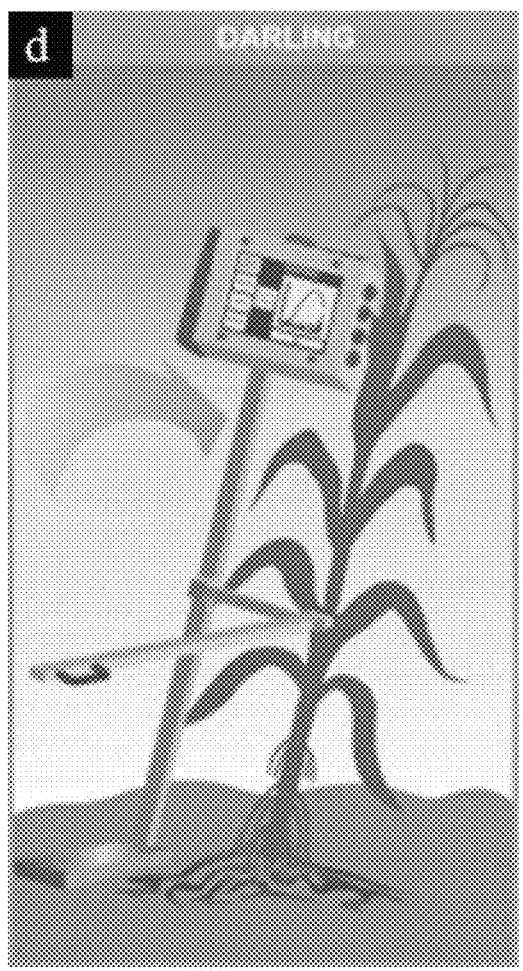

A second exemplary device shown in FIG. 2B and a third exemplary device shown in FIG. 2C are each configured to test large grains. As depicted in FIGS. 2B and 2C, both devices feature a ground footplate attached to a hinge that allows a vertical bar with a control box and a height-adjustable load cell to rotate. To operate each device, the user positions the load cell on the stalk and places a foot on the footplate to stabilize the device. The user then pushes the vertical bar forward until an LED indicator shows 45°. The maximum force during the test is quantified as the lodging resistance. The device of FIG. 2C provides two methods of operation: the stalk can be bent until failure to determine its bending strength; and/or the flexural stiffness can be determined by bending within the linear-elastic range.

Figure 2D:
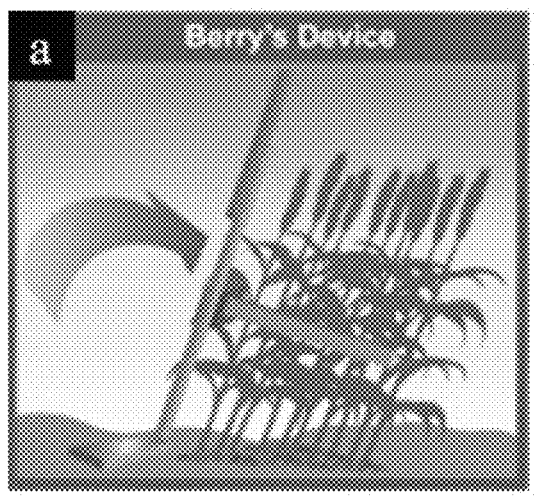

A fourth exemplary device, configured to test small grains, measures the force required to displace an isolated row of crops to discrete angles, as illustrated in FIG. 2D. The device is comprised of a vertical bar with a load cell that is adjusted so it is at half the height of the plants. The resistance force of the plants is then measured at discrete angles, which is used to assess the lodging resistance. Although it was originally developed for wheat, this device has also been modified to examine maize. Compared to existing methods or devices, testing is considered efficient as it takes about six minutes to perform tests on each plot. However, due to a number of factors, including the weight of the battery pack and electronics, the device of FIG. 2D has seen limited use among plant breeders.

Further, the known devices of FIGS. 2A-2D fail to account for the number of stems that are in contact with the device during testing. Without accounting for the number of stems, comparisons between tests can be misinterpreted and/or fail to properly evaluate or rank the lodging resistance of hybrids. While difficult to determine, the degree to which the stems interact with one another was also not accounted for. The level of interaction can influence the system mechanics and therefore affect force measurements.

Thus, there is a salient need for a rapid, economical method to assess stem lodging, which can account for different features of various crops, such as stem density, stem height, and/or interaction between adjacent stems.

The devices and methods for assessing lodging resistance described herein address the foregoing issues of existing methods and devices. For example, certain disclosed embodiments enable high throughput measurements and rapid data collection that account for natural features and interactions within a crop system.

A disclosed Stiffness of Crops Extrapolation Machine (SOCEM) can be configured to move through a plot of stems and collect data which can be utilized to estimate flexural rigidity (stiffness) for evaluating lodging resistance. The focal measurement obtained from the SOCEM test data may be an estimation of the average stem flexural rigidity or EI, where E is Young's modulus and I is the cross-sectional moment of inertia. Flexural rigidity can be measured to assess lodging resistance for at least two reasons. First, stem flexural rigidity may be highly correlated to stem strength and buckling. Thus, its measurement can be a reliable assessment of lodging resistance. Second, compared to bending strength measurements, flexural rigidity measurements are less destructive and the testing method for multiple plants is easier for a user to perform than conventional lodging resistance testing. Further, as an entire plot may be tested, the number of stems and interactions among neighboring stems can be modeled and accounted for when determining flexural rigidity of crops.

III. Exemplary Embodiments of a Disclosed Apparatus

Figure 3A:
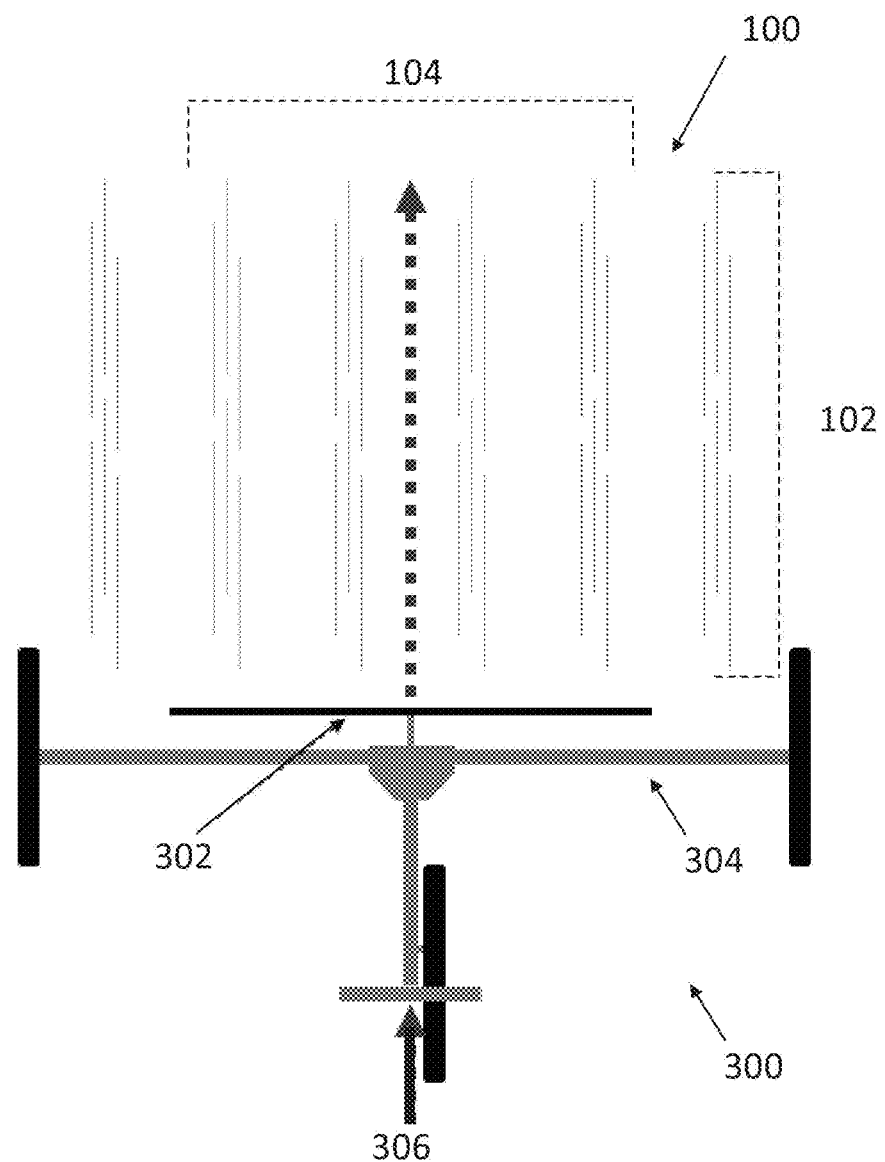
FIGS. 3A-3B are a schematic illustration and a logical block diagram of an exemplary crop lodging resistance measurement apparatus, according to the present disclosure.
Figure 3B:
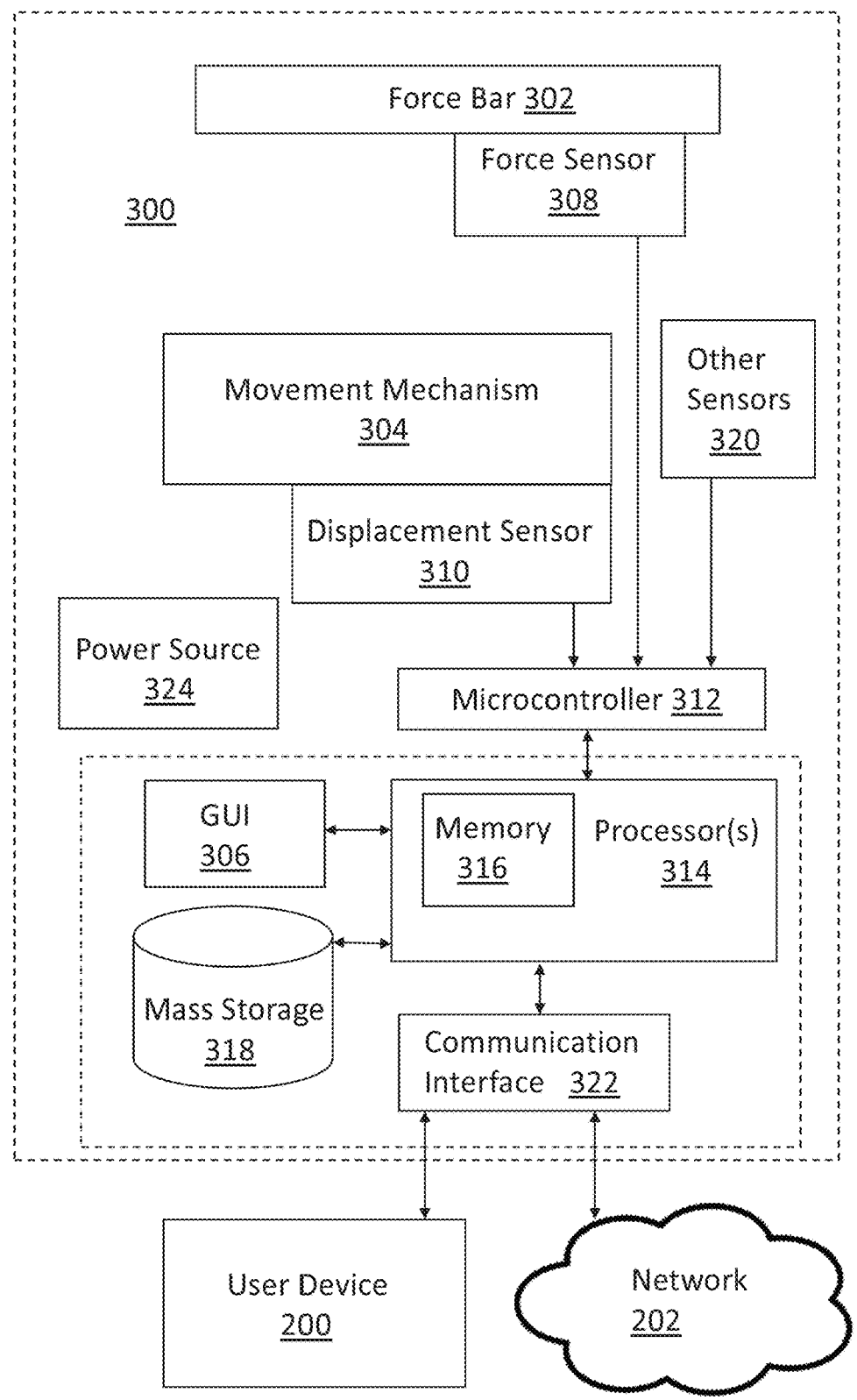

An exemplary embodiment of a lodging resistance assessment device, a stiffness of crops extrapolation machine (SOCEM) 300, is schematically illustrated in FIGS. 3A and 3B. As can be seen in FIG. 3A, the SOCEM 300 includes a force bar 302 attached to a body or movement mechanism 304 that is configured for moving the force bar over or through a field 100 including a plot of stems 102. The SOCEM 300 may be moved through the plot of stems 102 along contact rows 104. The user can position the SOCEM in front of the testing plot, and input parameters into and/or read data from a graphical user interface (GUI) 306. After zeroing or calibrating a force sensor in communication with the force bar 302, the user then moves the SOCEM 300 through the plot 102 to collect data on lodging resistance from a relatively large sample of stems in a short period of time. The SOCEM 300 can be manually operated, can be automated, or can be associated with (e.g. attached to or incorporated within) other farming equipment, such as a combine harvester or other harvesting apparatus.

The SOCEM 300 displaces stems and records force and position/displacement data as it moves through a harvested plot of stems (i.e., stubble). The force-position data can be paired with measurements of the average crop height and the average spacing between stems (such as, e.g., averages obtained from plant manual measurements or detected by a camera or other sensor separate from or in association with disclosed embodiments). From the analysis, estimations of the average flexural stiffness of the plot can be calculated to evaluate stalk lodging resistance.

FIG. 3B shows a logical block diagram of exemplary components of the SOCEM 300, as well as other elements with which the SOCEM 300 can communicate. As can be seen from FIG. 3B, force bar 302 communicates with and/or is functionally coupled to a force sensor 308 configured to detect or measure a degree of force exerted on the force bar 302 by crop stems within a plot as the SOCEM 300 is moved therethrough. For certain implementations, the force sensor can be a 50-lb, S-beam load cell with overload protection (such as, for example, load cell model FSH01020, FUTEK Advanced Sensor Technologies, Inc., Irvine, CA). A person of ordinary skill in the art will appreciate that the load cell can be connected to the force bar by a bolt or other securing or coupling mechanism so that the force acting on the force bar is transferred to the load cell and measured. In alternate implementations, the force sensor could be fixed to the load cell with an adhesive material, such as an epoxy. Alternatively, a force sensor could be placed at each end of the force bar. This arrangement could be particularly beneficial if the force bar is especially long, such as a force bar associated with a combine. For certain disclosed embodiments, the force sensor was a single axis sensor useful for measure applied forces in only a single orientation, such as horizontal forces; however, the force sensor or sensors also could be a multi-axis force sensor(s) to measure both horizontal and vertical forces. As yet another embodiment, combinations of force sensors could be used, with one or more force sensors measuring applied forces in only a single orientation and one or more force sensors being multi-axis force sensor(s) to measure both horizontal and vertical forces.

The force sensor also can be attached using a suspension system to isolate the force sensor form jolts or bumps that might cause rapid accelerations as a result of hitting uneven ground. And, multiple force sensors could be used, with each sensor being attached to its own force bar. For such embodiments, each force sensor/force bar combination may engage only a single row of crops to determine the EI of each row instead of the average EI of all the rows. This would allow breeders to better understand spatial gradients in EI and therefore growing conditions, such as nutrient availability, in their field.

Embodiments of the present apparatus can include a movement mechanism 304 (such as e.g., wheels, continuous tracks, a motor, and/or other vehicle propulsion system) in communication with or functionally coupled to a displacement sensor 310. In implementations, a rotary encoder with a 1024 pulse per rotation (such as e.g., a YUMO rotary encoder SparkFun Electronics, Niwot, CO) can be linked with a wheel configured to contact the ground or a wheel or belt of a continuous track of the SOCEM 300 via a gear and timing belt system to record the SOCEM displacement. In other implementations, the movement mechanism may be a component of a vehicle (such as, e.g., being pulled or driven by a harvest combine) and the displacement sensor of the SOCEM 300 can be adapted to detect displacement of the vehicle and/or the SOCEM 300 can be configured to communicate with a displacement sensor of the vehicle.

SOCEM 300 can optionally include one or more other sensors or data/signal detection devices 320. For example, the SOCEM 300 can include: a height sensor or height adjustment system associated with the force bar and configured to determine or set a height of the force bar relative to the ground; a camera or optical detection system; a LiDAR sensor; a photogate; an ultrasonic sensor; a temperature sensor; a humidity sensor; a gyroscope; an accelerometer; sensors configured to detect or measure other environmental factors or operational factors of the SOCEM 300; and any and all combinations thereof.

For example, pairing the load-cell with an accelerometer or gyroscope to record its angle can improve force measurement accuracy, especially in a field. The terrain in the field is uneven so the load-cell will experience small changes in its orientation (which can e.g., transgress the assumption that it is measuring $F_x$). Further, the weight of the force bar can also influence load-cell measurements during angle changes (although its effect may be small due to its lightweight design), which can be corrected for if the angle of the load-cell was known. Temperature and/or humidity sensors may also be components of the SOCEM 300, as the environment can influence the mechanical properties of crops. For example, turgor pressure (i.e., the hydrostatic pressure exerted on a plant's cell wall) can affect plant biomechanics. As humidity is known to influence turgor pressure, so it can be recorded during testing. Other or additional exemplary SOCEM embodiments and implementations including additional sensors are discussed further below (see Additional Embodiments and Implementations).

The force sensor 308, the displacement sensor 310, and the one or more other sensors 320 can each be configured to transmit detection and/or measurement signals to a microcontroller 312, such as an Arduino Uno Rev3, Arduino.cc that is configured for communication with the sensors within the SOCEM system to digitize their signals for use in data collection and processing. In other words, the microcontroller 312 can be configured to read sensor signals and forward sensor data to one or more processor apparatus 314, which includes memory 316 storing programming logic thereon. In implementations, the processor apparatus 316 can be a Raspberry Pi computer (such as e.g., Raspberry Pi 3 Model B+) that is configured to run the GUI 306, send commands to the microcontroller 312, receive data from the microcontroller 312, process the data, and save raw and/or processed data.

Collected data can be saved on-board the SOCEM 300 using a mass storage device 318. Alternatively, collected data can be transmitted off-device for processing and/or storage. For example, data can be transmitted via a communication interface 322 to a computerized user device 200 (such as, for example, a mobile device or other computer apparatus including a GUI and one or more processor apparatus having memory and processing logic (not shown)) and/or to a network location 202 over a data communication network such as, e.g., the Internet.

The foregoing microprocessor and processor can include various types of digital processing devices including, without limitation: digital signal processors (DSPs); reduced instruction set computers (RISC): general-purpose (CISC) processors; microprocessors; gate arrays (e.g., FPGAs); PLDs; state machines; reconfigurable computer fabrics (RCFs); array processors; secure microprocessors; application-specific integrated circuits (ASICs); and any and all combinations thereof. Such digital processors may be contained on a single unitary integrated circuit (IC), or distributed across multiple components. It will be further appreciated that the on-board and/or off-device storage devices can include, without limitation: computer hard drives; memory, RAID devices or arrays; optical media (e.g., CD-ROMs, Laserdiscs, Blu-Ray, etc.); solid state devices (SSDs); flash drives; cloud-hosted storage; network attached storage (NAS); and/or any other devices or media capable of storing data or other information. Memory can include various types of integrated circuit or other storage devices adapted for storing digital data including, without limitation, ROM, PROM, EEPROM. DRAM, SDRAM, DDR/2 SDRAM, EDO/FPMS, RLDRAM, SRAM, "flash" memory (e.g., NAND/NOR), 3D memory, and/or PSRAM. The communication interface can be a signal or data interface with a component or network including, without limitation: FireWire (e.g., FW400, FW800, etc.); USB (e.g., USB 2.0, 3.0. OTG); Ethernet (e.g., 10/100, 10/100/1000 (Gigabit Ethernet), 10-Gig-E, etc.); MoCA; LTE/LTE-A; Wi-Fi (802.11); WiMAX (802.16); Z-wave; PAN (e.g., 802.15)/Zigbee, Bluetooth, Bluetooth Low Energy (BLE); and/or power line carrier (PLC) families.

In alternate embodiments and/or implementations, the SOCEM 300 can include more or fewer components. For example, the SOCEM 300 can have a design where the microcontroller communicates with a data communication interface to transmit raw data off-device for processing and/or storage, such as to an external computerized device (e.g., user device 200) or a network location (e.g., the network location 202). In such examples, the SOCEM 300 may exclude an on-board processing device, GUI, and/or mass storage device, and utilize equivalent or similar components of the external computerized device or a computerized device associated with the network location. In another example, the SOCEM 300 can include additional elements, such as a global positioning system (GPS) in communication with the processor 314. GPS can be utilized to collect positioning data associated with one or more plots of stems for identification thereof and/or for tracking a location of the SOCEM 300.

On-board electrical components of the SOCEM 300 are powered by a power source 324. For example, the power source 324 can be a lithium-ion battery (such as, e.g., a PowerCore 20100, Anker lithium-ion battery), or the battery can be a rechargeable battery that can be affixed to or removable from the SOCEM 300. In other implementations, the SOCEM 300 can be configured to run off another power source, such as a power source of a vehicle (e.g., a harvest combine) to which the SOCEM 300 is associated.

Figure 4A:
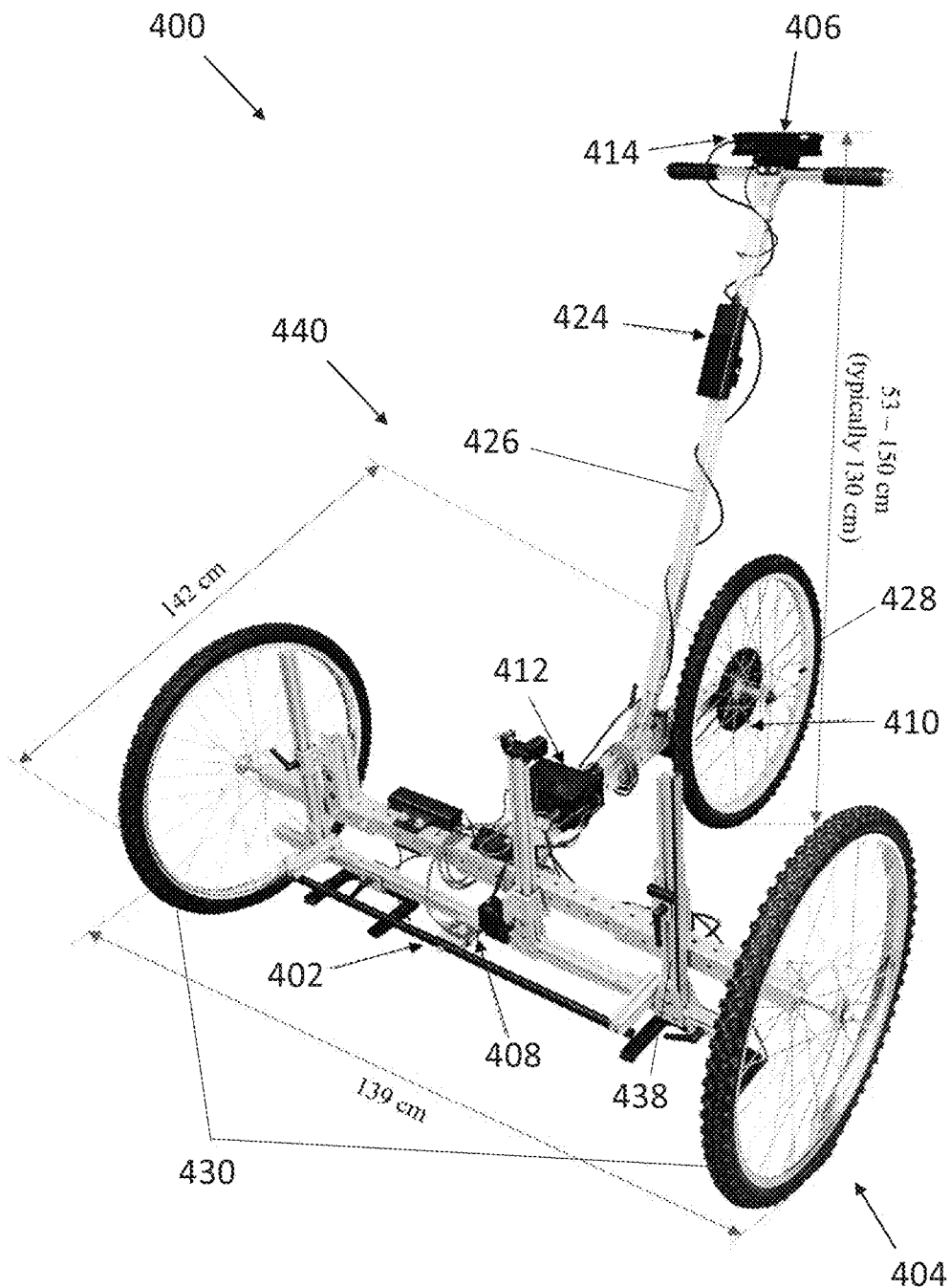
FIGS. 4A-4C are perspective views of an exemplary manual crop lodging resistance measurement apparatus, according to the present disclosure.
Figure 4B:
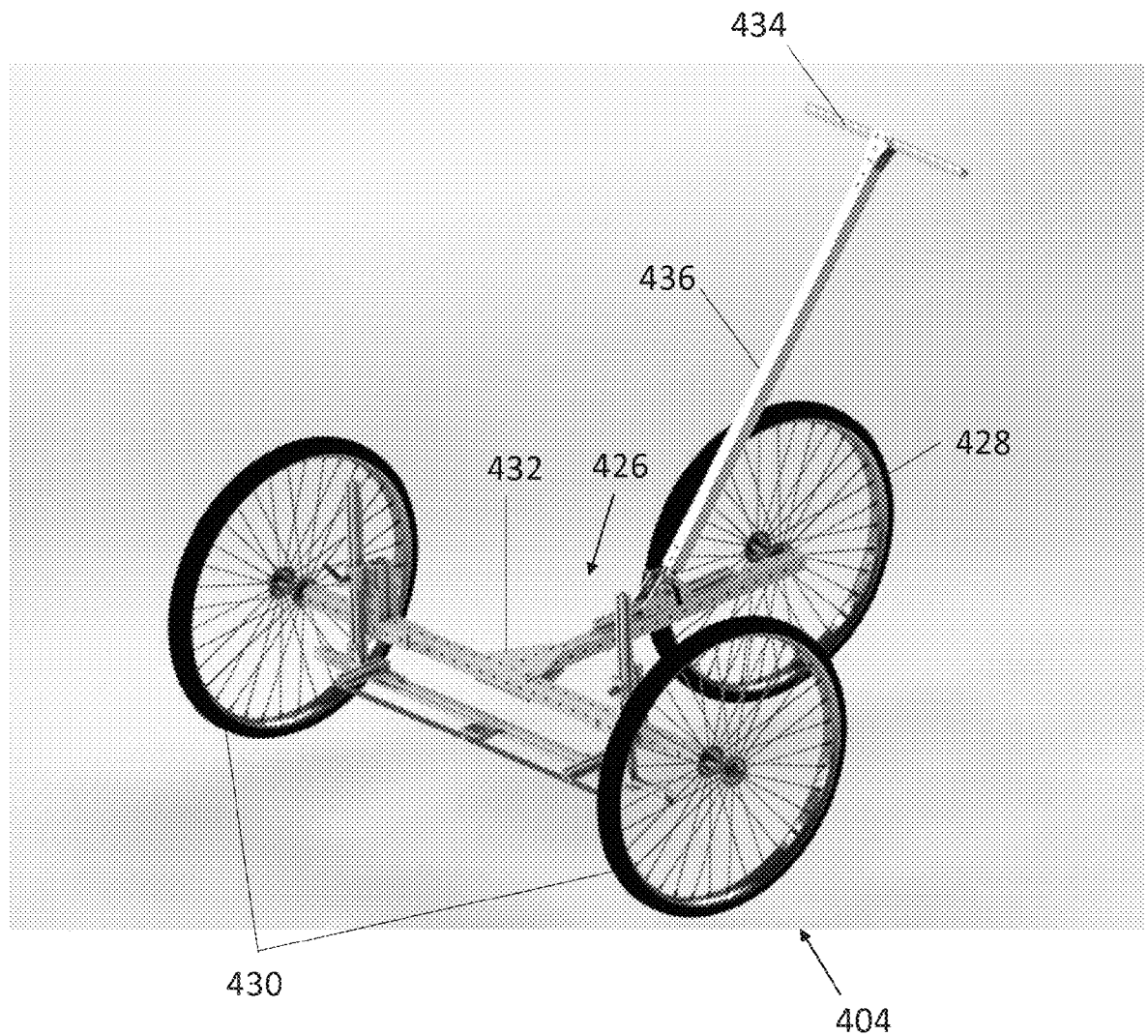

FIGS. 4A-4B illustrate an exemplary embodiment of a manually operated SOCEM 400 therein. With reference to FIG. 4A, similar to the SOCEM 300, the SOCEM 400 includes a force bar 402 in communication with a force bar sensor 408, a movement mechanism 404 in communication with a displacement sensor 410, a microprocessor 412, a power source 424, one or more processors 414, and a GUI 406. These elements can be similar to those described above with reference to the embodiments and implementations of the SOCEM 300 shown in FIG. 3.

The movement mechanism 404 of the manual SOCEM 400 can include a frame 426 having the force bar 402, the force bar sensor 408, the displacement sensor 410, the microprocessor 412, the power source 424, the one or more processors 414, and the GUI 406 affixed thereto, and further having a rear wheel 428 and two front wheels 430 rotatably mounted thereto. The frame 426 can be fabricated from any suitable material, such as a metal or alloy, exemplified by aluminum. The illustrated embodiment comprises a T-shaped chassis 432 including a laterally disposed member and a longitudinally disposed member. The T-shaped chassis 432 can have the rear wheel 428 and the front wheels 430 rotatably mounted thereto. As illustrated by FIG. 4B, the frame 426 can further include an upwardly projecting arm or member 436 extended upwardly from the chassis 432 at an angle and a handlebar 434 attached at a top end of the upwardly projecting arm 436.

The position of the handlebar 434 can easily be adjusted by loosening an 80/20 "L" handle linear bearing brake. A person of ordinary skill in the art will appreciate that wheels of various dimensions can be utilized, depending on where the device 400 may be used. For certain embodiments, wheels 428 and 430 were 12-inch bicycle wheels. Large-diameter wheels/tires provide smooth rollover on uneven surfaces.

Attachments, such as sensors and cases for electronic and/or computerized components, can be mounted to the frame as desired, such as by using bolts on 80/20 ready tube or 80/20 T-slot extrusions. Force bar 402, which is attached to the force sensor 408, can be, by way of example, a 76-centimeter-long, rectangular carbon fiber rod that is lightweight to reduce noise in force measurements due to weight loading vibrations.

Crops can vary in height. Accordingly, the height of the force bar can be adjusted. Certain embodiments allowed adjustment using two, 80/20 linear bearing sliders. A custom ruler and pointer 438 can indicate the force bar height from the ground such that a user can input the force bar height into the GUI. In other implementations, a sensor can automatically detect the height of the force bar, or the force bar can be coupled to a motorized height adjustment system that can set the force bar to a specified height entered by a user or a pre-determined optimized height for a specified crop.

Figure 4C:
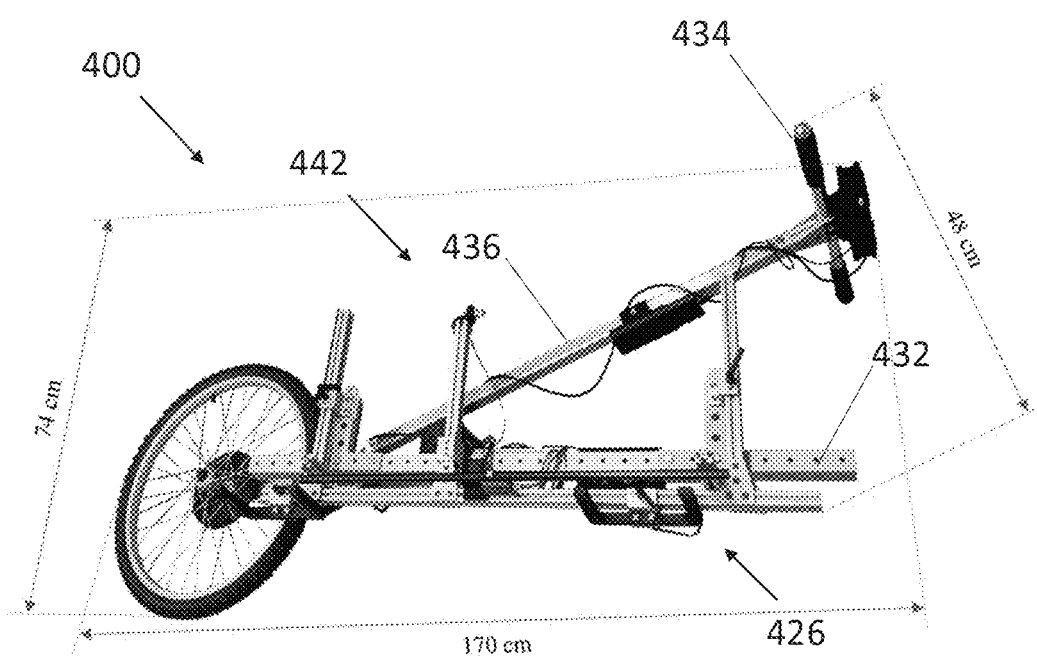

For ease of transportation and storage, frame 426 can be moved from an operable position 440 (shown in FIG. 4A) into a collapsed and folded position 442 (shown in FIG. 4C). For example, the handlebar 434 can be rotated forward fully, and a wing nut and bolt can be removed, allowing the rear to swivel inward. The two front wheels 430 can also easily be removed by sliding them out of the 80/20 ready tube after removing the wing nuts and bolts that rotatably mount the front wheels to the frame. In the folded position, the SOCEM 400 can fit in a truck or hatch-back vehicle. The weight of the full device can be less than 200 N, allowing most individuals to lift it if needed.

As discussed above, the GUI 406 for the SOCEM 400 can be mounted to the handlebar 434. In alternate embodiments, the GUI can be mounted at a different location or be located off-device (such as, e.g., being a separate dedicated remote device and/or being the GUI of a user device in communication with SOCEM 400). For certain embodiments, the GUI 406 is an LCD touchscreen (Juvtmall) graphical user interface (GUI) that is used to control the data acquisition process for the SOCEM 400. A user can interact with the GUI by touch or using an attached stylist to press on-screen buttons and/or input text using an on-screen keyboard. In implementations, the GUI can use Python programming language and/or other programming languages (such as e.g., C++, Java, etc.).

Figure 5A:
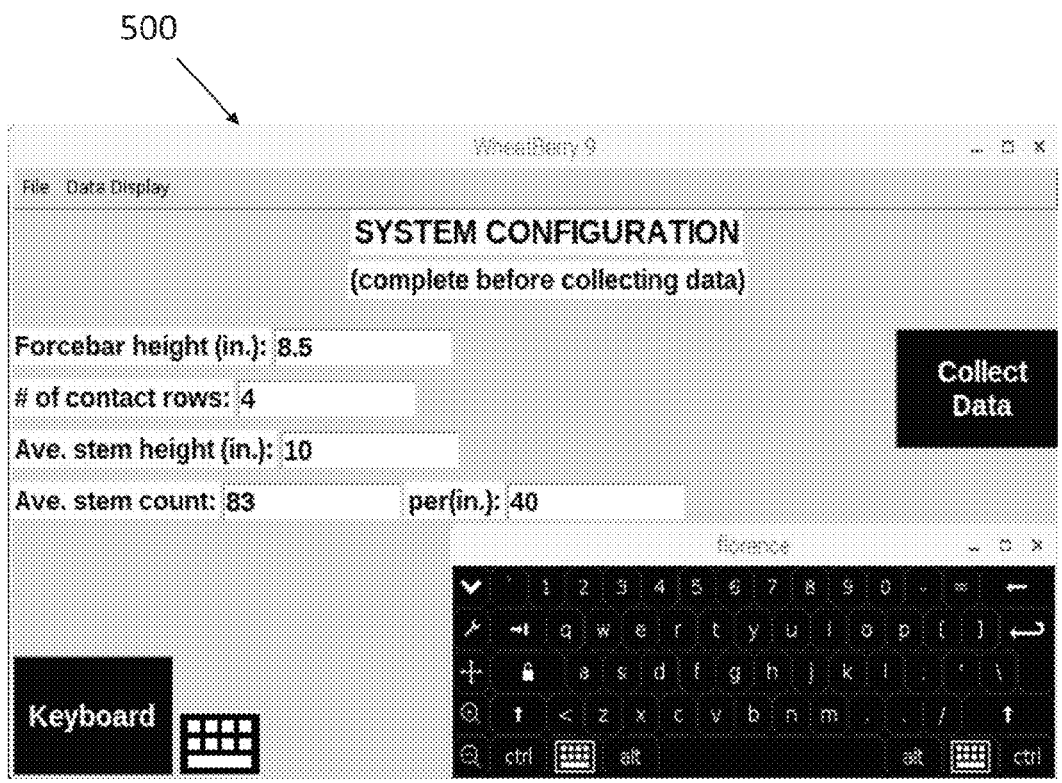
FIGS. 5A-5C are exemplary screen shots from a GUI which can be associated with embodiments of an exemplary crop lodging resistance measurement apparatus disclosed herein.
Figure 5B:
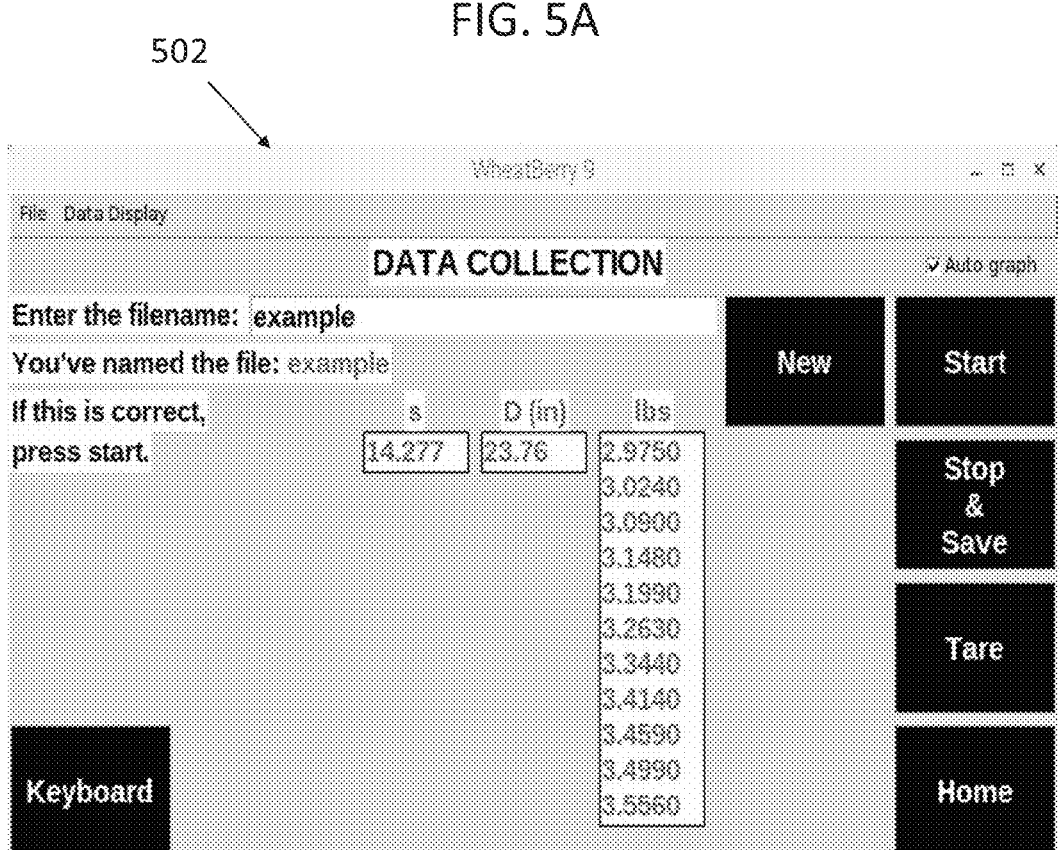
Figure 5C:
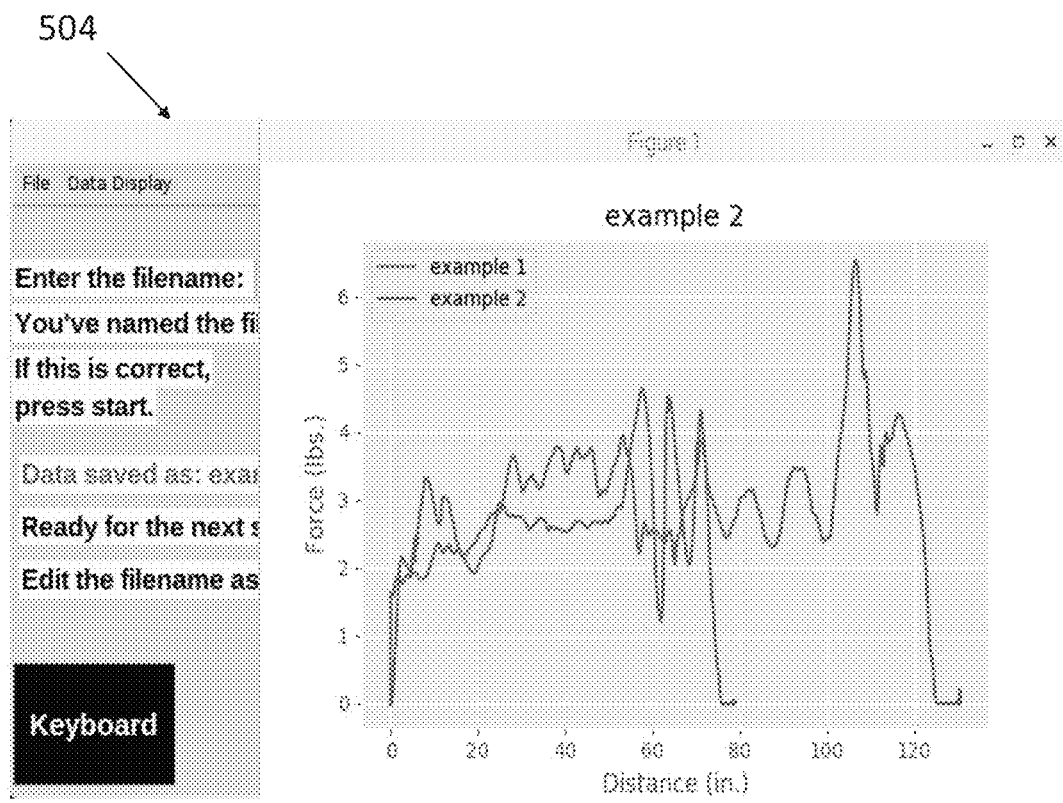

Exemplary embodiments of a home screen 500, a testing screen 502, and a results screen 504 are shown in FIGS. 5A-5C, respectively. As illustrated by FIG. 5A, the home screen 500 can be configured such that pressing the "Collect Data" button navigates to the testing screen, where the user inputs the name of the data file or storage location to which the data will be saved. Further, the home screen can include a "Tare" button to zero the force sensor at any point prior to, during, or after operation of the SOCEM. During testing, a live feed of the elapsed time, displacement, and force measurement can be displayed on the testing screen 500 to ensure sensors are working properly, as shown in FIG. 5B.

After ending a test, an additional window can then be created with a force-displacement graph in the results screen 504, enabling an immediate check and feedback on the collected data. For certain embodiments, if the results screen 504 remains open while starting the next test, the force-displacement can be plotted on the same graph to allow users to compare multiple plots' force responses, as shown in FIG. 5C. Alternatively, if the results screen 504 is closed before starting a new test, a new force-displacement graph can be created. The GUI may use a white background with dark text to help combat glare on the display that may occur while operating the device in the field.

In order to generate results indicative of lodging resistance or sensitivity (such as, the exemplary force-displacement graph shown in the results screen 504 of FIG. 5C), signals and measurements are collected via sensors and/or detection devices and are communicated to the one or more processors (such as, an on-board processor or an off-device processor at a separate computerized device or a network location associated with processing apparatus). Additional parameters can be collected from user inputs that are communicated to the one or more processors. As shown in FIG. 3B, the processor apparatus includes memory storing programing logic or software thereon. In embodiments, the memory can include programing instruction for a series of software steps for operating the SOCEM, as well as one or more models or algorithms configured to determine lodging resistance or sensitivity from the received data and/or parameters.

IV. Exemplary Models

As discussed above, many known devices for assessing lodging resistance fail to account for the number of stems that are contacted by the device during testing and therefore fail in determine a degree to which the stems interact with one another. The density of stems and the level of interaction can influence the system mechanics and therefore affect force measurements. For example, using conventional devices and methods, a wheat field may be analyzed assuming each individual wheat stem can be approximated as a single vertical cantilever beam (i.e., a structural element that extends vertically and is supported or attached at one end). When subjected to external forces each wheat stem will contact and interact with its neighbors. The same is true of most agricultural cropping systems. Other natural and synthetic systems with similar attributes include grasses, forests, hair, fur, nanotube arrays, brooms, and brushes. Furthermore, existing models of crop systems utilized with conventional devices are often too complex to utilize with field devices as they require numerous input parameters and/or elliptical integration or numerical methods.

To address such issues, the plot of stems can be characterized as a group of mutually interacting cantilever beams. Accordingly, the SOCEM can be programmed to include a model (pseudo-rigid body model) of force-deflection response of multiple, inline, interacting cantilever beams and an accompanying closed-form solution (i.e., a Multiple Inline Interacting Cantilever Beam Model, hereinafter Interacting Model). From the Interacting Model and a set of input parameters and/or measurements, either the force-displacement response of the system of stems can be determined or the average flexural rigidity of the stems can be determined. The Interacting Model can be validated through data triangulation between physical and computational experiments. An exemplary analysis of the model indicates that it can be most accurate with deflections less than 50°, but sensitive to errors in input parameters for deflections less than 28°. Accounting for interactions between stems can have a significant effect, especially at large deflections of densely spaced stems. The Interacting Model may be used in high throughput applications using the SOCEM for estimating flexural rigidity. Adjustments can be made to the Interacting Model (or other models for determining lodging resistance and/or flexural stiffness) to more accurately model specific stem systems or types of crops.

Figure 6A:
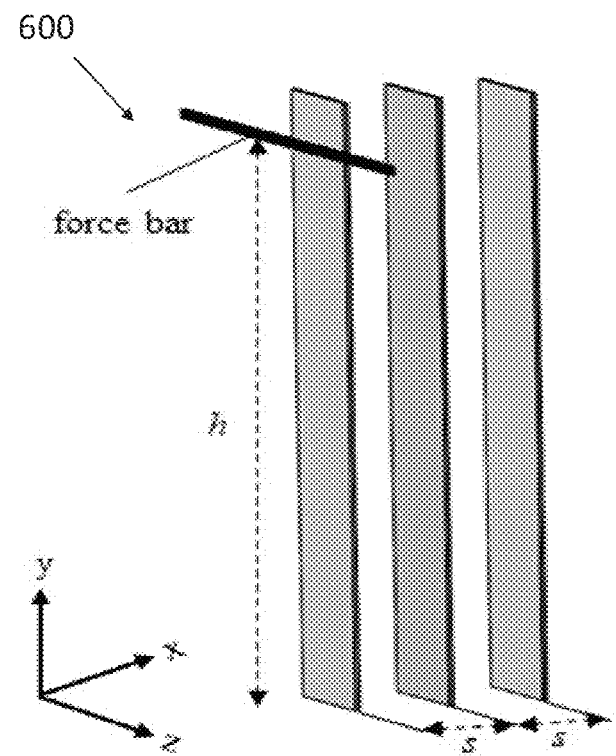
FIGS. 6A-6G are schematic illustrations of exemplary inline cantilever beams, which can be used to model crop interactions, according to the present disclosure.
Figure 6B:
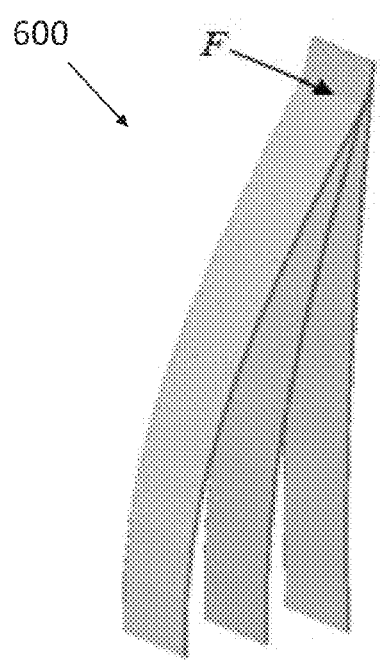
Figure 6C:
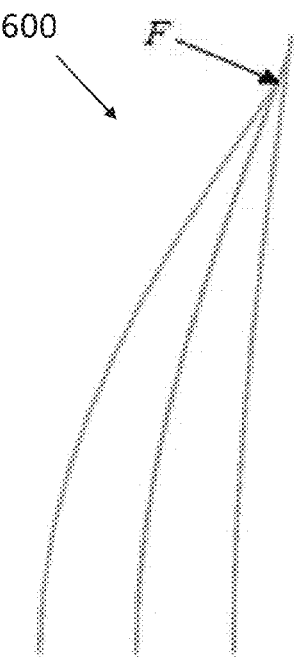

FIGS. 6A-6C illustrate an arrangement of multiple vertical cantilever beams (e.g., stems) 600. Specifically, FIG. 6A illustrates a row of vertical cantilever beams 600, of equal length, placed directly inline along the x-axis with equal spacing. A rigid body (i.e., a force bar, such as e.g., the force bar 304 or 404 discussed above) is oriented parallel to the z-axis at a substantially constant height h and moves in the x-direction applying a displacing force to each beam at h. Initially, the beams 600 are in an undeflected state. As illustrated in FIGS. 6A-6C, as each beam deflects it may contact adjacent cantilever beam(s). Each stem/beam will be displaced until the y-coordinate of the end of each beam is at h at which point the stem/beam will transition to a deflected state and pass beneath the force bar.

For certain embodiments, a "pseudo-rigid body model" (PRBM) approach can be utilized to model the interacting stems and/or beams. PRBM is an approximation method that accurately and efficiently analyzes large deflection problems. The PRBM method can predict the force-deflection response of flexible members with a combination of rigid bodies, precisely placed pin joint(s), and torsional springs. Each type of flexible member, (e.g., straight cantilever beam, initially curved cantilever beams, pinned-pinned flexible segments, etc.) has a corresponding PRBM with precise pin joint location(s) and torsional spring constant(s).

Figure 6E:
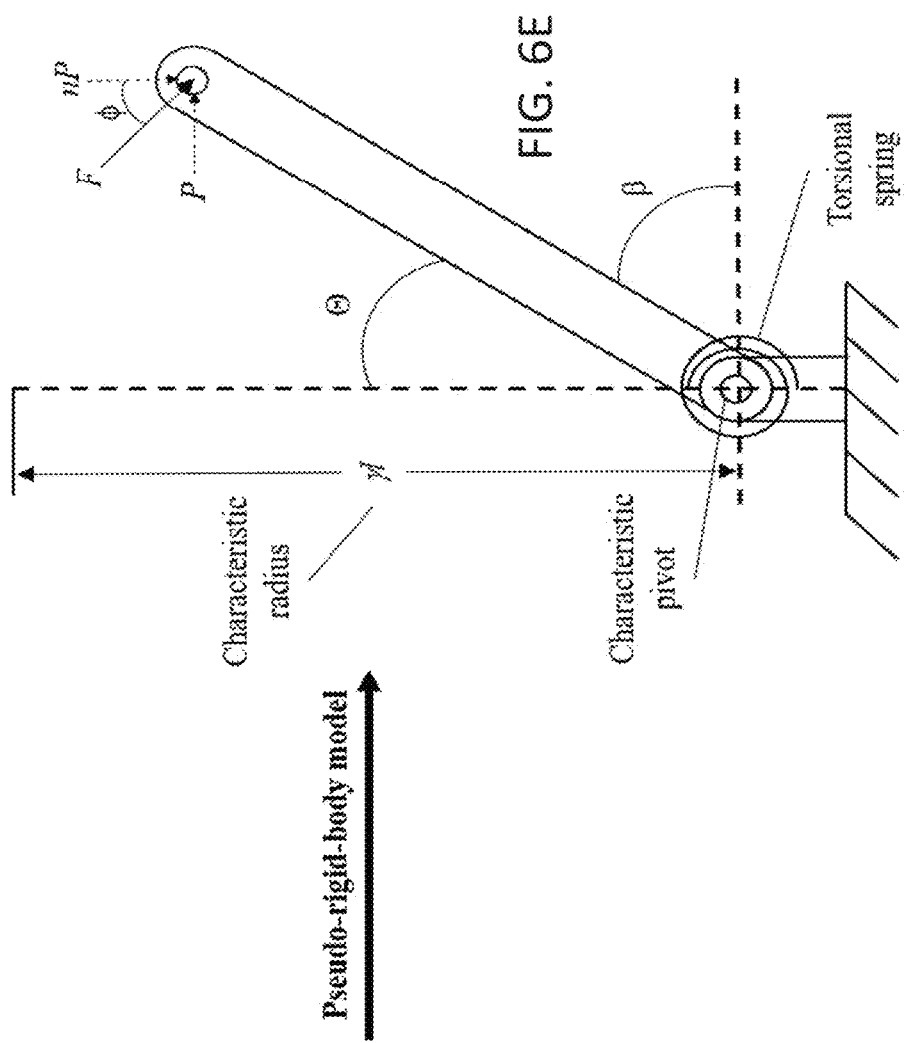

A PRBM model for a single, prismatic cantilever beam is disclosed by Howell, Larry L. 2001. *Compliant Mechanisms*. New York: John Wiley & Sons, which is incorporated by reference herein. As described therein and illustrated by FIGS. 6D and 6E, the total force applied at the free end F of the cantilever beam can have both a horizontal component P and a vertical component nP. For the vertical force component, a positive n describes a compression force acting on the undeflected beam. Thus, $$F = P\sqrt{n^2+1} \tag{1}$$

Figure 6D:
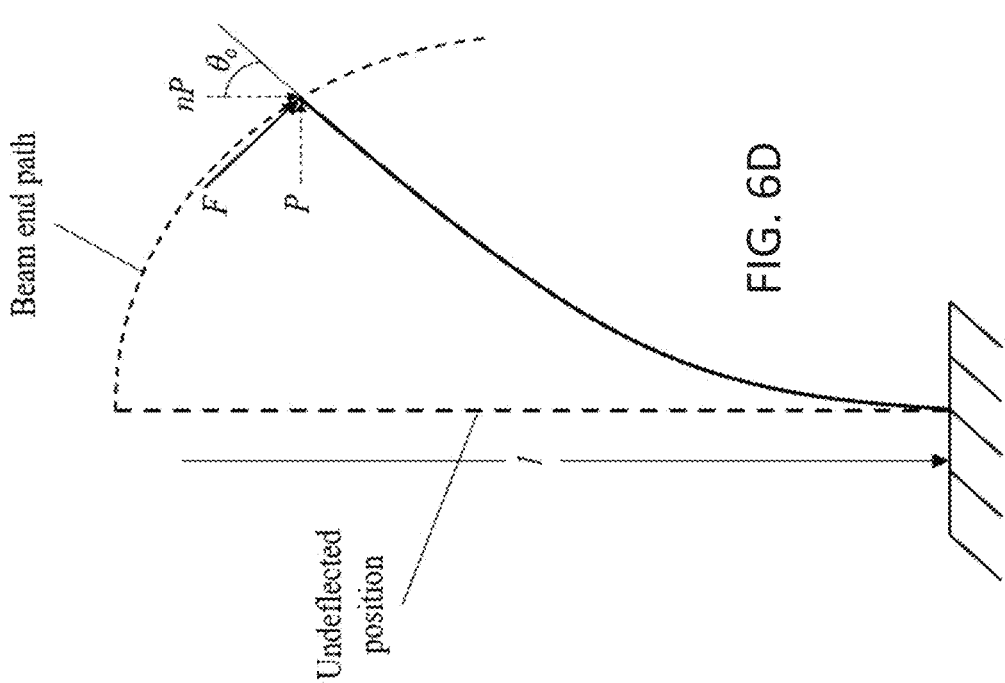

The deflection of the beam (e.g., a stem) pictured in FIG. 6D can be represented by the PRBM shown in 6E, where the flexible cantilever beam can be represented by connecting two rigid links with a pin joint and a torsional spring at the characteristic pivot. The characteristic pivot can be positioned so that the longer link has a length equivalent to the characteristic radius of the circular path of the free end. The characteristic radius is written as $\gamma l$ where $\gamma$ is known as the characteristic radius factor. Further, $\gamma$ varies as a function of $\phi$, the angle of the force applied, which is defined with respect to the undeflected axis (vertical axis in this case). From the PRBM, $$\phi = \tan^{-1}\left(\frac{1}{n}\right) \tag{2}$$

Thus, there is a nearly linear relationship between the beam end angle, $\theta_o$, and the PRBM angle, $\Theta$, expressed as $$\theta_o = c_o \Theta \tag{3}$$

in which $c_o$, the parametric angle coefficient, is a function of n.

Fitting a curve to the numerical data for $c_o$ results in $$c_o = (-2 \times 10^{-6})n^4 + (7 \times 10^{-5})n^3 - 0.0009n^2 + 0.006n \tag{4}$$

This allows φ to properly be corrected from $$\phi = \frac{\pi}{2} - \theta_o \tag{5}$$

Rearranging Eq. (2) presents $$n = \frac{1}{\tan(\phi)} \tag{6}$$

Accordingly, the following piecewise function can be used to define γ as a function of n:

$$\gamma = \begin{cases} 0.841655 - 0.0067807n + 0.000438n^2 & (0.5 < n < 10.0) \\ 0.852144 - 0.0182867n & (-1.8316 < n < 0.5) \\ 0.912364 + 0.0145928n & (-5.0 < n < -1.8316) \end{cases} \tag{7}$$

To account for the force response, the PRBM can represent the beam's resistance with the stiffness coefficient, $K_\Theta$, a nondimensionalized torsional spring constant. This stiffness coefficient is related to the transverse force, which causes the link to deflect and produce a torque at the characteristic pivot. The nondimensionalized transverse load index can be written as $$(\alpha^2)_t = \frac{F_t l^2}{EI} \tag{8}$$

The relationship between $(\alpha^2)_t$ and Θ can be nearly linear, allowing the force-deflection relationship to be described as $$(\alpha^2)_t = K_\Theta \Theta \tag{9}$$

Like γ, $K_\Theta$ can be described as a function of n:

$$K_\Theta = \begin{cases} 3.024112 + 0.121290n + 0.003169n^2 & (-5 < n \le -2.5) \\ 1.967647 - 2.616021n - 3.738166n^2 \\ -2.649437n^3 - 0.891906n^4 - 0.113063n^5 & (-2.5 < n < -1) \\ 2.654855 - 0.509896 \times 10^{-1}n + 0.126749 \times 10^{-1}n^2 \\ -0.142039 \times 10^{-2}n^3 + 0.584525 \times 10^{-4}n^4 & (-1 < n \le 10) \end{cases} \tag{10}$$

Both $K_\Theta$ and γ are estimations with accuracy limits in terms of the maximum Θ. The following approximation of $K_\Theta$ can also be implemented to simplify the solution process:

$$K_\Theta \approx \pi\gamma \tag{11}$$

Recall that the transverse force $F_t$ produces a torque at the characteristic pivot, expressed as $$T = F_t \gamma l \tag{12}$$

This torque can also be written as $$T = K\Theta \tag{13}$$

where K is the torsional spring constant (not to be confused with the stiffness coefficient, $K_\Theta$). Setting Eq. (12) and Eq. (13) equal and rearranging for $F_t$ yields $$F_t = \frac{K\Theta}{\gamma l} \tag{14}$$

Combining Eq. (8) and Eq. (9), $$\frac{F_t l^2}{EI} = K_\Theta \Theta \tag{15}$$

Inserting Eq. (14) into the above then gives $$\frac{K\Theta l}{\gamma EI} = K_\Theta \Theta \tag{16}$$

Equation 16 can then be rearranged for K or the flexural rigidity, EI, expressed below respectively:

$$K = \gamma K_\Theta \frac{EI}{l} \tag{17}$$

$$EI = \frac{Kl}{\gamma K_\Theta} \tag{18}$$

Another approximation for K can be expressed by substituting Eq. (11) into Eq. (17), yielding $$K \approx \pi\gamma \frac{EI}{l} \tag{19}$$

However, the above model is limited to a single cantilever beam. As discussed above, when evaluating lodging resistance of a plot of stems or a crop, such as via the high throughput lodging resistance analyses that can be carried out using embodiments of an SOCEM disclosed herein, a plot of stems or a crop can be characterized as a group of mutually interacting cantilever beams to account for interactions between adjacent stems.

Figure 6F:
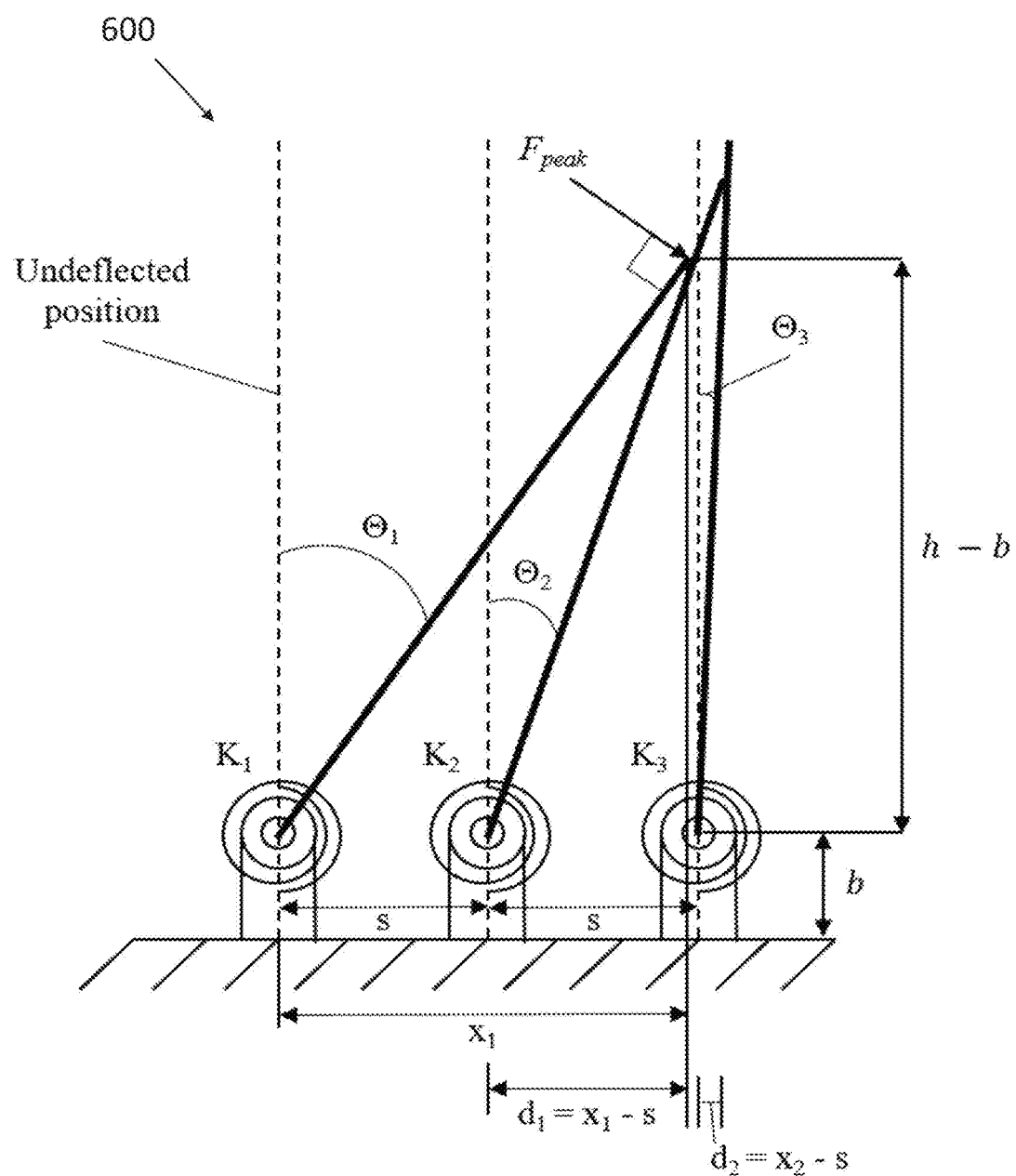
Figure 6G:
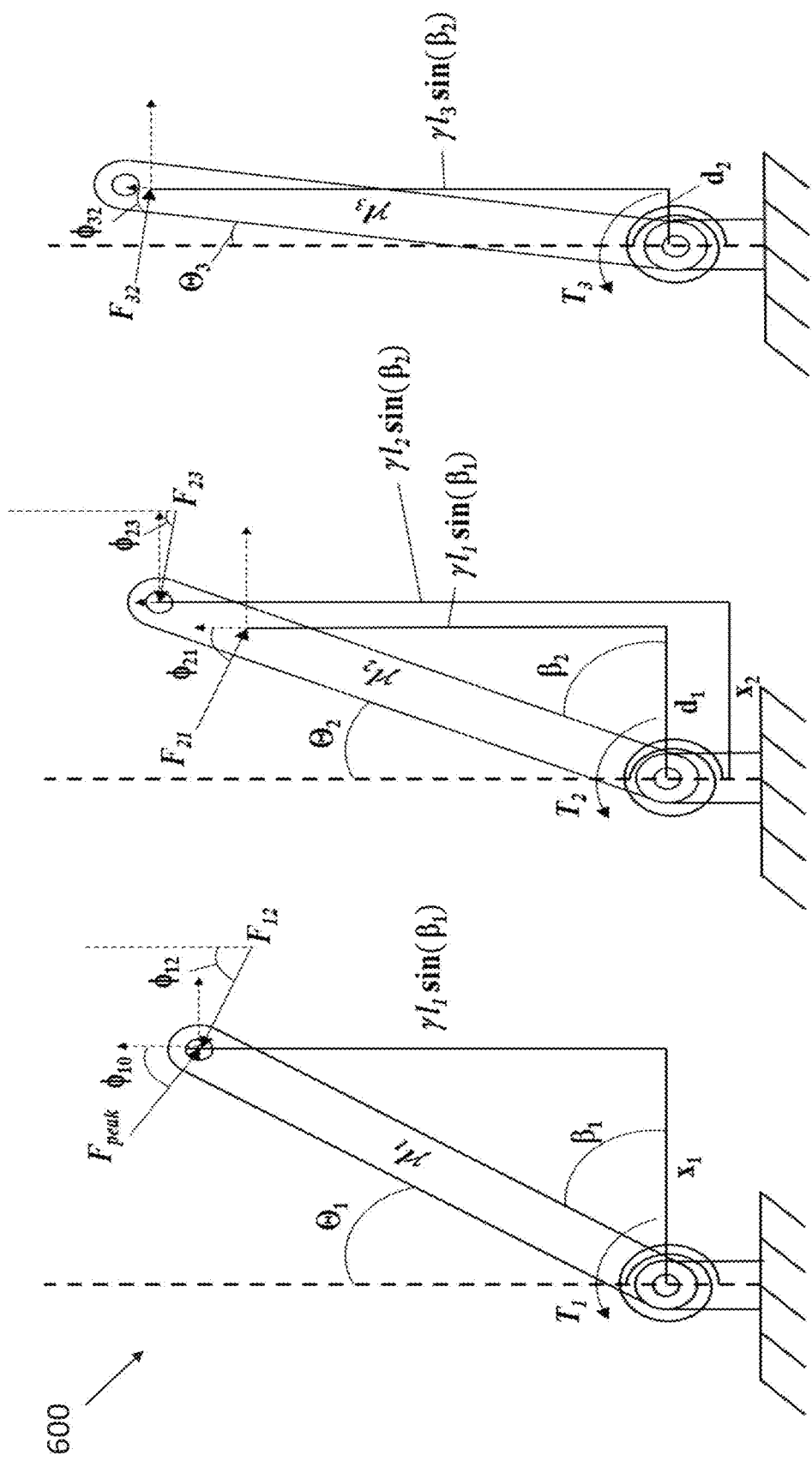

As described with reference to FIGS. 6A-6C, in one example of a model of stems characterized as multiple interacting cantilevers (i.e., an Interacting Model), three identical, vertical cantilever beams of length l are placed with equal spacing s along the x-direction. A force bar, oriented parallel to the z-axis, moves across the beams, applying a force at a known, constant height h that deflects all three beams. There may be a point at which the frontmost beam is at its maximum deflection (i.e., a point immediately prior to passing under the force bar and returning to its vertical position). The applied force at this point can be referred to as $F_{peak}$. An exemplary embodiment of the PRBM of this scenario (i.e., beams of equal length, l, are placed with equal spacing, s, along the x-axis, and the PRBM at the first beam's is in a maximum deflected state) is depicted in FIG. 6F, while exemplary embodiments of the PRBM free body diagrams of each individual beam are illustrated in FIG. 6G. For clearer visualization, the geometry is often described with respect to the angle, β, rather than Θ, (as in FIG. 6G and in the below equations).

$$\beta_i = \frac{\pi}{2} - \Theta_i \quad (20)$$

While three beams are shown in FIGS. 6A-6C and 6F-6G, the derivation can be applied to more or fewer interacting beams or stems.

To obtain an expression for $F_{peak}$ or EI (flexural stiffness), the angles of deflection (Θ) and locations of the forces may be utilized. Starting with the first beam, $\Theta_1$ in radians becomes $$\Theta_1 = \frac{\pi}{2} - \sin^{-1}\left(\frac{h - b_1}{\gamma_1 l}\right) \quad (21)$$

where b, the base of the PRBM, is expressed as $$b_i = (1 - \gamma_1) l \quad (22)$$

To implement equation (21), a value for $\gamma_1$ can be selected. In embodiments, the assumption in which the applied force is always acting horizontally can be made, yielding $n_1=0$ and $\gamma_1=0.8517$. With this simplifying assumption, an initial estimate for $\Theta_1$ can be made. While maintaining this $\Theta_1$, the assumption in which the applied force is always acting perpendicularly to the first beam can be made. Using Eq. (3) and Eq. (5) then provides $\phi_1$. Given $\phi_1$, a value for $n_1$ can be obtained from Eq. (6), which can then be inputted to update $\gamma_1$. Changing $\gamma_1$ may cause $\Theta_1$ to also be updated. This will restart the process of determining $\phi_1$. This process can be repeated until $\gamma_1$ converges, which can easily be implemented using a loop in a computer program. The final $n_1$ can also be utilized to update $K_{\Theta 1}$, which is used to determine the first beam's K (if EI is known) from Eq. (17). For this analysis, it can be assumed that all beams in the system possess the same K for simplification.

To determine the geometry of the remaining beams and forces, the x-coordinate of the first beam's end point, $x_1$, at its maximum deflection can be utilized. With i=1, this is simply $$x_i = \gamma_i l \cos(\beta_i) \quad (23)$$

As shown in FIG. 6F, the horizontal distance a beam extends past the next beam's origin can be expressed as $$d_i = x_i - s \text{ (while } x_i > s) \quad (24)$$

If the $x_i > s$ condition is not met, the $i^{th}$ beam may not contact the next (i+1) beam prior to the first beam passing below the force bar (i.e., disengaging) and returning to its vertical position. With Eq. (24), the angle of deflection for the non-initial beams (i>1) can be expressed as $$\Theta_i = \frac{\pi}{2} - \tan^{-1}\left(\frac{\gamma_{i-1} l \sin(\beta_{i-1})}{d_{i-1}}\right) \quad (25)$$

In view of Newton's third law (i.e., every force has an equal and opposite reaction), as the $i^{th}$ beam exerts a force on the i+1 beam, the i+1 beam may exert a force of equal magnitude back. This supports the using the following notation, $$F_{i,i+1} = F_{i+1,i} \quad (26)$$

where $F_{i, i+1}$ corresponds to the force acting on the $i^{th}$ beam induced by the i+1 beam. The force vectors of equal magnitude acting between beams i and i+1 can be assumed to act at the mean perpendicular angle of the i and i+1 beams. Thus, $$\phi_{i,i+1} = \frac{\phi_i + \phi_{i+1}}{2} \quad (27)$$

Where $\phi$ can be found using Eq. (5). Note that $\phi_{i,i+1} = \phi_{i+1,i}$. For each beam, $\phi_{i,i+1}$ should be used to determine $n_i$ in order to update each beam's $\gamma_i$.

The solution process for $F_{peak}$ can begin by analyzing the final beam as it is the only beam with just one force and a torque acting on it. From there, it is possible to back-solve to $F_{peak}$. For example, the moments at the final beam's torsional spring can be considered. A moment in the counterclockwise direction is defined as positive. As illustrated in FIG. 6G, $$\Sigma M_3 = T_3 + F_{32y} d_2 - F_{32x}(\gamma_2 l \sin(\beta_2)) = 0 \quad (28)$$

The force components can be defined as $$F_x = F \sin(\phi) \quad (29)$$

$$F_y = -F \cos(\phi) \quad (30)$$

Substituting the force components into Eq. (28) gives $$T_3 - F_{32}(\cos(\phi_{32}) d_2 + \sin(\phi_{32}) \gamma_2 l \sin(\beta_2)) = 0 \quad (31)$$

Inserting $T_3$ using Eq. (13) and solving for $F_{32}$ yields $$F_{32} = \frac{K_3 \Theta_3'}{\cos(\phi_{32}) d_2 + \sin(\phi_{32}) \gamma_2 l \sin(\beta_2)} \quad (32)$$

Thus, the final beam's resistive force can be expressed as $$F_{i,i-1} = \frac{K_i \Theta_i}{\cos(\phi_{i,i-1}) d_{i-1} + \sin(\phi_{i,i-1}) \gamma_{i-1} l \sin(\beta_{i-1})} \quad (33)$$

The moments acting at the middle beam's torsional spring can be expressed as $$\Sigma M_2 = T_2 + F_{21y} d_2 - F_{21x}(\gamma_1 l \sin(\beta_1)) + F_{23y} x_2 - F_{23x}(\gamma_2 l \sin(\beta_2)) = 0 \quad (34)$$

As noted, $F_{23} = -F_{32}$ and therefore $$F_{23x} = -F_{32x} = -F_{32} \sin(\phi_{32}) \quad (35)$$

$$F_{23y} = -F_{32y} = F_{32} \cos(\phi_{32}) \quad (36)$$

After substituting $T_2$ and the force components, Eq. (34) can be rearranged for $F_{21}$ as shown below $$F_{21} = \frac{K_2 \Theta_2 + F_{32}(\cos(\phi_{32}) x_2 + \sin(\phi_{32})(\gamma_2 l \sin(\beta_2)))}{\cos(\phi_{21}) d_1 + \sin(\phi_{21}) \gamma_1 l \sin(\beta_1)} \quad (37)$$

Thus, the resistive force of any middle beam can be expressed as $$F_{i,i-1} = \frac{K_i \Theta_i + F_{i+1,i}(\cos(\phi_{i+1,i}) x_i + \sin(\phi_{i+1,i})(\gamma_i l \sin(\beta_i)))}{\cos(\phi_{i,i-1}) d_{i-1} + \sin(\phi_{i,i-1}) \gamma_{i-1} l \sin(\beta_{i-1})} \quad (38)$$

Using the same methods as done for the middle beam, $F_{peak}$ can be solved for from the sum of the moments acting at the first beam's torsional spring, yielding $$F_{peak} = \frac{K_1 \Theta_1 + F_{21}(\cos(\phi_{21})x_1 + \sin(\phi_{21})(\gamma_1 l \sin(\beta_1)))}{\cos(\phi_{10})x_1 + \sin(\phi_{10})\gamma_1 l \sin(\beta_1)} \quad (39)$$

To then arrive at an expression for EI (flexural stiffness), an expression for K can first be derived. Since $K_\Theta$ and $\gamma$ each may not vary much over a vast range of $\phi$, the assumption that each beam possesses the same K can be held. Under this simplifying assumption, each beam's resistive force expression can be expressed as $F_{i,i-x}/K$.

Accordingly, the first beam's resistive force expression becomes $$\frac{F_{peak}}{K} = \frac{\Theta_1 + \frac{F_{21}}{K}(\cos(\phi_{21})x_1 + \sin(\phi_{21})(\gamma_1 l \sin(\beta_1)))}{\cos(\phi_{10})x_1 + \sin(\phi_{10})\gamma_1 l \sin(\beta_1)}, \quad (40)$$

where $$\frac{F_{21}}{K}$$

remains on the right side since its value can be substituted in.

Rearranging for K then provides $$K = \frac{F_{peak}(\cos(\phi_{10})x_1 + \sin(\phi_{10})\gamma_1 l \sin(\beta_1))}{\Theta_1 + \frac{F_{21}}{K}(\cos(\phi_{21})x_1 + \sin(\phi_{21})(\gamma_1 l \sin(\beta_1)))} \quad (41)$$

which can be inserted into Eq. (18), giving EI (flexural stiffness).

While the above equations can be derived from the perspective of the first beam's maximum deflected state at the force bar height h, this approach can be taken for simplicity. By virtually adjusting h in small increments, the equations can be implemented as a function of x. In other words, virtually placing the force bar at the beam height l initially and incrementally decreasing the force bar height until the actual h or desired deflection is reached, can result in a near continuous plot of the applied F.

Figure 7:
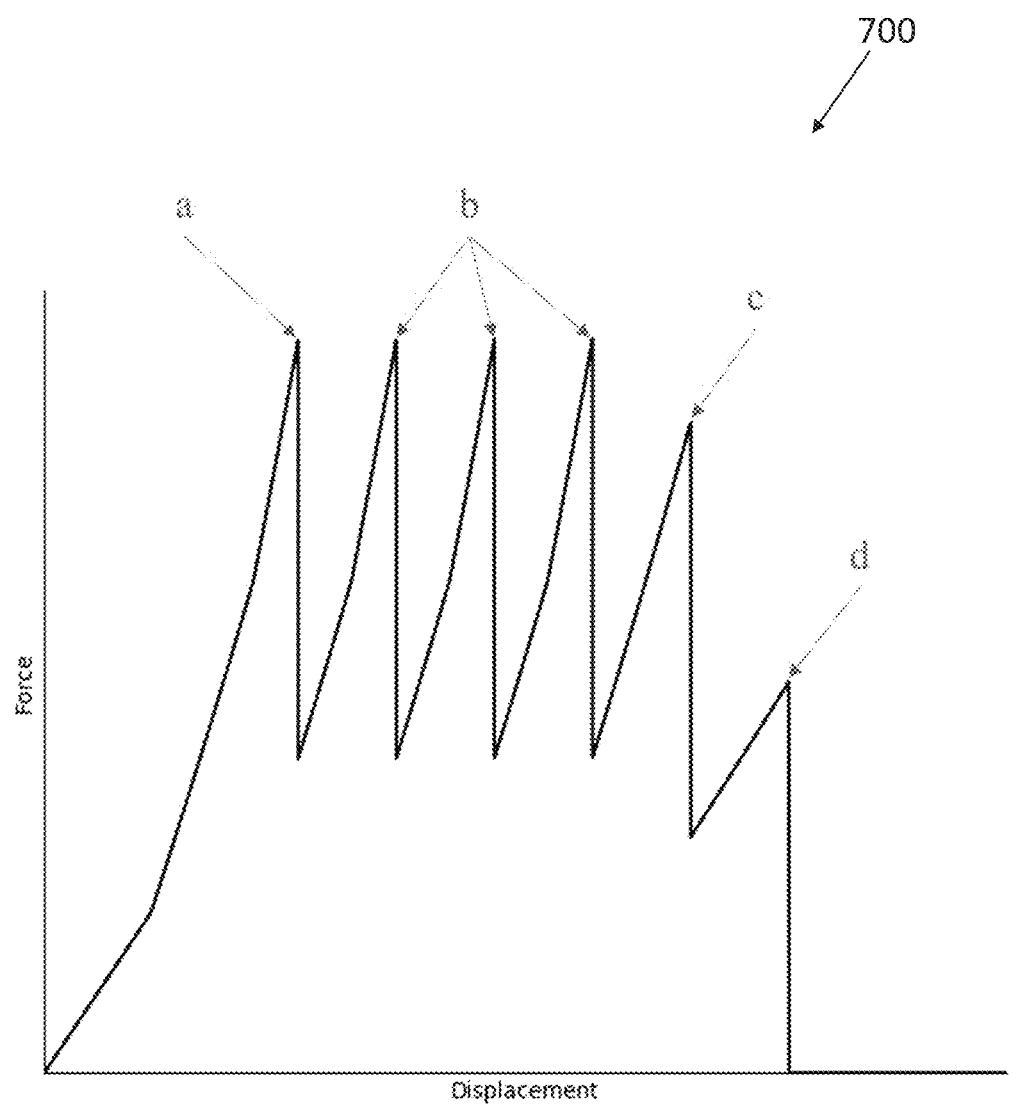
FIG. 7 is an exemplary force-displacement graph modeling the behavior of inline cantilever beams.

Plotting the reaction force F as the force bar moves across the identical beams, can result in a plot, such as the exemplary force vs. displacement plot 700 illustrated in FIG. 7. As illustrated in FIG. 8A, the force can reach an initial peak or maximum force ($F_{peak}$) when the first beam has reached its maximum deflection. Immediately after the first beam deflects under the force bar, F can sharply drop off and then continue to rise until the second beam reaches its maximum deflection, as shown in FIG. 8B. With identical beams and equal spacings, at this point, F can return to the same $F_{peak}$ seen at the first beam's maximum deflection. These equivalent $F_{peak}$ values may continue to be observed as long as the number of beams in contact at the frontmost beam's maximum deflection does not decrease. As shown in FIGS. 8C and 8D, near the end of a set of beams, the number of contacting beams can be reduced. As a result, the corresponding F peaks shown in the exemplary plot 700 of FIG. 7, can be lower than the initial $F_{peak}$. It is expected that $F_{peak}$ can occur m times, following $$m = (t+1) - u, \quad (42)$$

where t is the total number of beams and u is the maximum number of beams in contact at the frontmost beam's maximum deflection. From a system's geometry, u can be determined.

Thus, in the Interacting Model, the force response ($F_{peak}$) can be solved for if given EI (flexural stiffness), the length of the beams (l), spacing distance (s), and the height of the force bar (h). Alternatively, in use with the SOCEM embodiments discussed above, the closed-form solution can be used to solve for EI (flexural stiffness), given the force response, l, s, and h. Accordingly, the parameters and/or measurements for average stem length (l), average spacing distance between stems (s), the height of the force bar (h), and force response can be used to determine flexural stiffness indicative of lodging resistance.

Alternative or additional models can be used with the SOCEM apparatus. In the example discussed above, the Interacting Model was applied to a controlled, ideal scenario (e.g., the Interacting Model can be assessed in a scenario with constant spacing and assumed all beams had identical lengths and flexural stiffnesses, all the beams were also assumed to be fully fixed to the ground and directly inline, and each beam was assumed to have rectangular-faced geometry that guarantees interaction between beams), which may place limitations on its effectiveness in a real-world applications. In many cases, especially natural systems, the foregoing assumptions may not hold. For example, the Interacting Model may not account for loading due to the crop head/fruit (if pre-harvest), leaves interacting, and loose soil. In another example, with different beam geometry (e.g., cylindrical cantilever beams), the deflection and interaction behavior may be altered. With hollow cylinders (e.g., many types of crops), some torsional deflection, out of plane bending, and sliding may be involved.

Further, the Interacting Model may utilize a static perspective to analyze a dynamic process, such that, at higher speeds, the reliability of the model may decrease with greater inertial forces involved. Furthermore, in the Interacting Model the force bar is parallel to the face of the beams, however, other force bar orientations may occur in the field and may result in different mechanics and force responses.

To address the foregoing issues, alternate or additional models can be utilized. For example, an additional PRBM model can be utilized in which interactions are eliminated by assuming no contact for any spacing or deflection (i.e., A Multiple Non-Interacting Cantilever Beam Model, hereinafter Non-Interacting Model). In essence, a closed-form solution of the Non-Interacting Model can assess the location of each beam's load at the frontmost beam's maximum deflection (i.e., immediately prior to passing under the force bar). Summing each beam's force response can allow for predictions of $F_{peak}$ and/or EI. In some implementations, the Non-Interacting Model can be utilized to assess $F_{peak}$ and/or EI. In some implementations, both the Interacting Model and Non-Interacting Model can simultaneously be assessed for crop systems with unknown or varying levels of interactions. This refers to systems in which beams are partially in-line with each other, and results for EI or $F_{peak}$ are likely to be somewhere between the Interacting and Non-Interacting predictions. Accordingly, an appropriate model or combination of models may be selected for a specific crop depending on one or more crop features of crop environment, such as e.g., density, stage of growth, time of day, temperature, humidity, shape of stems, type of crop, etc.

However, while a more accurate and/or complete model or combination of models can be developed (see Additional Embodiments and Implementations, discussed below), the relative simplicity the Interacting Model and/or the Non-Interacting Model can allow for easy adoption in SOCEM applications. For example, having just four input parameters (s, l, h, $F_{peak}$ or EI) can enable relatively accurate predictions in high throughput applications. Further, agricultural crops are normally arranged in multiple rows, and the Interacting Model and/or the Non-Interacting Model can be applied to when multiple rows contact the force bar. For example, the measured force can be divided by the number of rows acting upon the force bar. An average s and l can be determined as inputs. The ability to evaluate multiple rows at once may be advantageous as it allows for a large sample size and produces an easily detectable force response.

In terms of measuring EI, the Interacting Model and/or the Non-Interacting Model can be applied to a natural system using the exemplary embodiments of the apparatus disclosed herein. Many models of natural systems exist but are often too complex to be implemented in applications or field devices. Known models can require numerous input parameters, fail to account for interactions, and/or require elliptical integration or numerical methods. The Interacting Model and/or the Non-Interacting Model presented discussed above may overlook some complex factors involved in nature, but can be used as an efficient estimation, especially in many natural systems with limited variation in geometry (e.g., spacing and length).

A reference table of nomenclature can be found in Appendix A.

V. Exemplary Methods of Operation and Data Collection Analysis

Figure 9:
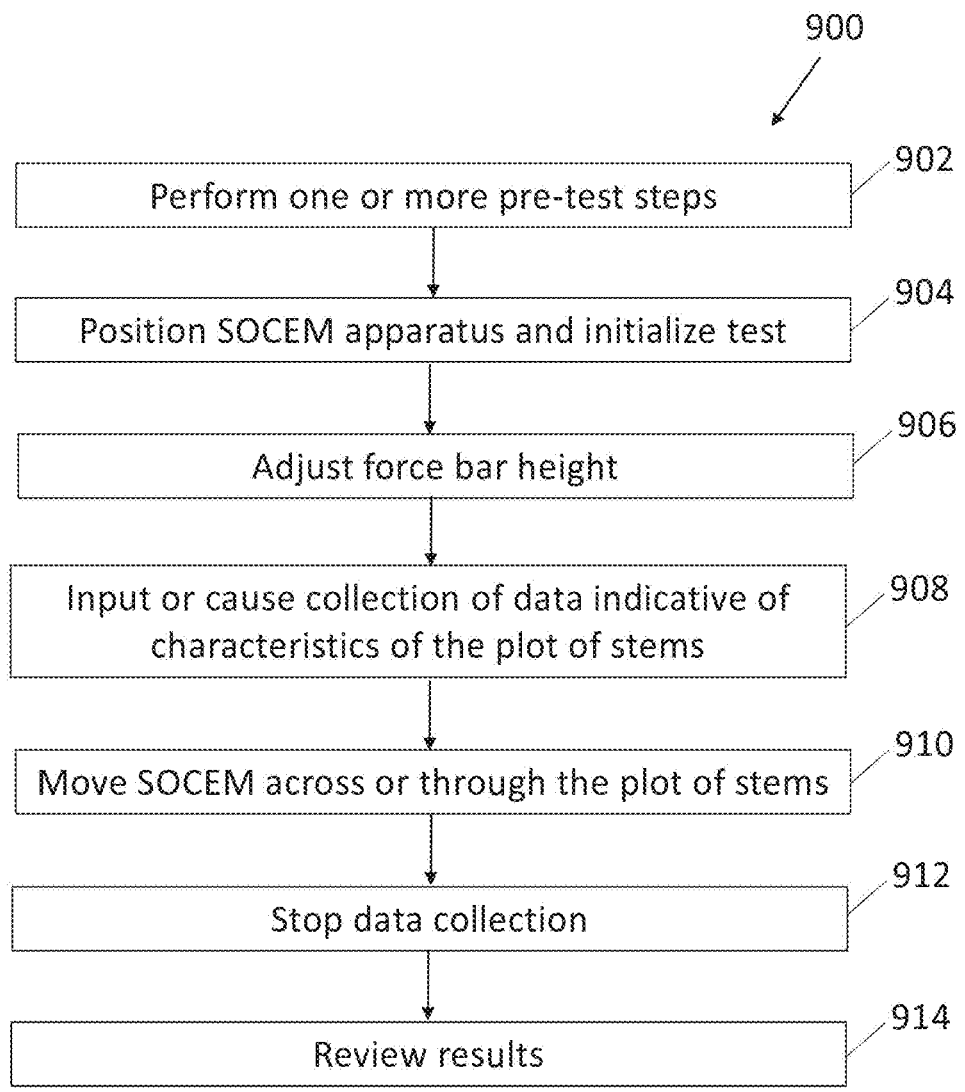
FIG. 9 is a logical flow diagram for operation of an exemplary crop lodging resistance measurement apparatus as disclosed herein.
Figure 10:
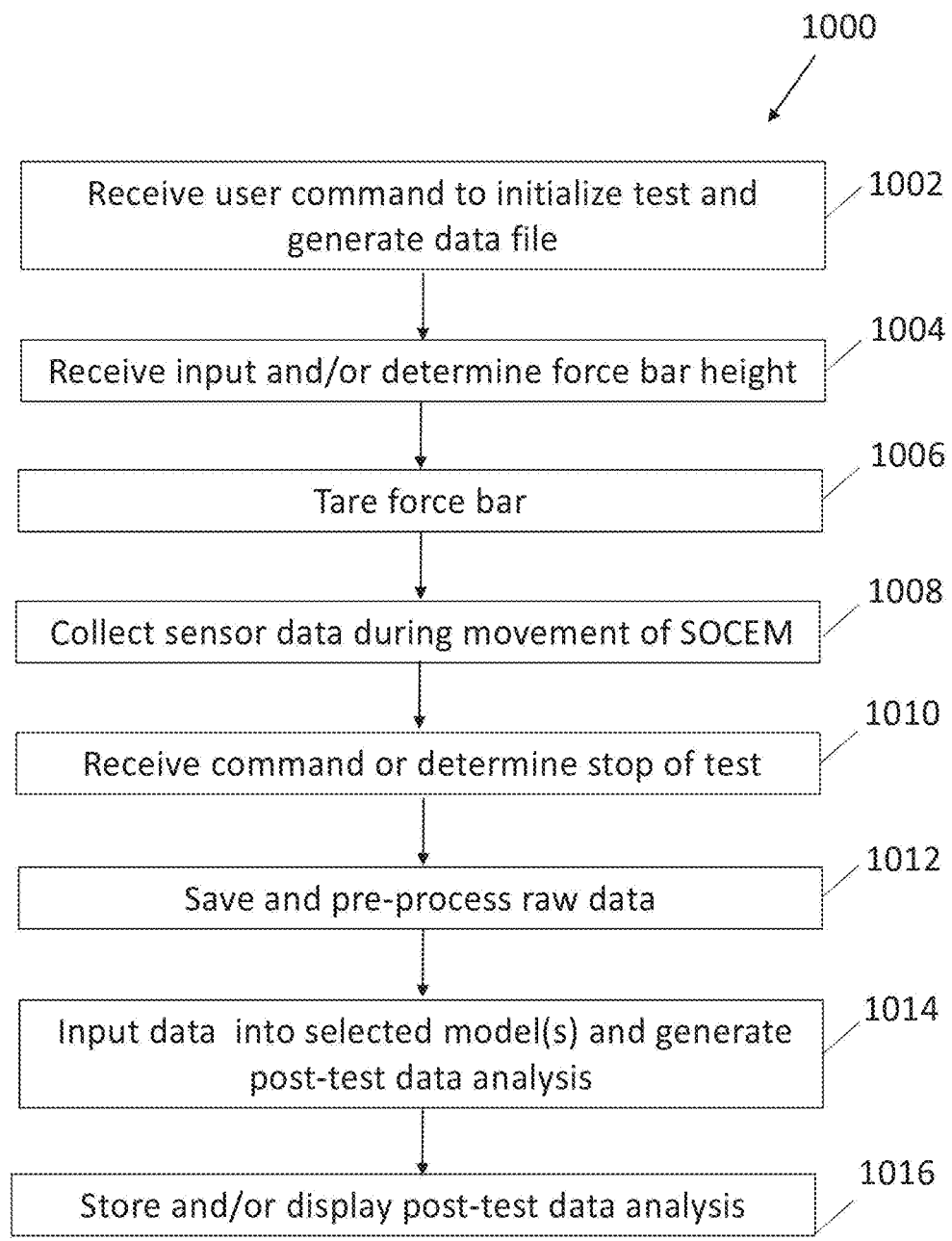
FIG. 10 is a logical flow diagram for operating a processor in communication with the exemplary crop lodging resistance measurement apparatus as disclosed herein.

An exemplary embodiment of a method 900 for operation and use of an SOCEM apparatus is illustrated in FIG. 9. an exemplary software method 1000 for data collection and analysis is illustrated in FIG. 10.

At step 902, prior to testing a plot, one or more pre-test steps can be performed. For example, to eliminate an edge effect (i.e., effect or error caused by measuring stems at edges of the plot having differing environmental conditions, such as access to sunlight, water, and nutrients, as well as stem density, etc.), rows along the sides of a plot can be excluded from the test sample. Accordingly, if needed, the side rows should be adjusted or stems moved out of the way, so that they do not contact the force bar during testing. Alternatively, as discussed below with respect to method 1000, edge data can be automatically excluded from analysis. In another example, any debris in the test plot can be removed prior to testing to prevent interference with the plot's force resistance. In yet another example, at the start of each test, the force sensor can be tared after confirming nothing is in contact with the force bar such that any residual force acting on the force bar can be deducted from a gross measurement to produce a net force measurement.

At step 904, the SOCEM apparatus can be positioned at the front of a plot of stems to be tested (as shown in FIG. 3A). On the testing screen, the user can optionally input test information, such as the name of the data file to be saved to and/or an identity of the plot of stems.

Per step 906, to load stems more naturally and improve accuracy, the force bar can be adjusted so that it is within a specified range of the overall height, such as within 70-90% of the height of most stems. Remaining within these limits can, for example, reduce potential error in the flexural rigidity calculations. In implementations, the force bar can be manually adjusted. In other implementations, the force bar can be configured for automated height adjustment, such as via a hydraulic motor, a stepper motor, or other motor configured for adjustment of the height bar. Optionally, the force bar can be tared after adjustment of its height.

Per step 908, data related to one or more characteristics of the plot of stems, such as data indicative of the average height/length of the stems, the number of rows of stems that will contact the force bar, and/or the average spacing between stems can be input and/or collected. In implementations, a user can manually determine the average height/length of the stems, the number of rows of stems that will contact the force bar, and the average spacing between stems, and enter the values via the GUI. For example, the plot may have been previously harvested by a harvest combine, and therefore the height of neighboring clusters of stems should be similar. A sample row from each plot can be selected in which the height of a cluster of stems was measured at specified increments, such as approximately every 50 cm. The mean plot height can then be computed to be used as the input for calculations. In another example, to obtain an estimation of the average spacing, a portion of the contact rows (e.g., half the number of contact rows) can be examined for sampling counts. In approximately the center of a plot, the number of stems in a 100 cm stretch can be counted for each sampling row. The 100 cm can then be divided by the average number of stems to provide an estimation for the average spacing. This value can then be used as a calculation input.

In other implementations, the average height/length of the stems, the number of rows of stems that will contact the force bar, and the average spacing between stems can be detected and determined utilizing one or more sensors or cameras associated with and/or in communication with the SOCEM (discussed further below, see Additional Embodiments and Implementations), and the user can input a command to collect the data, or the data can be automatically collected during operation of the SOCEM. Such autonomizing/automating the process of determining the average height/length of the stems and the average spacing between stems can rapidly decrease the total testing time, allowing for higher throughput. For example, in such implementations, data indicative of the average height/length of the stems, the number of rows of stems that will contact the force bar, and/or the average spacing between stems can be collected during movement of the SOCEM through the plot of stems, and the user can merely initialize or start a test without performing manual measurements.

Per step 910, after adjusting and taring the force sensor, and after entry of any manually measured plot characteristics, the user can press "Start" on the GUI to initiate data collection and movement the SOCEM though or across the plot of stems. The SOCEM can be manually pushed across the plot in a linear direction at a slow, steady rate. In other implementations, the SOCEM can be coupled to a vehicle. For example, the SOCEM can be coupled to a harvest combine below the cutter bar, and movement of the SOCEM is caused by or driven by movement of the combine through the plot of stems while the harvest combine is harvesting the crop. In yet other implementations, the SOCEM can include a motor (such as e.g., an electric motor) for automated movement of the through the plot of stems. In one variant, the SOCEM can be remotely controlled by an operator. In another variant, the SOCEM can be programmed to move along a predetermined route or pathway through the plot. As discussed above, force and/or other data can be collected by the SOCEM during movement thereof through the plot.

Once through the plot and after the collection of data, the user can end the test, such as via pressing a "Stop & Save" button on the GUI to end the test (step 912). The process can be repeated for testing of other plots or other areas of the same plot.

A plot may be tested only once with the SOCEM, as testing can alter the system's geometry (e.g., angled stems) and/or the force response. In other implementations, the plot can be tested periodically, such as over a period where stems may return to their original positions, which can enable testing of the identical plot over multiple temporal and/or environmental conditions (e.g., morning, evening, spring, summer, etc.).

Per step 914, the user can then store, view and/or review results from the test(s). In certain embodiments, two data files can be viewed after testing. For example, a first file can be a raw data file in a Microsoft Excel file or other spreadsheet or data table, which includes measurements or input for force bar height, average stem height, average spacing estimation, elapsed time, force, and/or displacement. In another example, a second file can include automatic post-test data analysis and a force-displacement graph. Further, the automatic post-test data analysis can include calculations of sampling rate, maximum force, mean force, median force, average test speed, and/or multiple flexural stiffness estimations. In one exemplary implementation, utilizing the foregoing force and displacement sensors, data is recorded at approximately 80 Hz.

Turning now to FIG. 10, an exemplary software method 1000 is disclosed. It will be appreciated that the exemplary method 1000 can be implemented via processing logic which is stored as computer-executable code, along with e.g., the exemplary Interacting and Non-Interacting data models and/or other data models that can be stored in memory associated with or in communication with the on-board processor of the SOCEM or another processor (such as a process of a computerized user device). The code may be stored in memory of a single computerized device or can be stored in memory across multiple computerized devices.

First, at step 1002, the processor receives a command to initiate testing. As discussed above, a user can utilize the GUI to input a "Start" command, and may additionally input identifying data, such as a name of a plot or a plot location. In implementations including a GPS system, GPS data can be collected and saved, and utilized as identifying data for the plot/test. Further, the processor may add a timestamp or other metadata to the initiated test data file.

Per step 1004, the processor collects and saves data related to the force bar height. In manual implementations, the processor can receive a user input indicative of the force bar height. Further, in manual implementations, the processor may receive input from the user related to one or more characteristics of the plot of stems, such as data indicative of the average height/length of the stems, the number of rows of stems that will contact the force bar, and/or the average spacing between stems. In automated implementations, the processor may receive sensor data indicating the height of the force bar, or the processor may cause the force bar to be automatically adjusted to a desired height.

At step 1006, the processor causes the force bar to be tared, which can include determining any (background) signal detected by the force bar sensor so that the background signal can be deducted from a gross measurement to produce a net force measurement during data collection or in post-collection data processing. The force bar may be automatically tared upon initiating a test and/or after adjusting the height of the force bar.

Per step 1008, the processor can collect data from sensors in communication therewith prior to and/or as the SOCEM is moved through the plot of stems. As discussed above, the focal measurement obtained from the SOCEM test data can be an estimation of the average stem flexural rigidity or EI. To account for a number of stems and interactions among neighboring stems the Interacting Model (which includes four input parameters: peak force, stem length, force bar height, and spacing distance,) may be utilized. Accordingly, data related to peak force can be collected from the force bar sensor during movement of the SOCEM through the plot of stems. Further, in automated implementations, additional sensors can generate signals and enable data collection for one or more other parameters (e.g., stem length, force bar height, and spacing distance) during operation of the SOCEM. Such data collection can continue until it is determined that the test is complete (step 1010), such as via receipt of a user command to stop the test, or determining that a criteria for stopping has been met (e.g., determining a specified distance for movement of the SOCEM has been met, determining that a statistically relevant amount of data has been collected, etc.).

Per step 1012, the raw data can be pre-processed and saved, such as being stored in on-board memory or memory associated with a computerized user device or a network location. For example, before determining the peak force, data from the edge of the plot can be excluded or removed to prevent distortion due to the "edge effect." As discussed above, the edge effect enables crops on the edges of the plots to have greater growth, often resulting in different phenotypes (e.g., stronger resistance and taller crops) than the majority of the plot. Therefore, the data from the first and/or the end of the plot can be removed, such as removing data from the first and last 50 cm of a plot. In another example, in implementations, whether collected manually or automatically, the stem length, force bar height, and spacing can be pre-processed to determine averages of the measurements. The most distinguishable force peaks from the force-per-row displacement plots can then be identified and averaged. This can be done manually or automatically through software (e.g., PeakUtils Python library).

Figure 11:
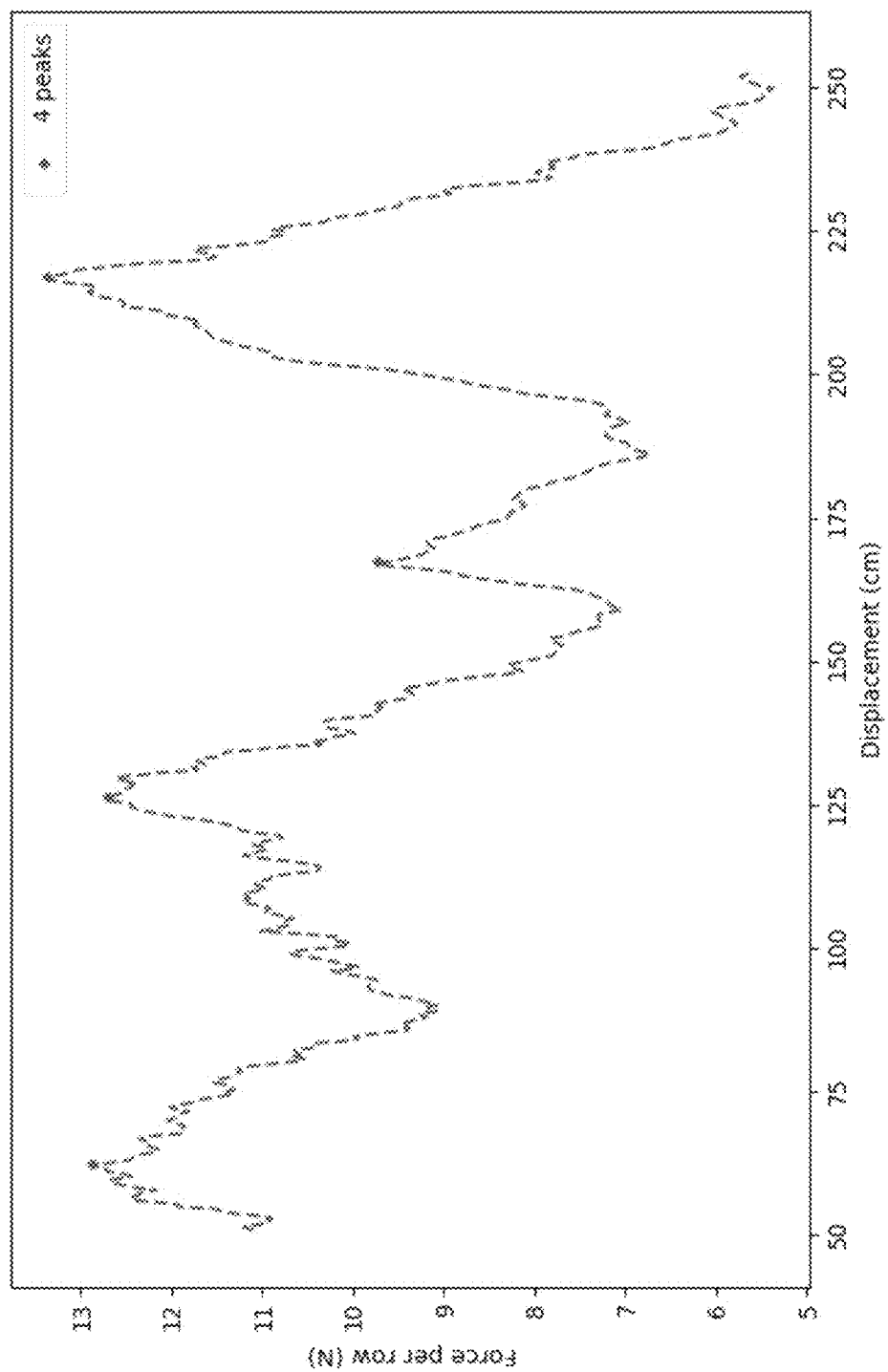
FIG. 11 is an exemplary force-displacement graph that can be generated for estimating flexural rigidity utilizing the exemplary crop lodging resistance measurement apparatus disclosed herein.

Per step 1014, the pre-processed data can then be input into one or more models to determine an estimation of the average stem flexural rigidity (EI), and post-test data analyses can be generated therefrom. To obtain the peak force from the force-displacement data (such as the exemplary plot shown in FIG. 11), one or more steps may be required. For example, the model assesses a single row so the force response of a single row can be examined to obtain the average peak force. Dividing the SOCEM force measurements by the number of contact rows can provide the desired force response, and inputting the force bar height and averages from the peak force, stem length or height, and spacing distance into programming or a script (e.g., a Python script) that encodes the model can enable calculation of an estimated average stem EI for a given plot. Further, as stems can be randomly configured and the amount of interaction between stems can vary, the above process can be repeated using the Non-Interacting Model, which utilizes the same four inputs. An additional estimated average stem EI can then be generated from the Non-Interacting model, and the two EI estimations from the Interacting Model and Non-Interacting Model can then be averaged together.

Finally, at step 1016, the post-test data analysis can be stored in memory (e.g., in on-board memory or memory associated with a computerized user device or a network location). Further, the data analysis can be displayed on a display device (e.g., on the GUI or a display device of a computerized user device) such that it is viewable by a user.

It will be appreciated that, in alternate embodiments, the methods for operation and data analysis can include more or fewer steps. For example, the raw force displacement data obtained from the SOCEM can just be averaged as an estimate of lodging resistance. Alternatively, the area under the force displacement curve could be calculated to provide an estimate of the energy required to displace the stalks.

The SOCEM can be moved across a plot both parallel to the rows and perpendicular to a row's direction. Combining data from perpendicular and parallel directions can then be post-processed to estimate the stiffness of each row as a function of distance. Conversely, if a user only traverses a plot once, then only the average strength of all rows included in the tests can be estimated. Higher spatial resolution of force data can be obtained by traversing a plot in both parallel and perpendicular directions.

VI. Additional Embodiments and Implementations

As discussed above, in embodiments, the SOCEM apparatus disclosed herein can include additional sensors in communication with a microcontroller (or other processor apparatus) for collection of data. For example, in implementations, the force bar system can have a different design. From a design failure mode and effects analysis, the FUTEK S-beam load-cell of the force bar may system possess the highest risk priority number (combined weighting of severity, likelihood, and detectability). Further, the load-cell is the most expensive and critical component of the SOCEM's primary function (obtaining resistance force measurements). During transportation, it is at risk of breaking if its maximum load capacity is exceeded (e.g., dropping the SOCEM, insecure transportation). Thus, to reduce failure risk and potential erroneous measurements, a mechanism to absorb any load during non-testing times to protect the load cell from overload. For example, a protective bar on a locking hinge to rotate in front of the force bar during transportation can be utilized.

In an additional or alternate implementation, the force bar can include multiple bars (e.g., four bars) arranged horizontally in a series with spaced between adjacent bars. Such an implementation may increase accuracy of force bar data, as the stems are deflected several times during collection of force resistance signals.

When conducting mechanical tests on biological materials it is common practice to precondition the sample before acquiring mechanical test data. The samples are preconditioned by flexing or stretching them several times without inducing any permanent damage. This is done because biological samples typically reach a steady state response that is more repeatable after they have been preconditioned. This makes comparing the results from different samples more accurate. The SOCEM can be used to precondition crop stems by passing over the same plot multiple times. Data obtained from multiple passes over the same plot can also be used to characterize viscoelastic material behavior. See, FIG. 32.

Rather than make multiple passes over the same plot, the SOCEM can be modified to include multiple force bars. Some force bars may not need load cells attached and could be used purely to pre-condition the plot. Alternatively, each bar also could have a load cell attached and the data collected could be used to characterize viscoelasticity, damage to the plot, or to optimize the height of the force bar. That is, the force bars could be raised until a steady state force response is obtained so that each force bar provides substantially the same values. Implementing multiple force bars on a SOCEM saves time as compared to having a single force bar as the user would only have to move the SOCEM across the plot once instead of multiple times.

When the SOCEM force bar contacts crop stems, these stems provide a force response to the load cells. If the plot is tested again with the same SOCEM configuration, the force almost always decreases relative to the initial run. Moreover, the height setting of the force bar (e.g., 90% height of the stems versus 70% height of the stems) impacts how much the force response is reduced from one test to the next. Studying the relationship between the force output of subsequent passes allows the viscoelastic behavior of crop stems to be characterize and investigated.

Figure 32:
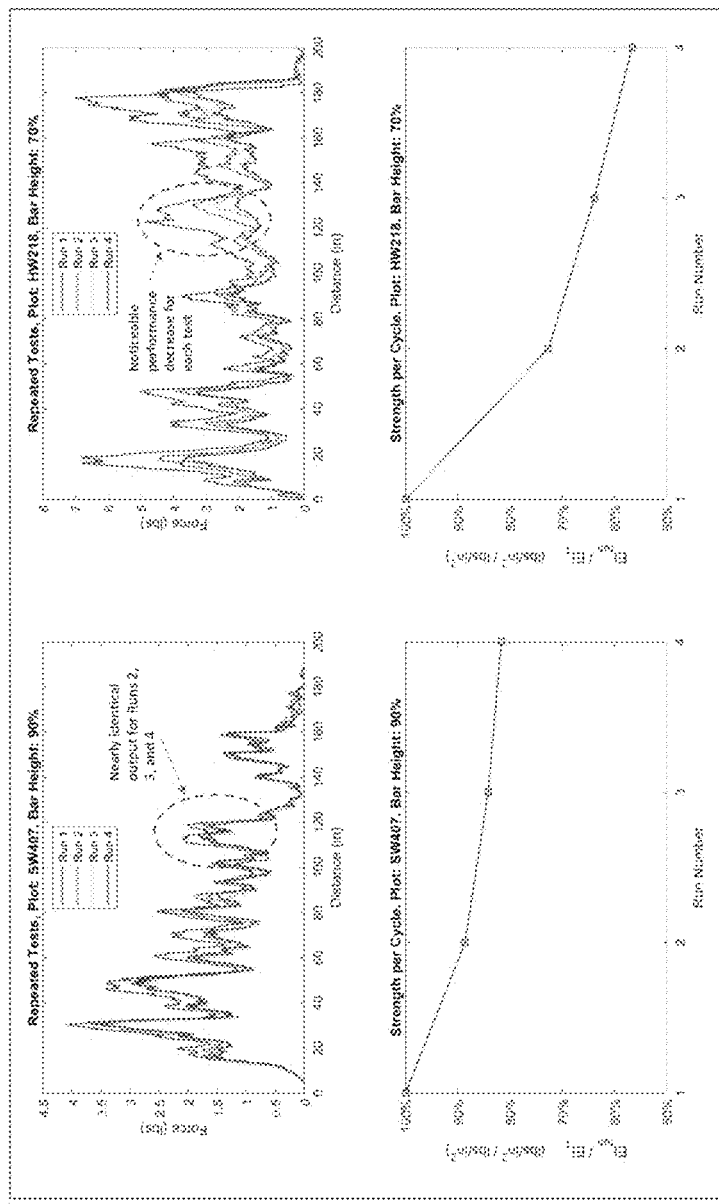
FIG. 32 provides graphs of data for repeated tests [force (lbs.) vs. distance (inches)] at different force bar heights, and corresponding strength per cycle graphs [run number vs. $EI_{run}/EI_1$ (lbs/in$^2$/lbs/in$^2$)].

Increasing the force bar contact height to approximately 90% of the average plot height results in less permanent damage to the stems in the plot and provides a more repeatable force response. While repeated plant testing is useful, it should not be done aggressively at heights lower than 70% of the plot height, because this can substantially decrease the performance of the plot. FIG. 32 displays force response behavior in two different wheat plots tested in August 2021. The wheat plot for which a lower percentage height setting (70%) was used displays a noticeable strength performance decrease with each pass. In this case, the strength performance of the plant is reduced by almost 50% after four cycles. The wheat plot for which a greater percentage height setting (90%) was used achieved a near-steady state in terms of strength performance, with over 80% strength still displayed after four passes with the SOCEM.

As described above, the closed-form solution may be sensitive to the ratio of the force bar height to beam/stem height, meaning that errors in either measurement can contribute to error in EI predictions. To reduce the chance of error, the force bar height measurement can be made as accurately as possible. In some implementations, a user adjusts the force bar height via two 80/20 linear bearing sliders, allowing for a selected height to be set within a continuous range. The user can then read the indicated $\frac{1}{16}$, inch ruler and input the reading into the SOCEM GUI. The user can also confirm the force bar is level using a separate level tool. While, in some implementations, a level can be attached to the SOCEM, other mechanisms can be used to further reduce measurement error and user effort. For example, in implementations, the force bar can be configured such that push-button spring pins are used to adjust the force bar height to known, discrete level heights. Accordingly, a user can then simply enter a force bar label number into the GUI and/or the process can be automated with sensors (e.g., potentiometer, photogates), thereby providing an easier experience for users and reducing user input error of the force bar height, which can effectively reduce error in EI measurements.

In implementations, depending if a multi-beam end angle correction factor is developed for the closed-form solution, a bi-axial load cell can be used to reduce erroneous EI. As discussed above, as deflections increase, error in EI predictions significantly increase due to inaccurate estimations of F from its $F_x$ estimation. This can be a considerable issue for the SOCEM if $F_x$ is measured only with the single-axis load cell. Replacing the load-cell with one capable of measuring both $F_x$ and $F_y$ may allow for an accurate determination of F and may increase the effective range of the closed-form solution and force bar.

While measuring stem height manually (as described above) is relatively easy and quick, in alternate implementations, such measurements can be automated. For example, two ultrasonic and LiDAR sensors can be positioned at a known height above stems, sending signals down to be rebounded by the tops of stems. Using time of flight, the distance can be measured to extrapolate crop height measurements.

Figure 12:
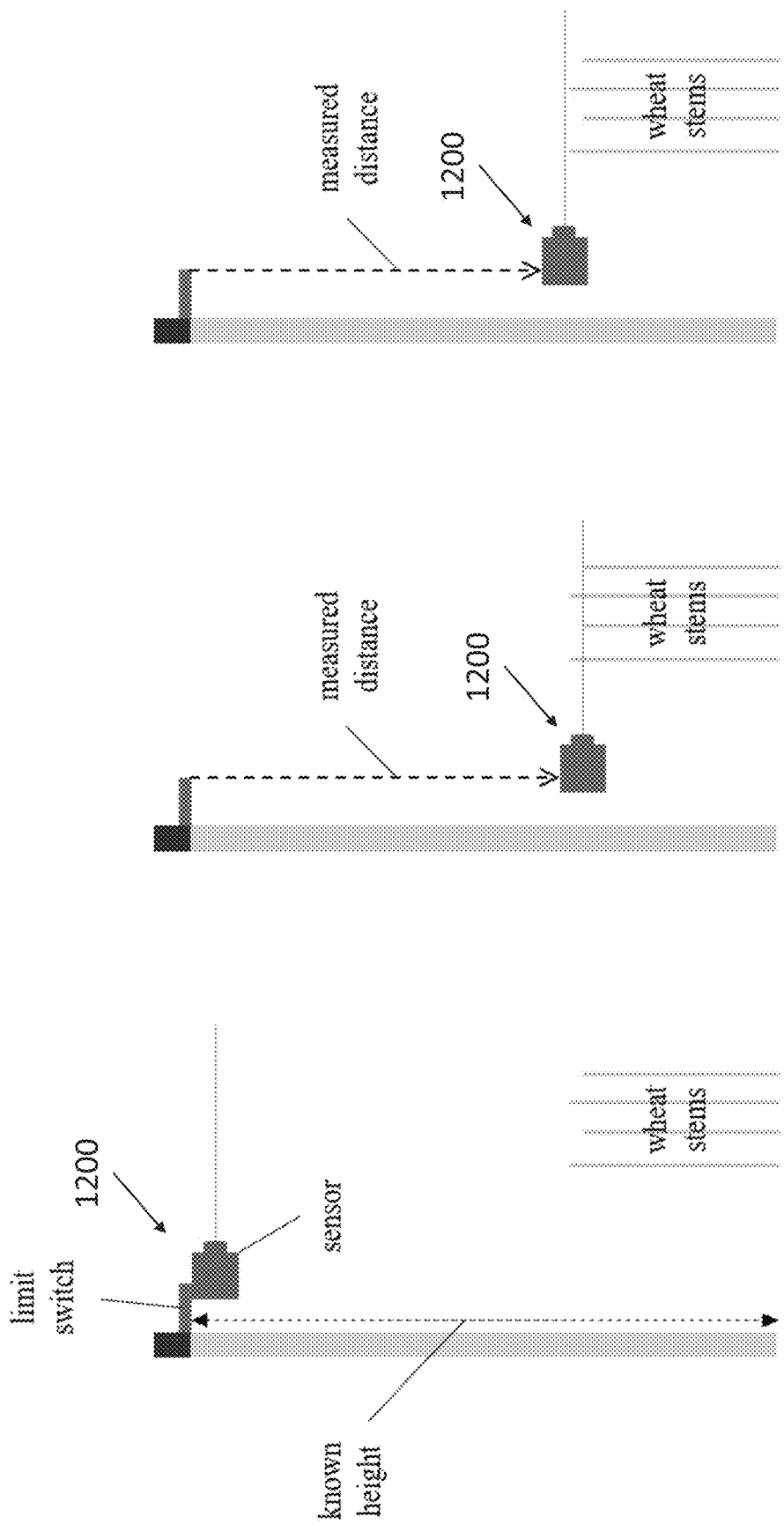
FIGS. 12A-12C are schematic side views of an exemplary height sensor that can be associated with exemplary embodiments of a crop lodging resistance measurement apparatus as disclosed herein.

In other implementations, an ultrasonic, LiDAR, and photogate sensor 1200 (depicted in FIGS. 12A-12C) can be utilized. Using sensor 1200, a stepper motor can first drive a horizontally orientated sensor upward via a timing belt until a limit switch, at a known height above all stems, is hit (FIG. 12A). The stepper motor can then lower the sensor until it detects tops of stems (FIG. 12B). As the SOCEM moves through a plot, the sensor can be adjusted (e.g., lowered and/or raised) to remain at the top of the row of stems (FIG. 12C). The sensor 1200 may be affected by how much obstruction the stems cause (i.e., how dense the stems are). Orientating the sensor 1200 at an angle to view both the front and side of a row of stems may improve the ability of the sensor to detect stem height.

Alternatively or additionally, in implementations, a photogate sensor can be utilized. For example, including a series of several IR beams may allow the photogate sensor to properly update its position, where the control algorithm lowers the sensor if all IR beams are unblocked and otherwise raises the sensor. However, an additional battery pack to operate the stepper motor may be required, and the additional moving parts may increase the potential of SOCEM apparatus failure.

In implementations, an alternative mechanism, which excludes a moving sensor, can include an advanced LiDAR sensor configured to obtain point cloud data from a top view. However, such implementations may be more accurate in dense, pre-harvested plots. A reduction in accuracy may occur if testing post-harvested plots (with just stems). Additionally, such a sensor may be expensive and/or the data collected may be difficult to analyze due to its sheer size. It may be possible to limit the sampling rate and only assess the greatest heights obtained in the point cloud to reduce the size of the data set. Despite the cost and increase in computation, the advanced LiDAR may enable finer control of the force bar height and improve accuracy of EI data, as the closed-form solution is sensitive to the ratio of the force bar height to the stem length.

Figure 13:
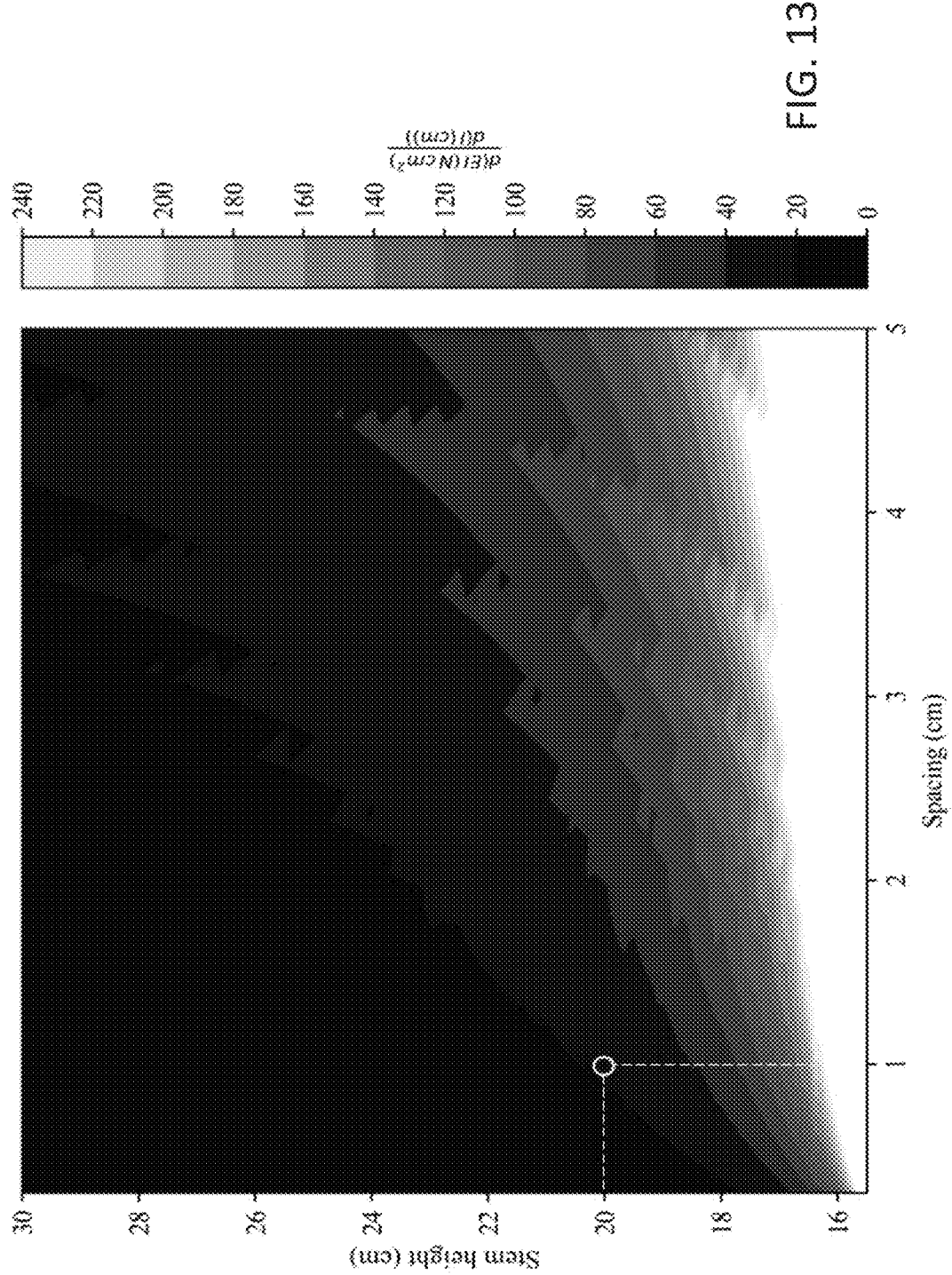
FIG. 13 illustrates a contour plot of an exemplary numerical derivative of the closed-form solutions EI with respect to stem length across realistic stem heights (or lengths) and a realistic stem spacing range observed within experimental wheat plots.

FIG. 13 shows one specific example of the numerical derivative of the closed-form solutions EI with respect to stem length across realistic stem heights (or lengths) and a realistic stem spacing range observed within experimental wheat plots. In this example, the force bar height was constant at 15 cm and the inputted force peak was 10 N. From the tests of 70 wheat plots, a typical spacing estimation was about 1 cm. At a spacing of 1 cm and an estimated stem height of 20 cm (h/l=0.75), each centimeter off of the true stem length can affect EI estimations by about 20 N cm$^2$, assuming the force bar height, spacing, and peak force measurements were exact. At greater h/l ratios, spacings, and forces, errors in stem height measurements can have even greater influence on EI estimations. For wheat stems, when the difference between lodging prone and resistance varieties is only about 110 N cm$^2$, erroneous h/l estimations could be significant.

Figure 14:
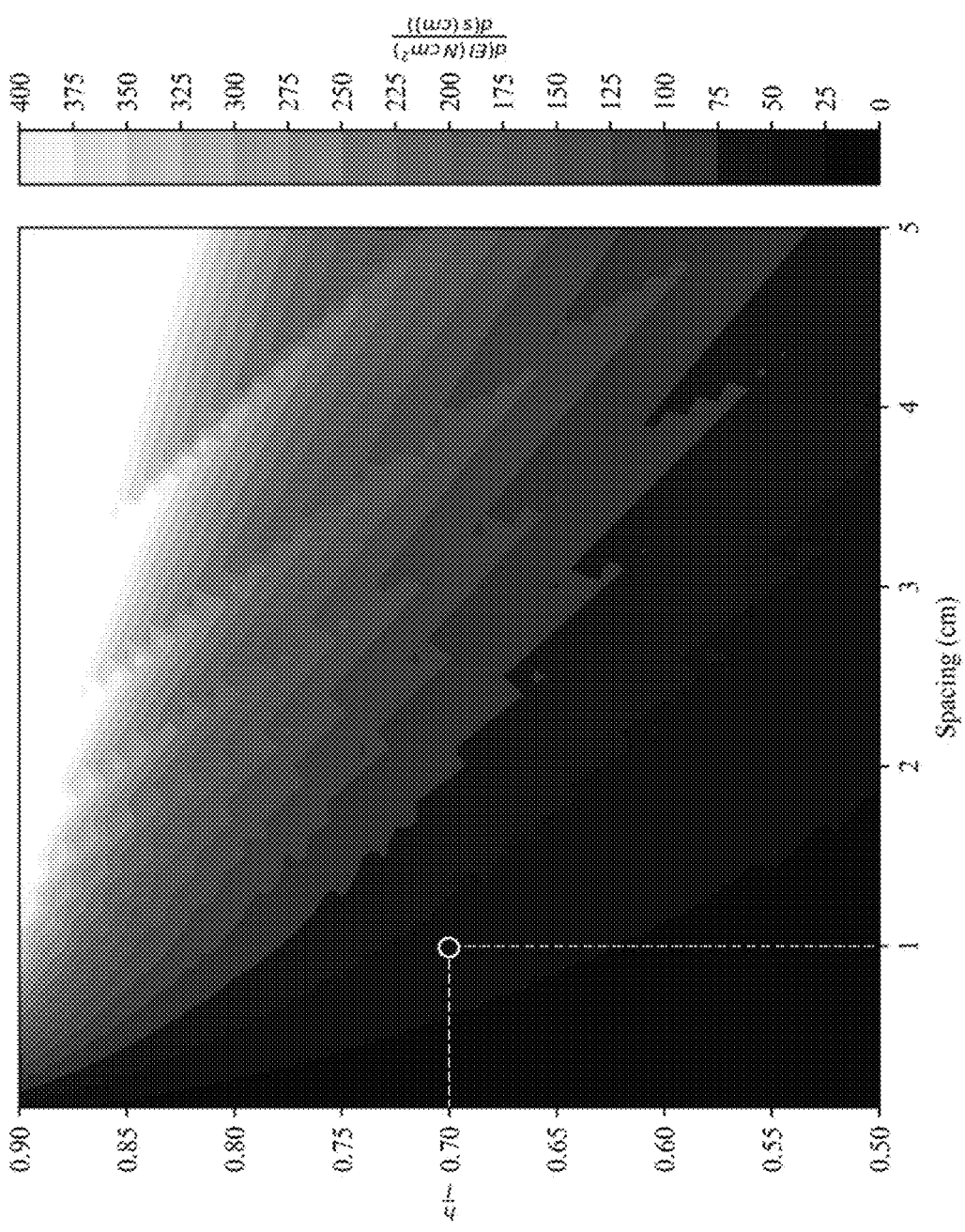
FIG. 14 illustrates a contour plot of an exemplary numerical derivative of the closed-form solutions EI with respect to spacing across ratios of force bar height to stem length (h/l) and a realistic stem spacing range observed within experimental wheat plots.

In implementations, sensors to estimate the spacing between stems can be included in the SOCEM. Manual methods of counting stems within a 100 cm stretch can be slow and tedious and/or create a bottleneck in the testing process. Sensors to automate measurements to estimate spacing may increase the rate of testing significantly, and thereby increase throughput. Further, such sensors may increase the accuracy of the spacing estimations, which would thereby increase EI estimation accuracy. In one example, FIG. 14 illustrates the numerical derivative of the closed-form solutions EI with respect to spacing across ratios of force bar height to stem length (h/l) and a realistic stem spacing range observed within experimental wheat plots. The stem length and force peak were held constant at 20 cm and 10 N, respectively. At a typical spacing of 1 cm, with a h/l of 0.7 (least error prone configuration within the closed-form solution limitations), each centimeter off of the true spacing, can affect EI estimations by about 40 N cm$^2$, assuming the unlikely situation of an exact h/l and peak force measurements. At greater spacings, h/l, or forces, errors in spacing estimations will have greater consequences on EI estimations. Again, with seemingly little difference between the flexural stiffness of lodging prone and resistant wheat varieties, spacing measurement errors may be reduced as much as possible.

Figure 15:
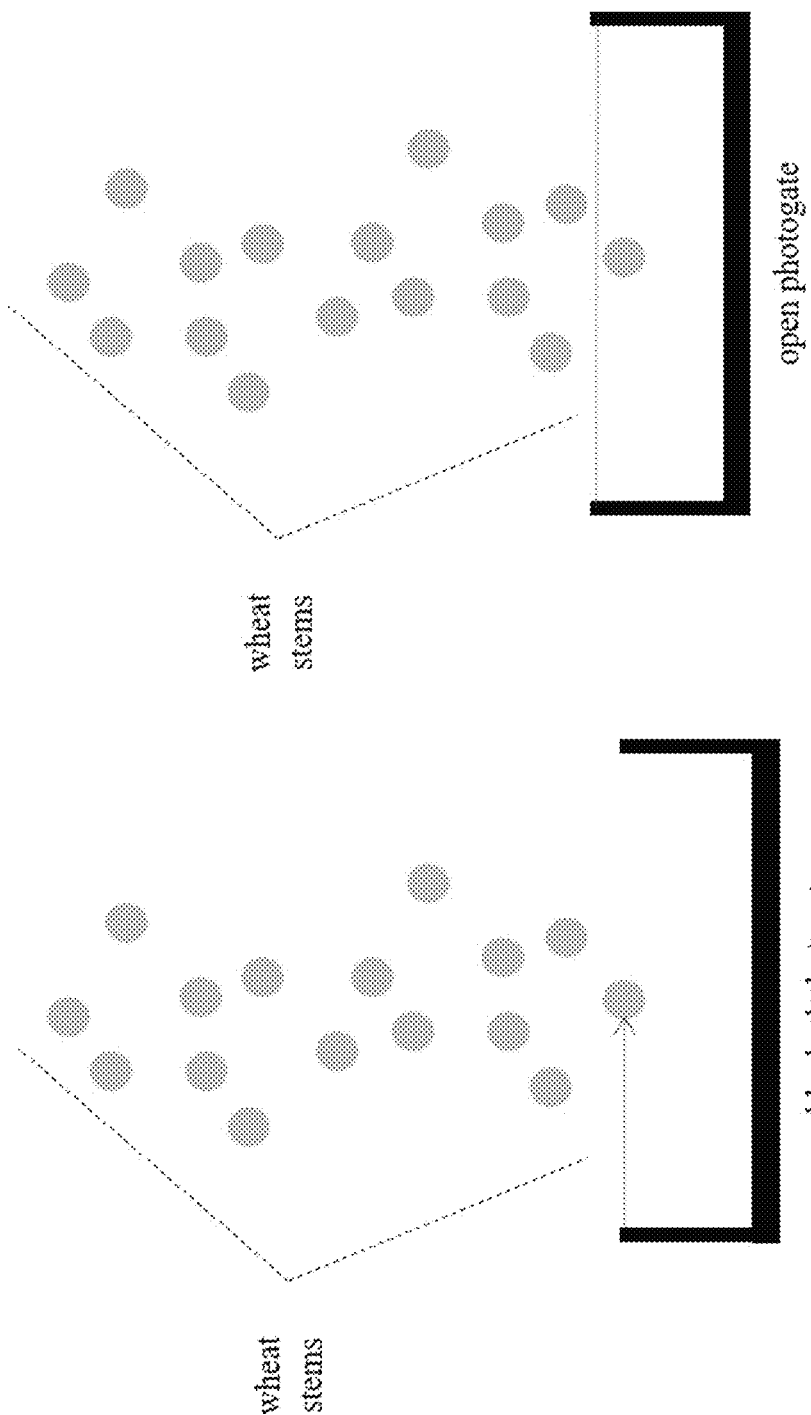
FIGS. 15A-15B are schematic top views of an exemplary photogate arrangement that can be utilized with the exemplary crop lodging resistance measurement apparatus disclosed herein.

To increase accuracy and the data collection rate, spacing estimations may be automated. In implementations, infrared (IR) photogates can be attached to the SOCEM to count stems along a row as the SOCEM moved through a plot. FIGS. 15A and 15B illustrate a photogate arrangement from a top view. The photogates' signals can be analyzed to count the number of times the IR beam was broken by stems passing through. However, such implementations may under count stems if the stems are too clustered to properly count with such a mechanism, particularly at low photogate heights (e.g., heights below the force bar). Alternatively, the photogate can be moved through a row of stems and the time the photogate is open and blocked can be recorded. To eliminate the effect of differences in SOCEM pushing speeds, the ratio of the time blocked to open can then calculated. Using linear regression, a relationship between the ratio and the beam spacing estimations from manual counts can be determined. However, the clustered orientation of the stems may affect accuracy.

In implementations, the SOCEM can include or receive data from an aerial camera system for image analysis. For example, attaching a camera to the SOCEM to obtain top view images of the stems may provide accurate spacing measurements, as well as coordinates of the stems. As discussed above, the coordinates of the stems may be utilized to determine the degree of interactions, thereby improving model accuracy. However, such implementations using high resolution RGB images may be dependent on color difference between stems and the ground, and therefore may be more applicable to for early-developed, green plants over post-harvested wheat stems due to the limited color difference between stems and the ground. While a camera system would greatly improve accuracy, sufficient processing power and data storage may be required to collect data from a camera system. Additionally, analyzing the images may slow down the EI estimation process.

As also discussed above, while the Interacting and Non-Interacting Models have been shown to be a good predictor of EI or the force response, in other embodiments, the models could be improved from a few approaches. For example, in implementations, a beam end angle correction factor for multiple beams interacting based on e and s/l can be experimentally developed and included in the model(s). This may reduce error, particularly at deflections greater than 50°. In another example, in implementations, the contact surfaces can be experimentally developed over combinations of h/l and s/l to better place point loads. In yet another example, in implementations, incorporating multiple pin joints and torsional springs into the PRBM may improve accuracy. The contact surfaces may consequently be modeled more realistically with such additions. In implementations, each beam's specific K can be incorporated, rather than assuming all are equivalent.

In still another example, in implementations, the models can be adapted for different beam geometries. With prismatic geometry, inline beams only deflect forward, guaranteeing steady contact between multiple beams, and there is no sliding out of contact. Beams with non-rectangular faces are likely to exhibit different mechanics, for example, the effect of interactions may be reduced, potentially affecting the accuracy and range of the model. Beams with solid and hollow circular cross-sections may better model natural systems, such as crops. For example, in-depth analysis, all system geometry (l, h, and s) could be fully varied. Further, a beam geometry could be targeted to a specific crop (e.g., wheat, corn, etc.), and the model could be selectable or include an input for the tested crop type to account for different geometries in the stems.

In additional or alternate implementations, the Interacting and Non-Interacting Models a multi-beam end angle correction factor. While the PRBM beam end angle is accurate for a single cantilever beam, the correction factor involved may be inadequate for multiple interacting beams. For example, additional forces due to interacting beams alters the end angle, and with greater interactions (smaller spacing and larger deflections) error in the closed-form solution can increase. Further, analyzing the horizontal force component response can yield significantly more error due to the inaccurate beam end angle utilized to estimate the total force peak. In implementations, it may be easier to measure the horizontal force component acting on a force bar. Therefore, developing a multi-beam end angle correction factor could be highly advantageous. For example, through an FEM parametric study, a correction factor (e.g., a function of deflection (or the ratio of force bar height to beam height) and beam-to-beam spacing) can be developed to improve model accuracy.

In additional or alternate implementations, in natural systems, the beams may have various placement, allowing some to be considered inline, and others not. Taking the mean or average between the Non-Interacting and Interacting Models is one approach, but the degree of interaction may be ultimately unknown. However, if the x and z coordinates (viewed aerially, see FIGS. 6A-6C) are obtained, much of the uncertainty involving the spacing and degree of interaction between beams may be eliminated. For example, a computational program may run a multi-PRBM simulation featuring beams placed at their specific coordinates. From this, the number of beams interacting with one another may be known, assuming the height of the force bar and beams remains known. Such a program may be similar to the Interacting Model but having increased accuracy, and may be useful with systems consisting of multiple rows.

VII. Experimental Validation

Figure 16:
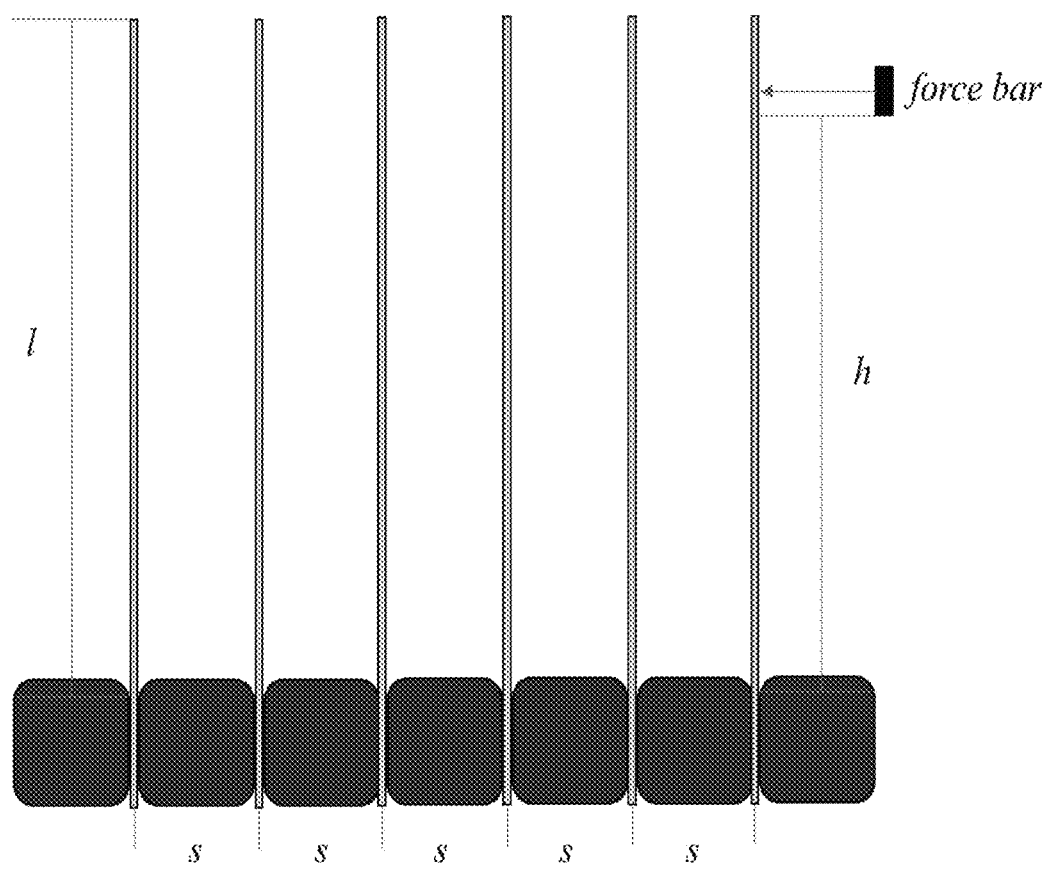
FIG. 16 is schematic illustration of plural rectangular sheet metal strips placed directly inline and utilized to validate the exemplary crop lodging resistance measurement apparatus disclosed herein.
Figure 17A:
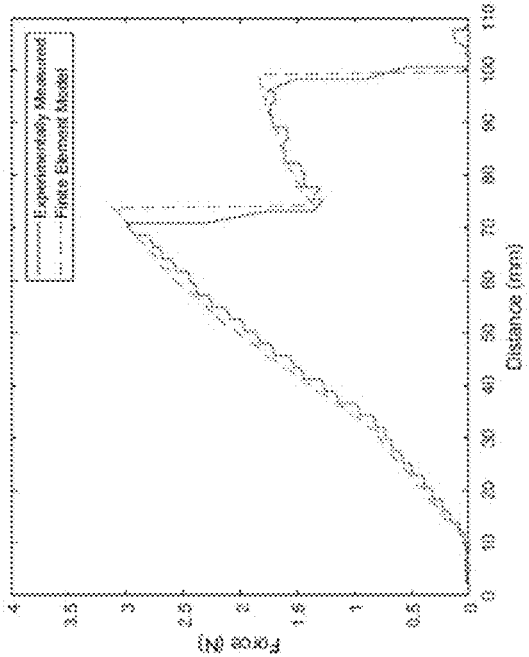
FIGS. 17A-17D are force-displacement graphs illustrating physical data obtained using one, two, three, and six beams and an embodiment of a crop lodging resistance measurement apparatus as disclosed herein.
Figure 17B:
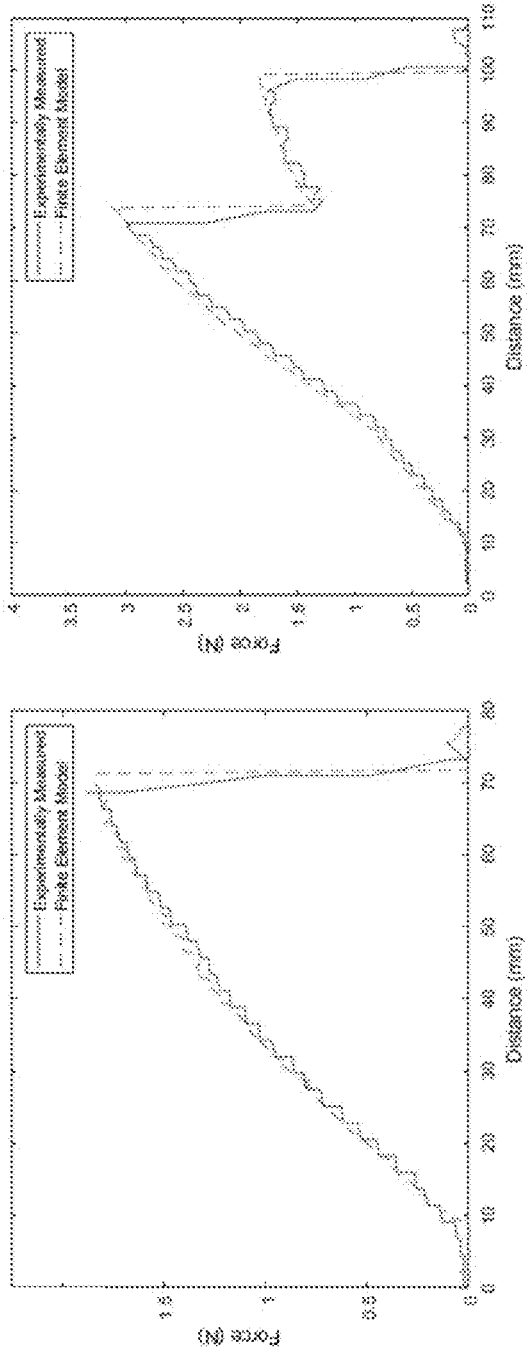
Figure 17C:
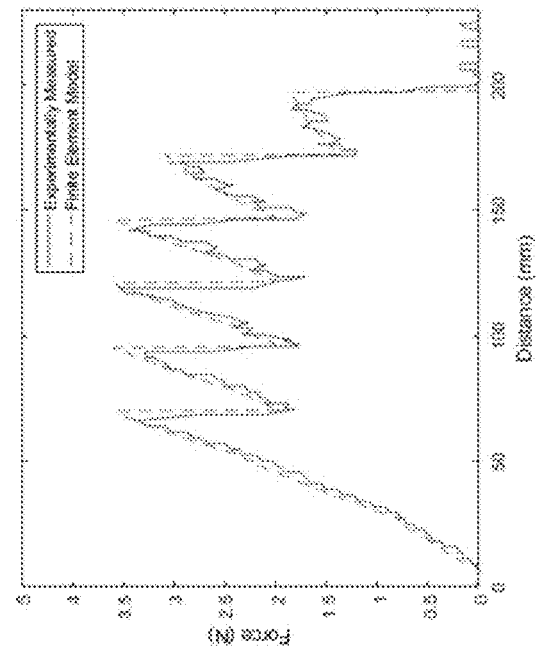
Figure 17D:
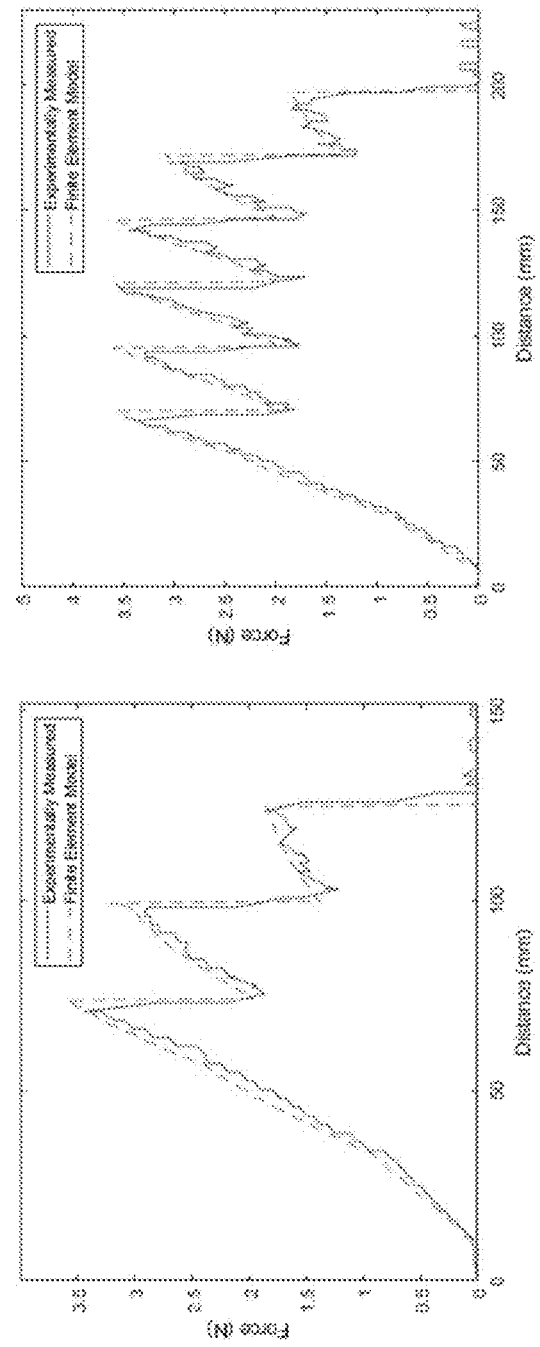

The Multiple Interacting Cantilever Beam Model PRBM solution method discussed above was validated through physical experiments. As illustrated in FIG. 16, six rectangular sheet metal strips were securely placed directly inline, and equally spaced by width s. A rectangular aluminum bar (i.e., a rigid body force bar) oriented perpendicular to the sheet metal strips at height h was attached to a load and displacement sensor. The force bar was then slowly driven across the beams, causing each beam to deflect and eventually pass under the bar. The force-displacement response of the bar was analyzed, and the closed-form solution was used to estimate the EI of the beams. Five different sets of beams underwent testing. The estimated EI values were then compared to actual EI values for each set of beams. Actual EI values were determined from three-point bending tests and calipers measurements.

The geometric and material properties of the beams were acquired as described below. Beam lengths were measured by the same individual with an imperial ruler, while the width and thickness were measured with a set of digital calipers. Four randomly selected rectangular strips cut from the same sheet metal stock, underwent individual three-point bending tests using an Instron universal testing machine (Model 5965, Instron Crop., Norwood, MA). The Instron software (Bluehill 3.0) was used for instrumentation control and data acquisition of displacement, force, and the calculation for E. All tests limited displacement to prevent yielding or other physical deformation. In particular, the supports were spaced 10 cm apart and the loading anvil was lowered at a rate of 0.13 cm s$^{-1}$. The test stopped at a beam displacement of 0.3 cm. The mean E of the four beams was then calculated and assigned to all corresponding beams cut from the same stock. A total of five sets of beams were created. Each set consisted of six beams and each set was constructed to possess a unique EI value. Table 1 displays the breakdown of EI and accompanying statistics for each set of beams.

TABLE 1

Mean Properties (±SD) of Each Set of Sheet Metal Test Beams

| Set | Material | EI (N mm$^2$) | E (N/mm$^2$) | I (mm$^4$) |
|---|---|---|---|---|
| A | Aluminum | 41900 ± 1480 | 82000 ± 2560 | 0.511 ± 0.009 |
| B | Aluminum | 63000 ± 1990 | 82000 ± 2560 | 0.769 ± 0.003 |
| C | Aluminum | 111000 ± 2820 | 79000 ± 1900 | 1.41 ± 0.011 |
| D | Steel | 154000 ± 5930 | 200000 ± 6756 | 0.772 ± 0.014 |
| E | Aluminum | 335000 ± 6000 | 74500 ± 919 | 4.49 ± 0.059 |

Each set of beams described in Table 1, were subjected to three tests with different beam to beam spacings (s). The first test had a beam to beam spacing of 19.1 mm, the second a spacing of 24.9 mm, and the third a spacing of 49.9 mm. The height of the force bar was adjusted so that the beams would not yield but they would come into contact with at least one other beam during the test. Across the 15 experiments (5 sets of beams×3 spacings) the height of the force bar ranged from 5.08-16.51 mm below the top of the beams. Table 2 summarizes the testing conditions for all 15 experimental tests.

TABLE 2

Conditions for Each Physical Experiment Test
[The Effective L and H (With Respect To The Spacing Bars) are Listed. The Expected Peaks Refer to the Number of Maximum Force Peaks that Occur for a Test With Six Beams.]

| Set | EI (N mm$^2$) | s (mm) | l (mm) | h (mm) | Expected peaks |
|---|---|---|---|---|---|
| A$_1$ | 41900 | 24.9 | 180 | 167 | 4 |
| B$_1$ | 63000 | 24.9 | 180 | 165 | 4 |
| C$_1$ | 111000 | 24.9 | 231 | 219 | 4 |

TABLE 2-continued

Conditions for Each Physical Experiment Test
[The Effective L and H (With Respect To The Spacing Bars) are
Listed. The Expected Peaks Refer to the Number of Maximum
Force Peaks that Occur for a Test With Six Beams.]

| Set | EI (N mm$^2$) | s (mm) | l (mm) | h (mm) | Expected peaks |
|---|---|---|---|---|---|
| $D_1$ | 154000 | 24.9 | 205 | 191 | 4 |
| $E_1$ | 335000 | 24.9 | 231 | 219 | 4 |
| $A_2$ | 41900 | 49.9 | 180 | 167 | 5 |
| $B_2$ | 63000 | 49.9 | 180 | 165 | 5 |
| $C_2$ | 111000 | 49.9 | 231 | 219 | 5 |
| $D_2$ | 154000 | 49.9 | 205 | 191 | 5 |
| $E_2$ | 335000 | 49.9 | 231 | 224 | 5 |
| $A_3$ | 41900 | 19.1 | 186 | 175 | 3 |
| $B_3$ | 63000 | 19.1 | 186 | 175 | 3 |
| $C_3$ | 111000 | 19.1 | 237 | 225 | 3 |
| $D_3$ | 154000 | 19.1 | 211 | 198 | 3 |
| $E_3$ | 335000 | 19.1 | 237 | 225 | 3 |

For each test condition, EI was estimated from the Interacting Model using a Python script. The input parameters to the script were the peak force ($F_{peak}$) from the experimental tests, beam to beam spacing (s), beam length (l), and height of the force bar (h). The load cell utilized in the experimental setup only measured the horizontal component of the force exerted on the force bar. The total force exerted on the force bar was estimated utilizing the measured horizontal force component and the beam end angle, $\theta_o$. Each experimental test also experienced several peak forces due to sequential engagement and disengagement of the beams with the force bar, as described with reference to FIG. 7. The peak force ($F_{peak}$) used to estimate EI was calculated by averaging the first m number of expected peak forces (see Table 2) from each test according to Eq. (42).

The Interacting Model was further investigated using a parametric finite element model (FEM) of multiple interacting cantilever beams. The FEM was validated against physical experimental data with one, two, three, and six beams, as respectively shown in FIGS. 17A-17D. The 2-dimensional model was developed in Abaqus/CAE 2019. The metal beams were modeled as 2-noded linear beam elements, and the loading plate was modeled as a discrete rigid. All contact was modeled as frictionless. Material and contact damping was used to aid in force-displacement stability and was confirmed to have a negligible effect as compared to the internal potential energy of the beams. The model was analyzed as a dynamic simulation in Abaqus/Explicit 2019, capturing full contact and non-linear effects.

Once the FEM was validated, it was used to assess the accuracy of the closed-form solution. As a first step in this process and to create preliminary insight into the closed-form solution's predictivity, an in-depth analysis of its force-displacement response was examined for a single case. In particular, the case of six beams of EI=63000 N mm$^2$, s=24.9 mm, and l=180 mm being deflected by a force bar driven at h=165 mm was analyzed via physical experimentation, via a FEM simulation, and with the closed-form solution. The force-displacement response from each method was then compared.

After the preliminary, single case, analysis described in the preceding paragraph, a more comprehensive data triangulation experiment was conducted. In particular, FEMs of eight identical, inline beams (l=180 mm) at 10 different s values undergoing deflection due to 10 unique h values were simulated. Thus, a total of 100 FEMs were produced (10 s values×10 h values=100). For all beams and simulations, EI was held constant at 63000 N mm$^2$. A summary of the input parameters for the models is provided in Table 3. Note that the amount of deflection depends on the ratio of h to l.

TABLE 3

Parameters across the 100 FEM Simulations (10 S × 10 Maximum
Deflections). Each Simulation Includes Eight Identical, Inline
Beams of L = 180 Mm And EI = 63000 N Mm$^2$

| s (mm) | h (mm) | h/l | Max $\Theta$ (°) |
|---|---|---|---|
| 2.00 | 89.81 | 0.50 | 67.2 |
| 6.22 | 97.36 | 0.54 | 64.0 |
| 10.44 | 104.91 | 0.58 | 60.4 |
| 14.67 | 112.46 | 0.63 | 56.8 |
| 18.89 | 120.01 | 0.67 | 53.2 |
| 23.11 | 127.56 | 0.71 | 49.4 |
| 27.33 | 135.11 | 0.75 | 45.4 |
| 31.56 | 142.66 | 0.79 | 41.1 |
| 35.78 | 150.21 | 0.84 | 36.5 |
| 40.00 | 157.76 | 0.88 | 31.3 |

The 100 force response plots (10s values×10h values) and the corresponding system dimensions (s, l, and h) were then given to another researcher. The Interacting Model was then utilized to back-solve for all 100 EI values using two methods. Both methods inputted the dimensions but used different sources for the input force. The closed-form solution requires $F_{peak}$ or the force just before the beam is no longer in contact with the force bar. $F_{peak}$ can be determined by either analyzing the total force or x-component force, but using the x-component force requires an additional step involving further assumptions. The observed $F_{x\,peak}$ uses the corrected $\phi$ to estimate $F_{peak}$. Since $\phi$ is an estimation, the $F_{peak}$ calculated from $F_{x\,peak}$ may not fully align with the direct $F_{peak}$. Therefore, both $F_{peak}$ values and the corresponding system dimensions (s, l, and h) were inputted into the closed-form solution to examine the difference in results. Unlike the physical experiment, $F_{peak}$ and $F_{x\,peak}$ were obtained from the first observed force peak as the following peaks should be identical with identical FEM beams. The backsolved EI values from both methods were then compared to the actual EI values used in the FEMs.

Results of the foregoing analyses are presented in three sections. A comparison between the physical experiments and the Interacting Model is provided first. A single case examination comparing the Interacting Model force-displacement response to a corresponding physical experiment and FEM simulation is then provided. Lastly, the Interacting Model is assessed using 100 FEMs with various input parameters.

Figure 18:
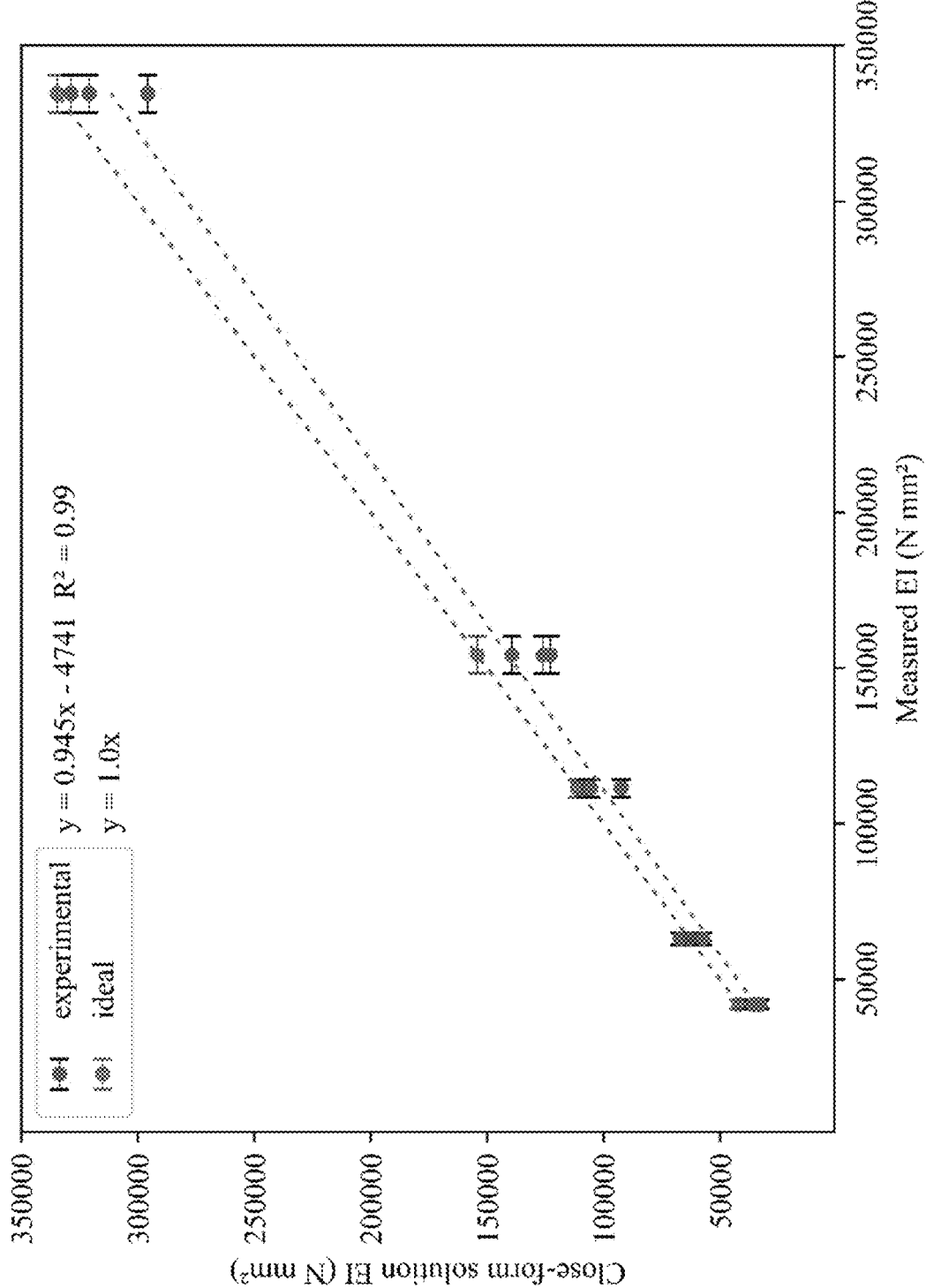
FIG. 18 is a graph comparing measured flexural resistance to flexural resistance determined using a data model that can be utilized with embodiments of a disclosed crop lodging resistance measurement apparatus.

From the physical experiments, the predicted EI values computed from the Interacting Model were plotted against the corresponding, measured EI, as shown in FIG. 18. Fitting a linear regression (blue line) to the plot provides $R^2$=0.99 and a slope of 0.945, indicating the Interacting Model generally underpredicted EI. The "ideal" line describing the theoretical case in which all predicted EI were equivalent to all measured EI, has been shown in red. Assuming the mean, measured EI to be the true value, the closed-form solution yielded a mean absolute percent error of 10.92% with a standard deviation of 6.98%.

Figure 19:
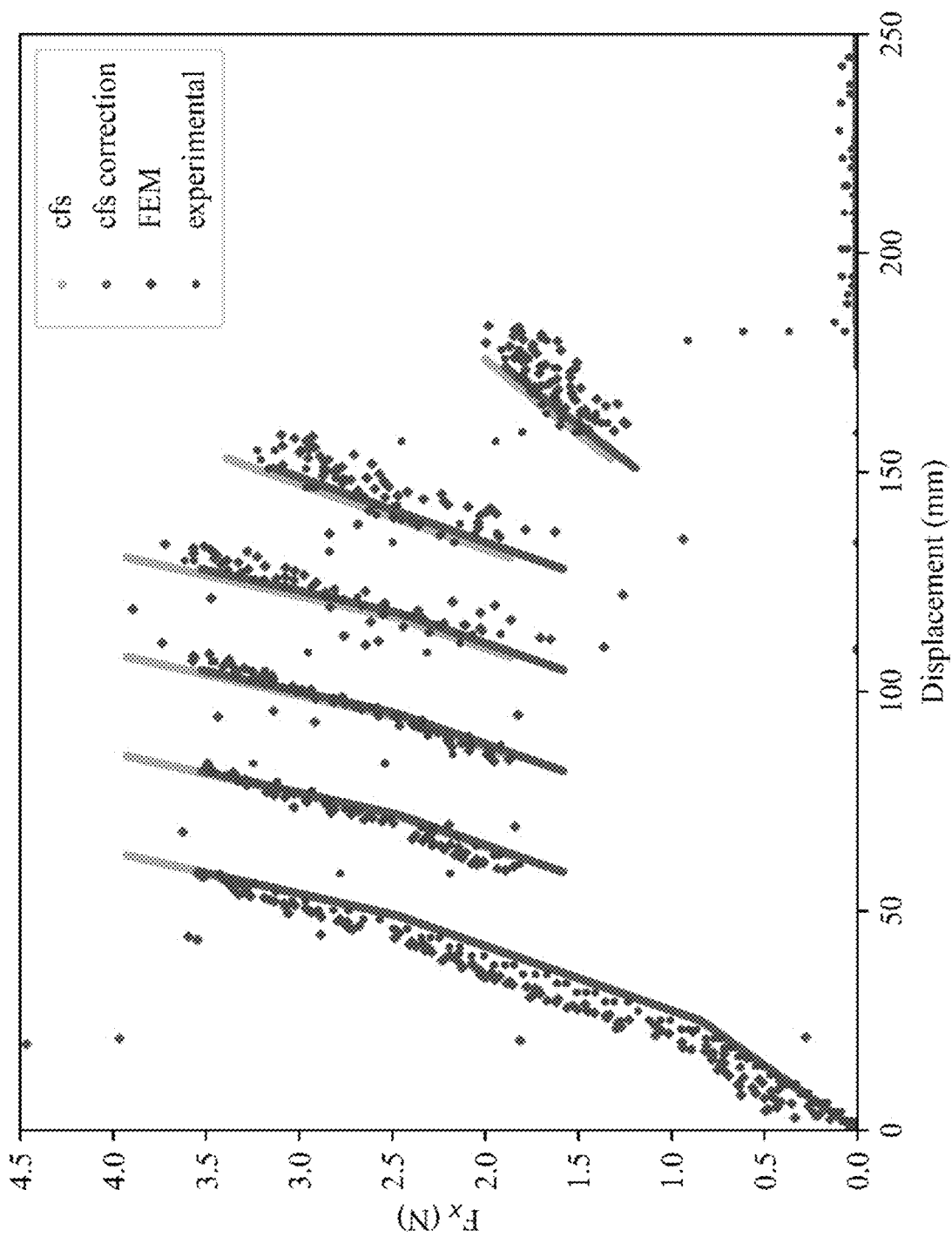
FIG. 19 is an exemplary six-beam horizontal force response ($F_x$) graph plotted against the x displacement for the six beams.

Turning to FIG. 19, the six-beam horizontal force response ($F_x$) was plotted against the x displacement for six beams under identical conditions (EI=63000 N mm$^2$, l=180 mm, h=166 mm, s=24.9 mm) from the physical experiment (blue), FEM simulation (green), and two closed-form solution predictions (orange—closed-form solution, and red— closed-form solution with correction factor). The force response between the physical experiment, FEM, and closed-form solution prediction are in fairly good agreement, but the closed-form solution overpredicts the force peaks and displacement at maximum deflection. Recall that the Interacting Model closed form solution utilizes straight, rigid segments from the PRBM, which were not designed to capture the physics of a beam deflecting under a force bar. The kinematics in which the end of the beam slips under the force bar may be oversimplified, resulting in the Interacting Model's overpredictions. Stemming from this, a correction factor of 1.0085 was multiplied to h, giving h=166.4 mm and the force response plotted in red in FIG. 19. This correction factor yields better agreement with the displacement and force peaks. The statistical comparison between all four plots is presented in Tables 4-6. The maximum $F_x$ was determined from the mean of the first, four peaks while the max displacement and linear slope were determined from the first peak.

TABLE 4

Max $F_x$ comparison. Six beam system's max $F_x$ statistical comparison between the experimental results, FEM simulation, closed-form solution (cfs), and correction factor closed-form solution (cfs cor.). The max $F_x$ was determined from the mean of the first, four peaks.

| Plot | Max $F_x$ (N) | Per. Diff. vs Exp. (%) | Per. Diff. vs FEM (%) |
|---|---|---|---|
| exp. | 3.49 | 0.00% | 1.30% |
| FEM | 3.58 | 1.30% | 0.00% |
| cfs | 3.93 | 5.85% | 4.56% |
| cfs cor. | 3.53 | 0.47% | 0.83% |

TABLE 5

Displacement comparison. Six-beam system's displacement at the first $F_{x\ peak}$ statistical comparison between the experimental results, FEM simulation, closed-form solution (cfs), and correction factor closed-form solution (cfs cor.). The beam's contact point with the force bar is estimated to be at 0 mm.

| Plot | Displacement at $F_{x\ peak}$ | Per. Diff. vs Exp. (%) | Per. Diff. vs FEM (%) |
|---|---|---|---|
| exp. | 58.53 | 0.00% | 0.06% |
| FEM | 58.46 | 0.06% | 0.00% |
| cfs | 62.64 | 3.39% | 3.46% |
| cfs cor. | 58.86 | 0.28% | 0.34% |

TABLE 6

Linear slope comparison. Six-beam system's linear slope statistical comparison between the experimental results, FEM simulation, closed-form solution (cfs), and correction factor closed-form solution (cfs cor.). The linear slope was calculated from the contact point to the first $F_{x\ peak}$.

| Plot | Linear Slope (N/mm) | Per. Diff. vs Exp. (%) | Per. Diff. vs FEM (%) |
|---|---|---|---|
| exp. | 0.0596 | 0.00% | 1.36% |
| FEM | 0.0613 | 1.36% | 0.00% |
| cfs | 0.0627 | 2.46% | 1.10% |
| cfs cor. | 0.0599 | 0.19% | 1.17% |

Figure 20:
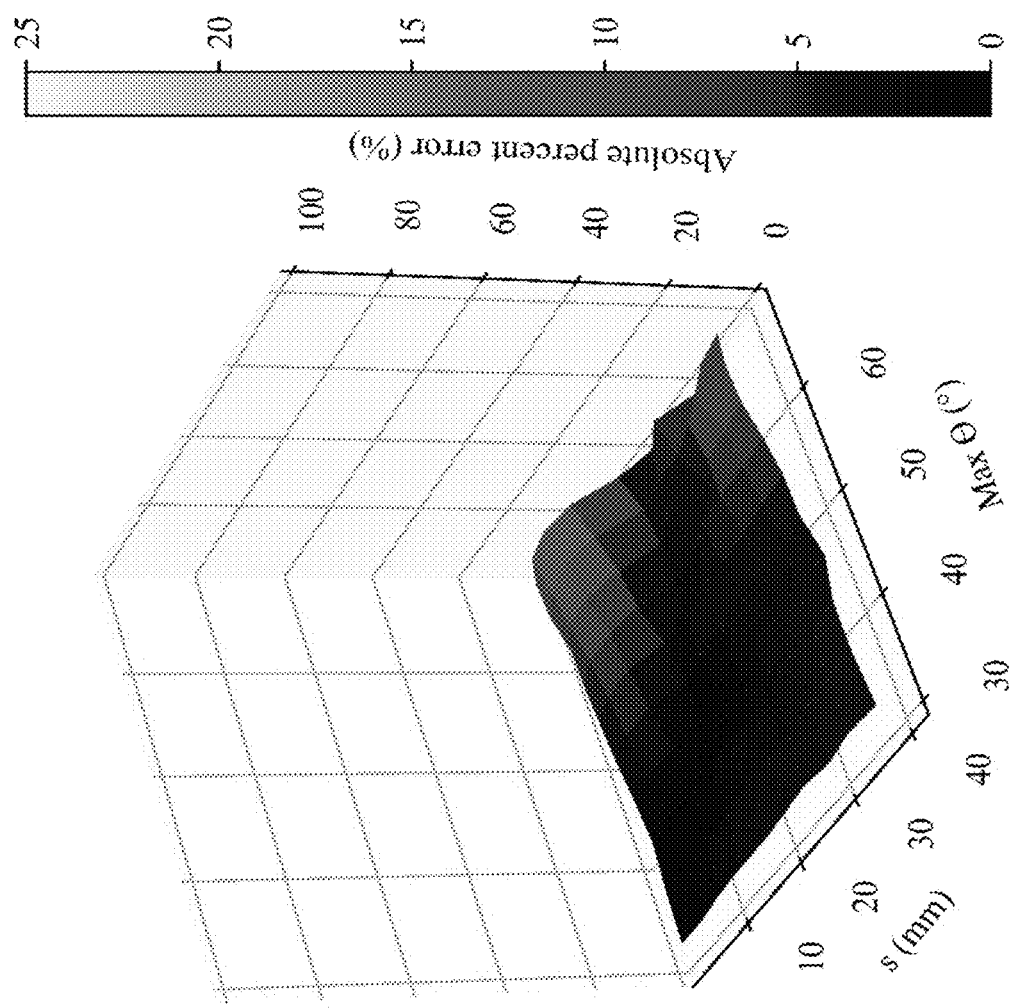
FIG. 20 is a three-dimensional plot showing exemplary percent error from various combinations of spacing and maximum deflection.

When compared to the EI values from the 100 multiple beam FEM simulations, the closed-form solution EI predictions from $F_{peak}$ yielded a mean percent error of 4.23% with a standard deviation of 5.16%. The percent error from each combination of spacing and maximum deflection is shown in FIG. 20. Recall that the maximum deflection is directly related to the ratio of h to l. An additional contour plot with the "non-absolute" percent error color-coded is provided in FIG. 21, which better highlights when the closed-form solution underpredicts or overpredicts.

Figure 21:
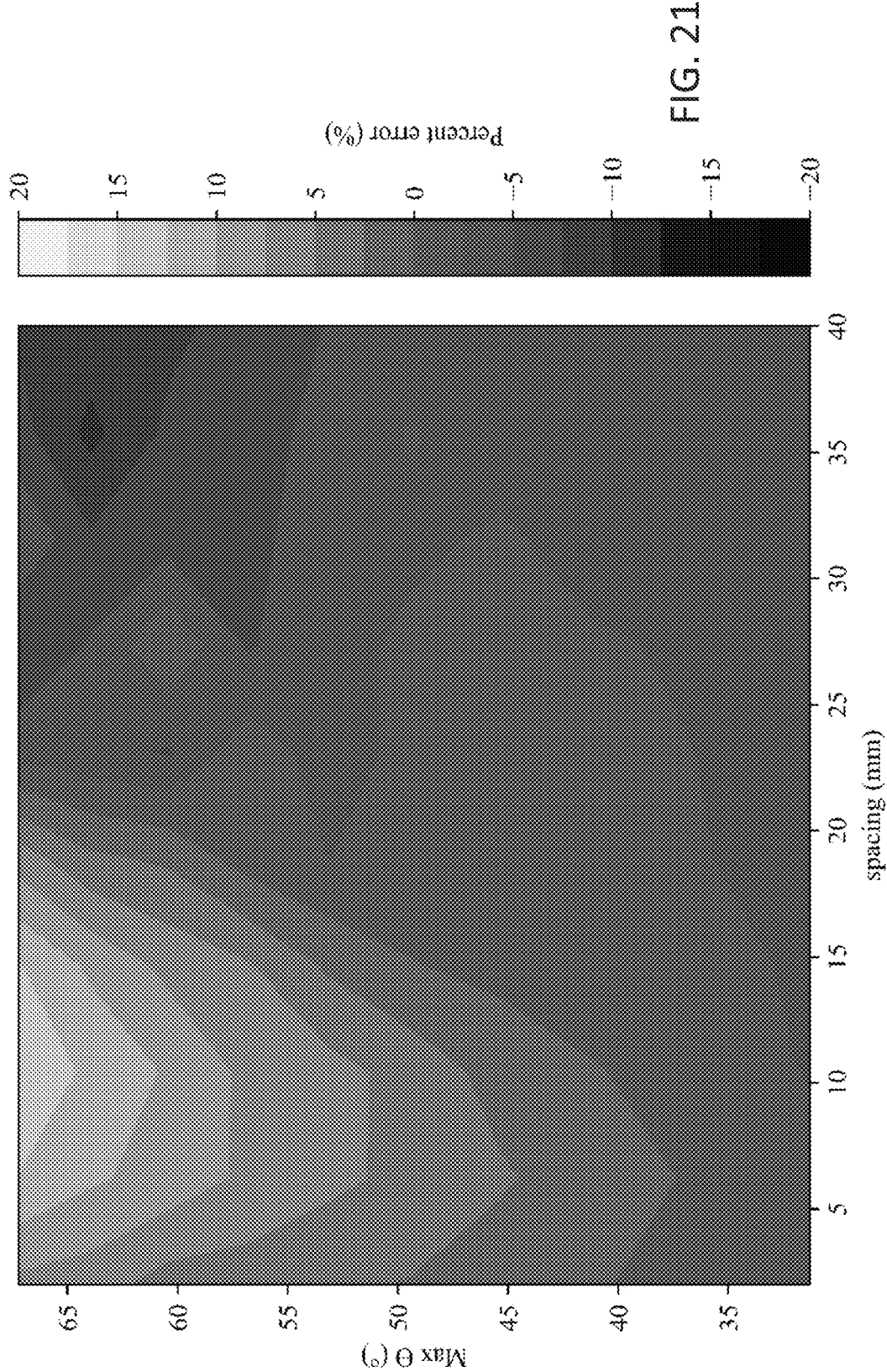
FIG. 21 is a contour plot illustrating when models may underpredict or overpredict based on experimental validation data.

FIG. 21 suggests that the closed-form solution tends to yield increased error at greater deflections (i.e., lower force bar heights). More specifically, at larger deflections, the closed-form solution tends to overpredict EI when paired with smaller spacings, whereas underpredictions are observed when paired with larger spacings. At deflections less than 50°, the mean percent error is 2.41% (SD.=1.67%). Note that the FEM force-displacement plots had increased noise for the larger deflections, particularly at s=2.0 mm and s=6.22 mm. This may have contributed to some error as $F_{peak}$ was obtained from those plots.

The closed-form solution EI predictions from $F_{x\ peak}$ provided similar results as shown in FIGS. 20 and 21, but with increased error. The mean percent error was 34.46% with a standard deviation of 59.99% using this method. The contour plot showing the "non-absolute" percent error across all spacing and deflection combinations is provided in FIG. 16. At deflections greater than 50°, the closed-form solution accuracy begins to decrease for most spacings when inputting $F_{x\ peak}$, as shown in FIG. 16.

Figure 22:
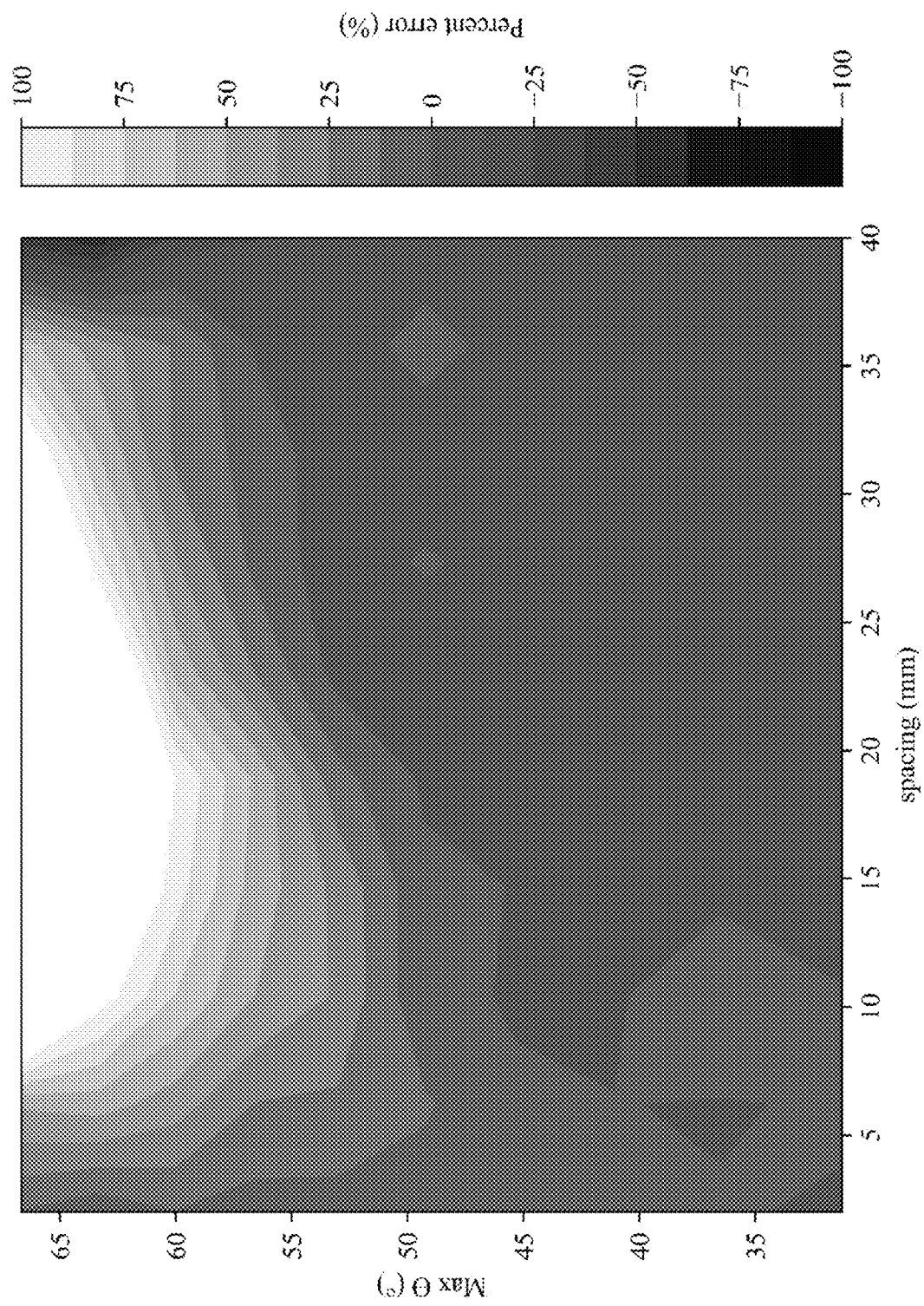
FIG. 22 is a contour plot related to the closed-form solution using the PRBM single beam's end angle to correct for $\phi$.

Note that in FIG. 22, the closed-form solution uses the PRBM single beam's end angle to correct for ϕ. Without correcting ϕ from the PRBM beam end angle ($\theta_o$), underpredictions in $F_{peak}$ and EI are typically observed, giving a mean percent error in EI of 18.24% with a standard deviation of 14.66%. However, at deflections less than 50°, this method provides a mean percent error in EI of 12.11% (SD.=4.48%), whereas, correcting for ϕ provides a mean percent error of 2.99% (SD.=3.50%).

It will be appreciated that physical experiments may contain sources of error and uncertainty. Potential sources of experimental uncertainty in this study include friction and measurement errors. For example, all beams were assumed to be perfectly smooth, prismatic, and identical. In addition, the force bar height h was assumed to be perfectly constant during the experiment. These factors were closely controlled and monitored but small sources of error likely still existed in the experiment. One advantage of FEMs is that experimental uncertainties involving geometric measurement tolerances can be eliminated. Furthermore, FEMs enable all input parameters to be carefully controlled and varied to produce extensive data sets that would not be economically feasible via physical experimentation. However, FEMs are subject to some noise even with a high sampling rate or small step size. Fortunately, it is typically easy to identify and disregard noisy data points that occur due to dynamic effects. For these reasons, both physical experiments and FEMs were used to validate the closed-form solution.

When inputting $F_{x\ peak}$, the closed-form solution's accuracy at deflections greater than 50° was significantly decreased, as previously shown in FIG. 22. Fundamental assumptions that the closed-form solution is built upon may become less valid in these circumstances. For example, point loads are used throughout the closed-form solution; yet, as the deflections increase, the contact surface between beams increases. Additionally, the closed-form solution uses the PRBM single beam's end angle $\theta_o$ to correct for ϕ, but this may underpredict $\phi$ with multiple beams interacting and influencing $\theta_o$. As a result, an erroneous lower value of $\phi$ can cause a large overprediction in $F_{peak}$ when converted from $F_{x\ peak}$ ($F=F_x/\sin(\phi)$). Without correcting $\phi$, underpredictions in $F_{peak}$ conversions occur, providing less error at larger deflections but increased error at smaller deflections. Neither $\phi$ method is comprehensive for multiple beams.

Figure 23:
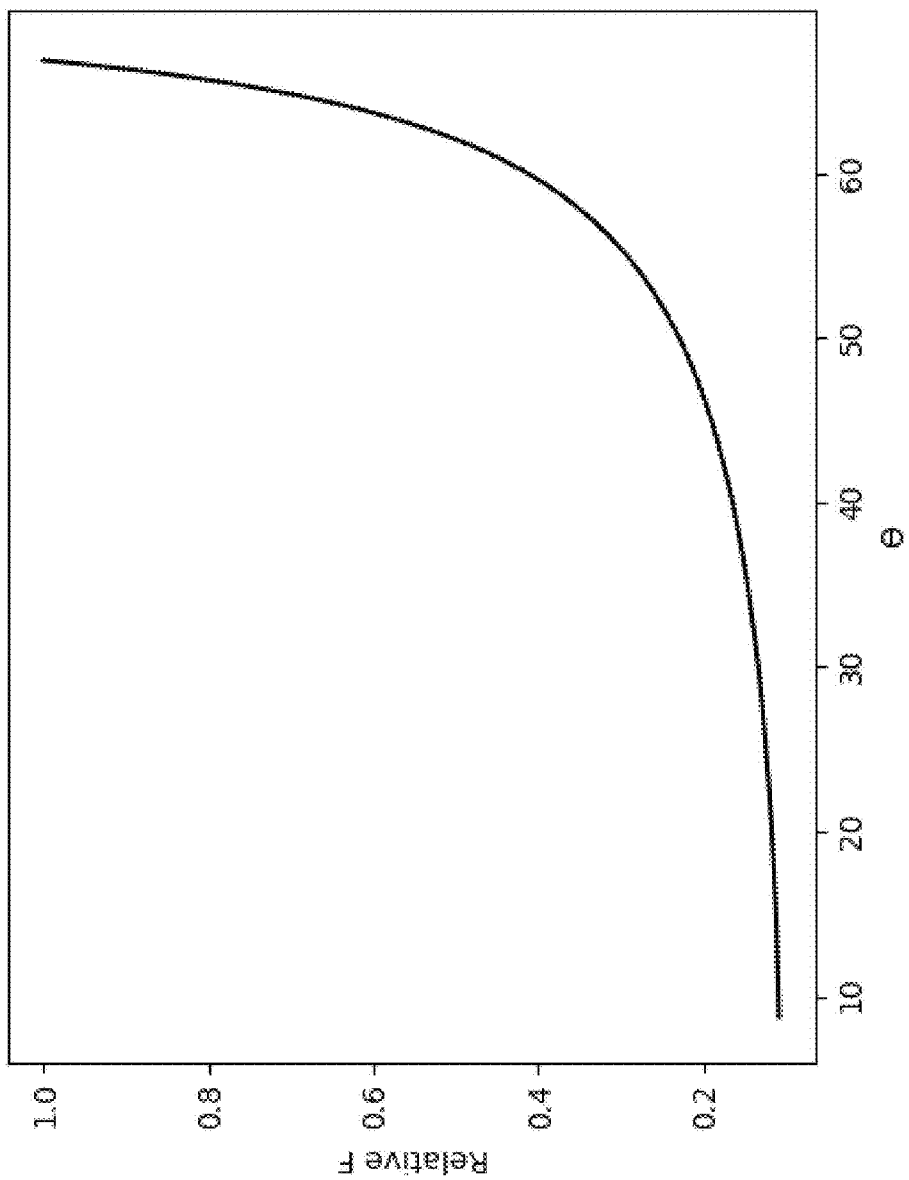
FIG. 23 is a graph for $F_{peak}$ (in relation to its own maximum value) as a function of $\Theta$.
Figure 24:
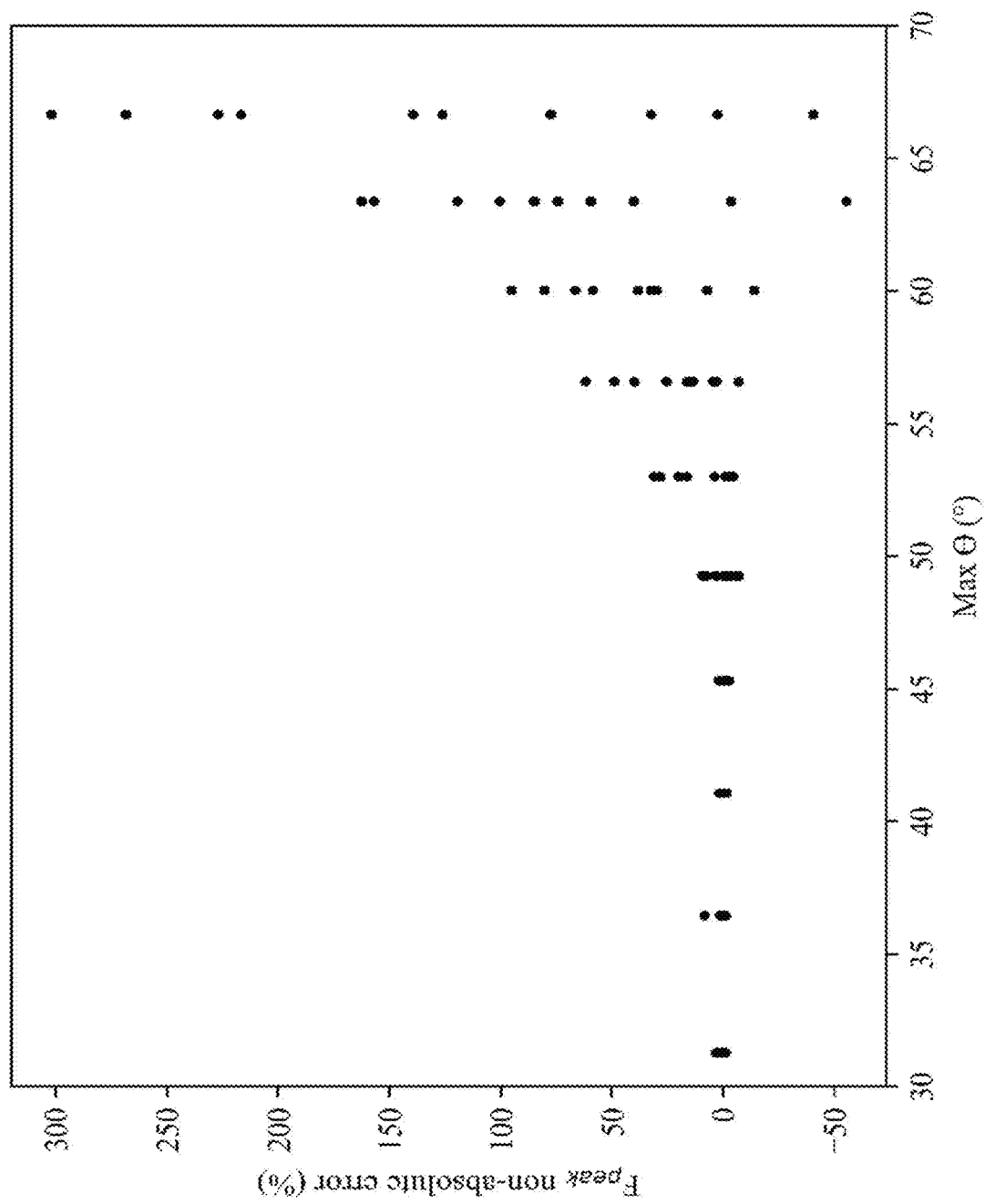
FIGS. 24 and 25 are graphs providing data related to non-absolute percent error in the closed-form solution's converted $F_{peak}$ from $F_{x\,peak}$ (compared to the observed $F_{peak}$ from the FEM force-displacement plots) as a function of maximum deflection and data of non-absolute percent error in the closed-form solution EI prediction with $F_{peak}$ inputted as a function of maximum deflection.
Figure 25:
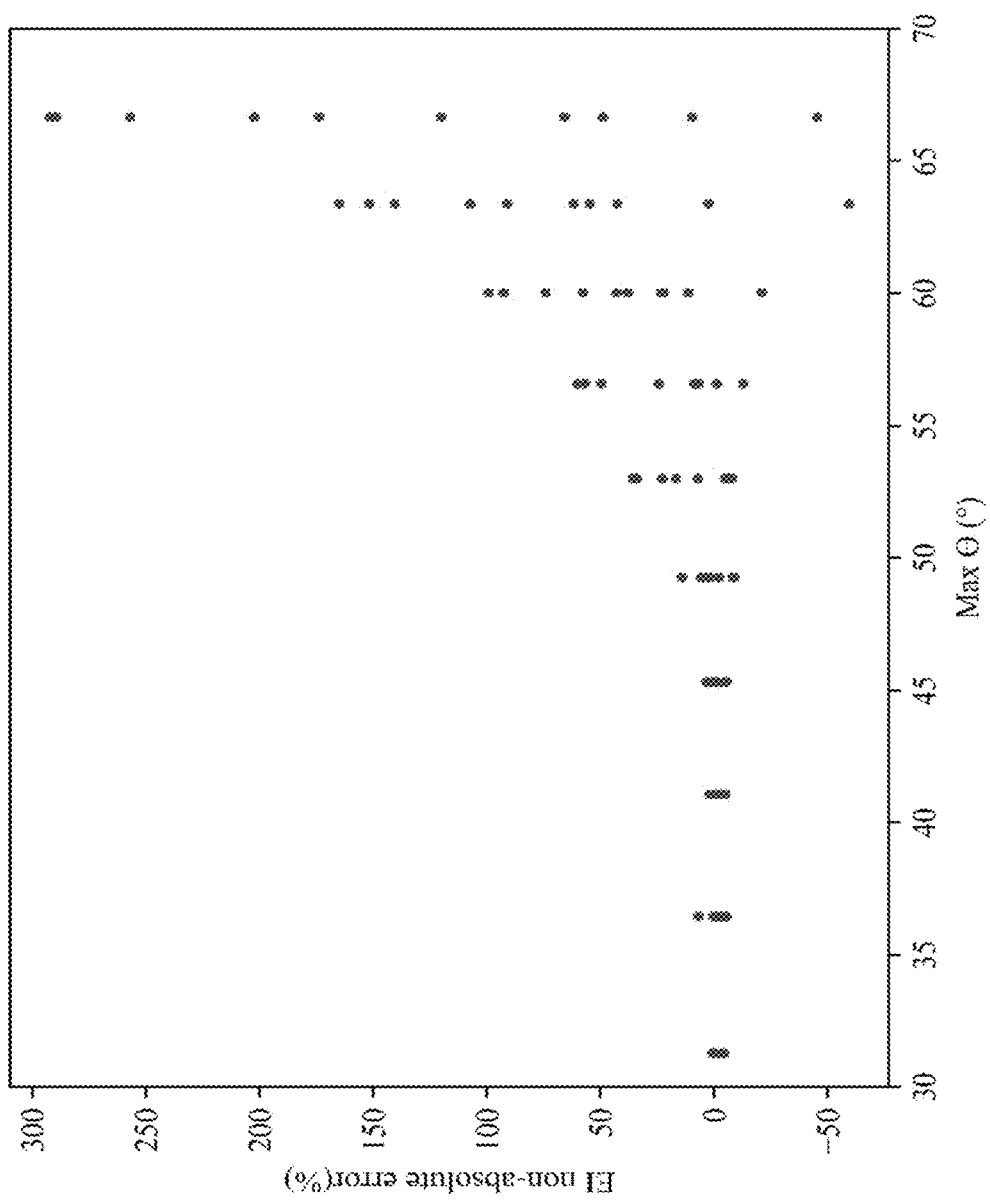

While there is approximately the same amount of noise in the FEM $F_x$ plots as the F plots, this closed-form solution $F_{x\ peak}$ method amplifies error during the determination of $F_{peak}$. Error amplification also increases as deflection increases when inputting $F_{x\ peak}$ as $\phi$ is directly related to $\Theta$. To illustrate this, consider $F_{peak}$ values being converted from $F_{x\ peak}$ over several deflections while holding the inputted $F_{x\ peak}$ constant. FIG. 23 displays the resulting relative $F_{peak}$ (in relation to its own maximum value) as a function of $\Theta$. Notice that at greater deflections, the slope significantly increases. Therefore, erroneous measurements of $F_{x\ peak}$ at larger deflections have a greater impact on the converted $F_{peak}$ and EI predictions. In the FEM experiment, error and variation in the converted $F_{peak}$ and EI prediction did increase with deflection following a similar curve to that shown in FIG. 23. This is shown in FIGS. 24 and 25.

Figure 26:
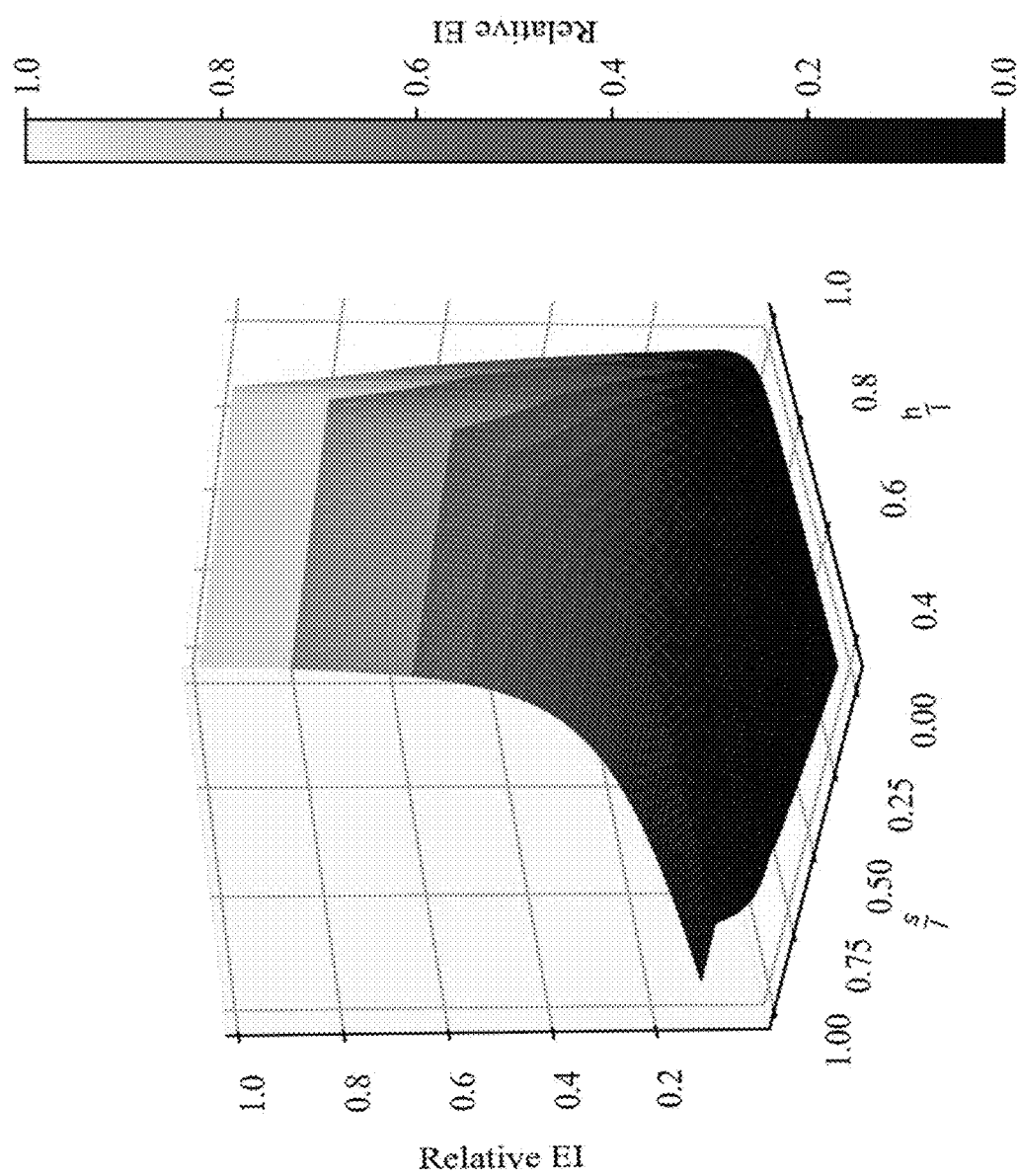
FIG. 26 is a three-dimensional plot of data related to relative EI ($EI/EI_{max}$) across combinations of s and h (normalized with respect to l) with $F_{peak}$ held constant.

A sensitivity analysis of the closed-form solution was conducted to highlight its most effective use. Using a Python script, the closed-form solution was utilized to predict EI for all combinations of h from 0.5l to 0.99l and s from 0.005l to 0.99l while holding the inputted l and $F_{peak}$ constant. As expected, EI increases as both h and s increase. The relative EI with respect to its own maximum across all combinations (EI/EI$_{max}$) is shown in FIG. 26. The numerical derivative of this relative EI was then assessed, first with respect to h/l and then s/l, as shown in the contour plots respectively in FIGS. 27 and 28.

Figure 27:
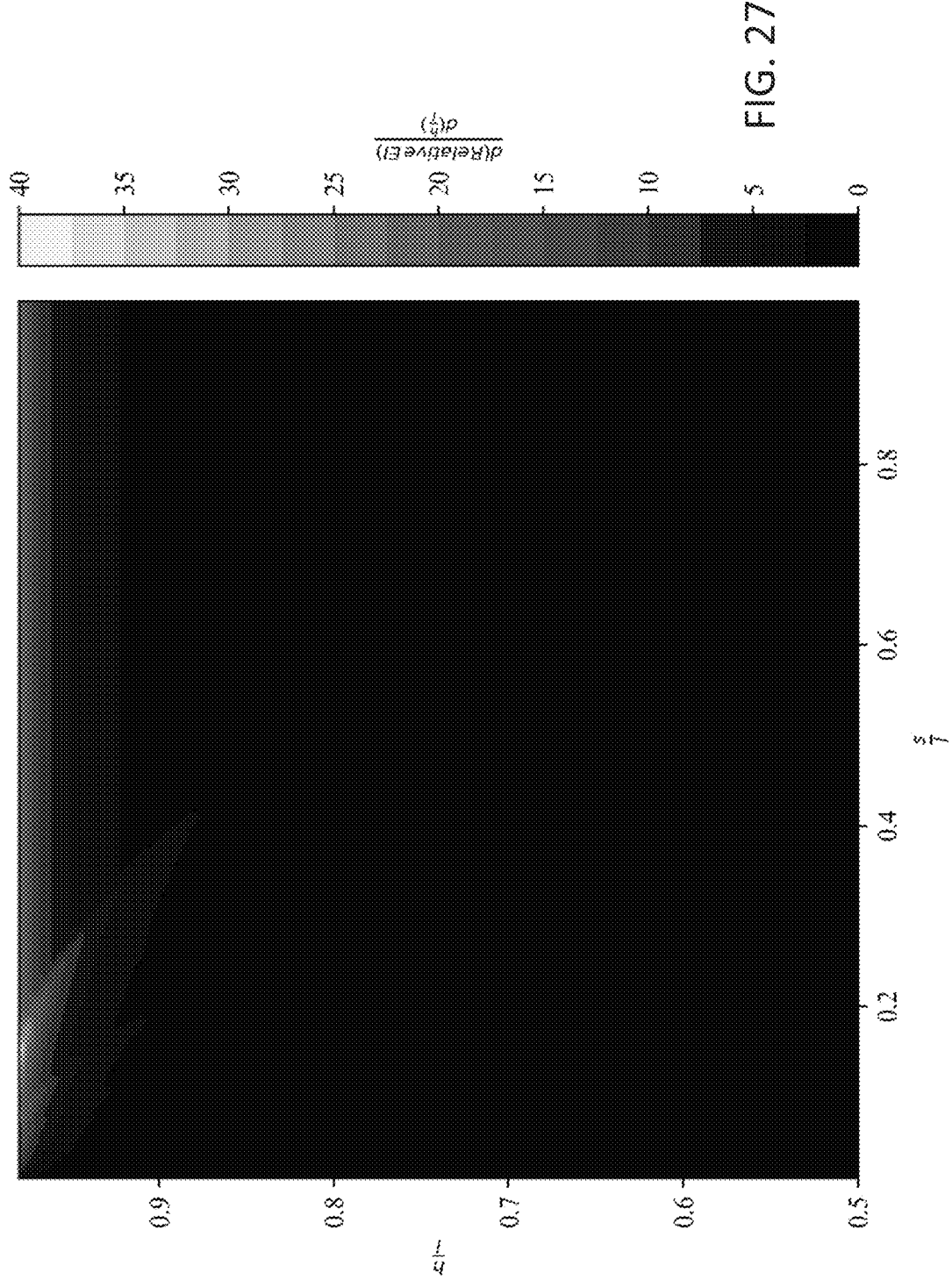
FIGS. 27 and 28 are contour plots of data related to the numerical derivative of the relative EI with respect to h/l for combinations of h/l and s/l and exemplary data showing the numerical derivative of the relative EI with respect to s/l for combinations of s/l and h/l.
Figure 28:
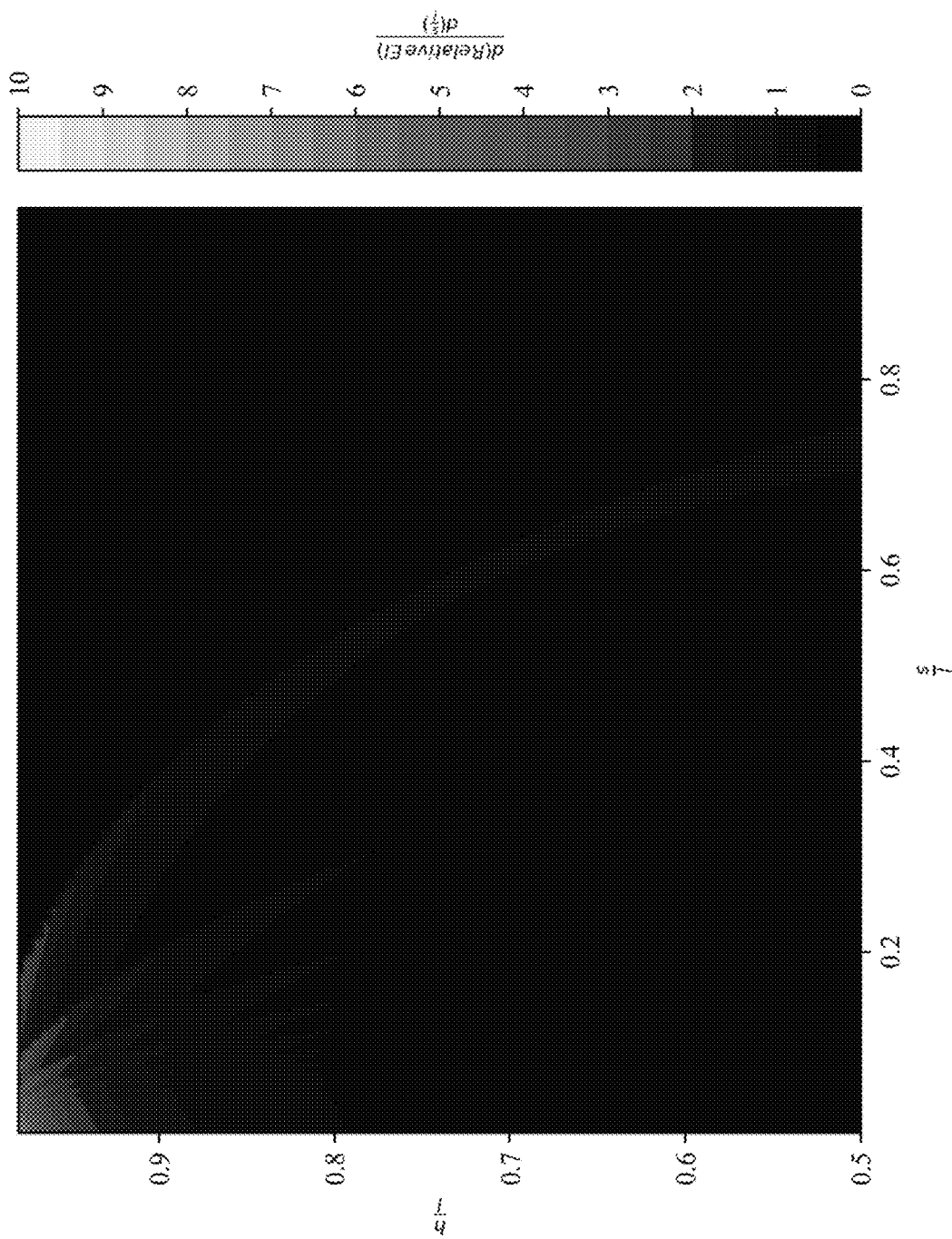

FIG. 27 illustrates that the derivative of the relative EI is small for all spacings unless h/l is greater than about 0.9. Thus, from a theoretical perspective, at higher h/l ratios, errors in h and l measurements can result in greater error in EI predictions, than if lower h/l ratios were used. On the other hand, FEM experimental results showed greater error with greater deflections (low h/l ratios). Recall that the closed-form solution was generally accurate in the FEM experiment with deflections less than 50°, which corresponds to a h/l ratio of approximately 0.7. The most effective range of h/l with minimal sensitivity to errors is then 0.7-0.9.

FIG. 28 again shows sensitivity at high h/l ratios, particularly at smaller s/l ratios. Note that the lighter purple curve running through the middle of the plot is likely due to interactions between beams no longer occurring. By comparing FIGS. 27 and 28, taking note of the difference in scales, it seems that the closed-form solution is less sensitive overall to changes in s/l than to changes in h/l. Further, the effect of $F_{peak}$ is linear as indicated by Eq. (41) and Eq. (18), unless $F_{x\ peak}$.

Figure 29:
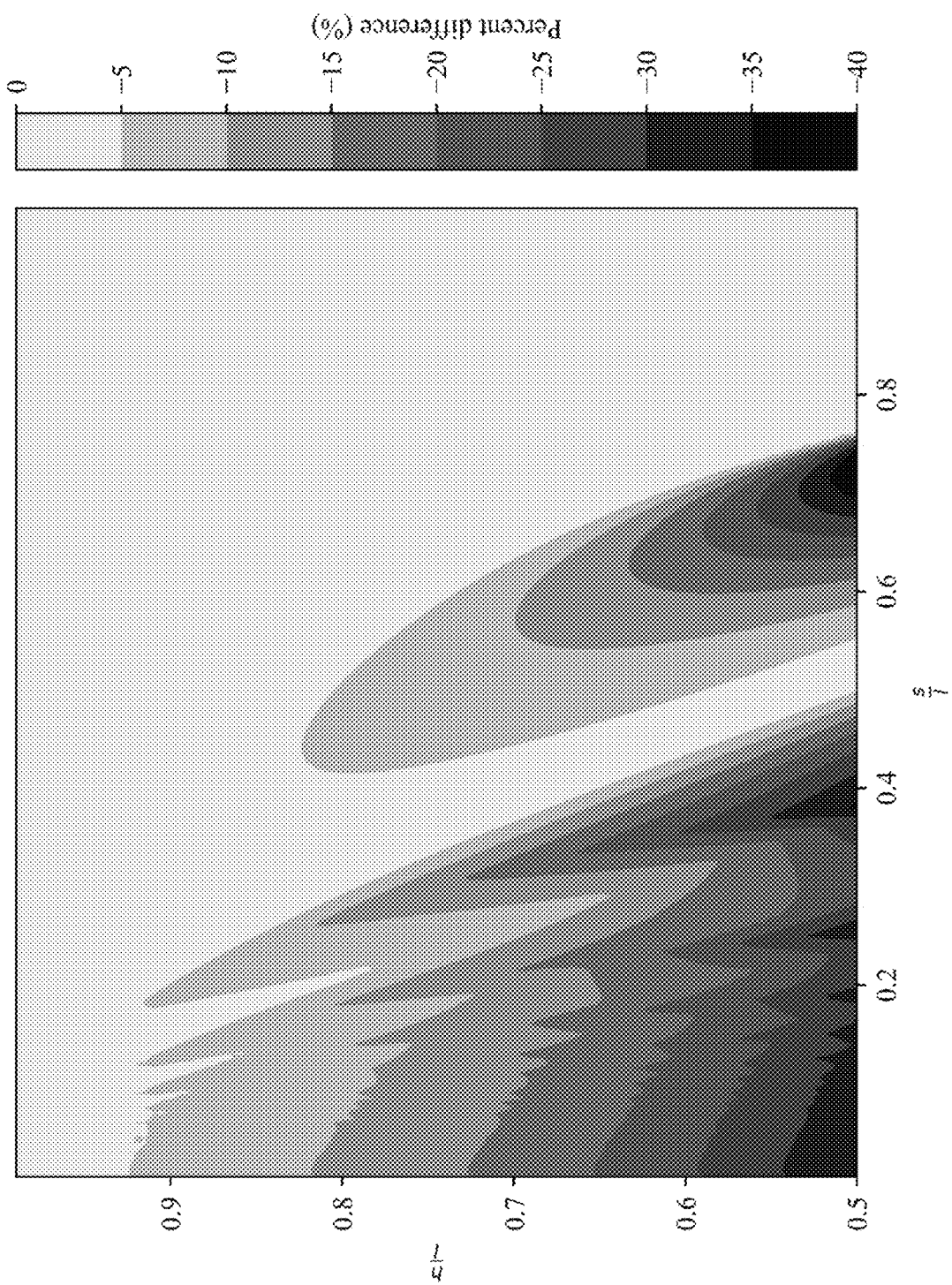
FIG. 29 is a contour plot illustrating data for EI percent difference between the Interacting Model and Non-Interacting Model for various combinations of s and h (normalized with respect to l).

As discussed above, to explore the effect of interactions in multiple beam systems and the closed-form solution, an additional Non-Interacting Multiple Cantilever Beam Model was developed in which interactions were eliminated by assuming no contact for any spacing or deflection. The Interacting Model and Non-Interacting Model were then utilized to predict EI values for all combinations of h from 0.5l to 0.99l and s from 0.005l to 0.99l. $F_{peak}$ was held constant for all cases. The percent differences between the two model's EI predictions were then computed. FIG. 29 shows the results with a contour plot, in which negative percent differences correspond to the Interacting Model calculating a lower EI than the Non-Interacting Model.

For all combinations of h/l and s/l, the Interacting Model produces lower EI predictions than the Non-Interacting Model. Generally, the difference is small (less than 5%), but increases as h/l and s decrease. At the non-extremes of system dimensions, the effect of interactions is minimal. In those cases, the simpler Non-Interacting Model is applicable. At lower h/l and s values, more interaction occurs, which has a greater effect on $F_{peak}$ and predictions of EI. Therefore, the Interacting Model is likely to be more accurate in these situations. As in the exemplary results of FIG. 29 in which the Interacting Model tended to overpredict FEM EI values for small h and s values, without accounting for the interactions, the results suggests the overpredictions and error would be greater. Although, at large h and small s values, neglecting the interactions may have potentially decreased error.

Figure 30:
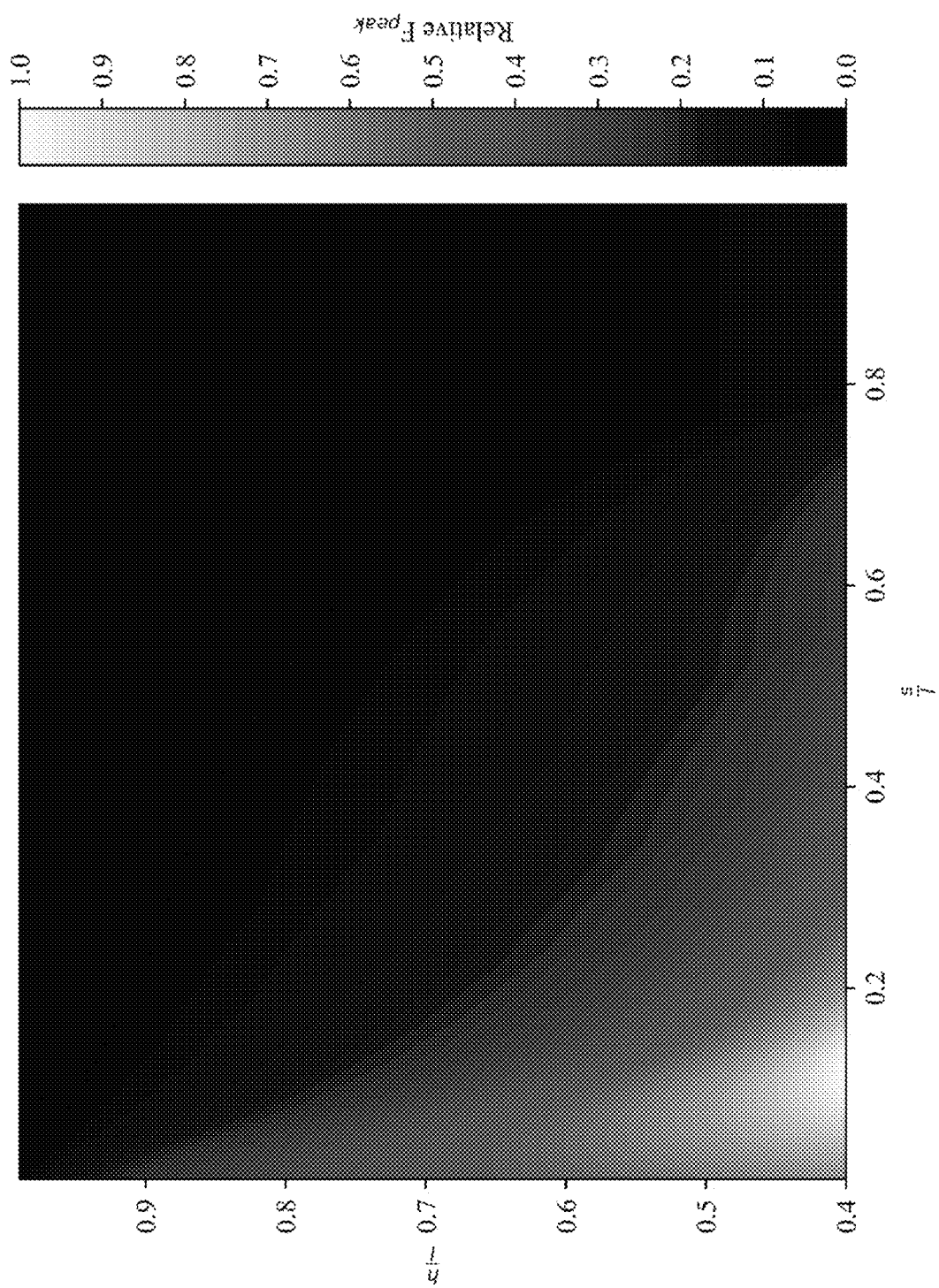
FIG. 30 is a contour plot of data related to relative maximum force ($F_{peak}$) of 10 beams for all combinations of s and h. EI and l held constant.

It will be appreciated that the Interacting Model can also aid in the initial design process of similar synthetic structures, such as brushes, brooms, or even nanotube arrays. For example, the model can provide accurate predictions and highlight the effect of design choices. In many cases, designers may be interested in the system's maximum force response, which the model can predict for any combination of s, l, h, EI, or even the number of beams in a row. For example, given EI, l, and the number of beams (10 in this case), FIG. 30 can be generated.

Preliminary data obtained from an SOCEM apparatus similar to the SOCEM 400 is discussed below. During the Summer of 2019, the SOCEM was used to test over 70 wheat plots at the University of Idaho Arboretum. Data from the SOCEM was then used to compute estimations of EI from each plot. The estimated EI values were then compared to historical lodging percentages. Details and the results are provided below.

Historical wheat lodging percentages from 2016-2019 from six Idaho locations (Bonners Ferry, Nezperce, Genesee, Moscow, Tammany, Tensed) were obtained from variety trials provided in Northern Idaho Small Grain and Grain Legume Research and Extension Program reports, specifically "Variety Trials." N.d. Accessed Dec. 7, 2020 from https://www.uidaho.edu/extension/cereals/north/variety-trials, which is incorporated by reference herein. While 70 plots were tested with the SOCEM, many of the varieties had limited lodging data available from the variety trials so a data selection filtering process was first conducted before comparing results. Many varieties were not planted over more than one year and/or location. As discussed above, without enough data points over multiple years and environments, it is difficult to understand a variety's resistance to lodging due to the numerous confounding environmental factors. For each variety tested by the SOCEM, there was a potential maximum of 24 lodging percentage data points from four years and six locations, but most varieties had fewer data points. To compare then, only varieties with at least 10 data points were evaluated. This provided 31 tested plots (with some repeated varieties) in which EI estimations were made. For each variety, the mean percent lodging from all its available data points was computed.

A linear regression analysis between the SOCEM measurements and historical lodging percentage would typically be conducted; however, this would provide limited insight as the plots tested were elite, commercial hybrids. Among such varieties, there are rare lodging occurrences, despite varying stem phenotypes. As an alternative analysis, the varieties were classified into either a lodging prone or lodging resistant group, in which the division was made at 7% lodging. Only three plots from the variety named "UI Silver" were placed in the lodging prone group, with a mean percent lodging of 25%. The lodging resistant group possessed a lodging percentage mean of 1.23% and a median of 0.15%.

Figure 31:
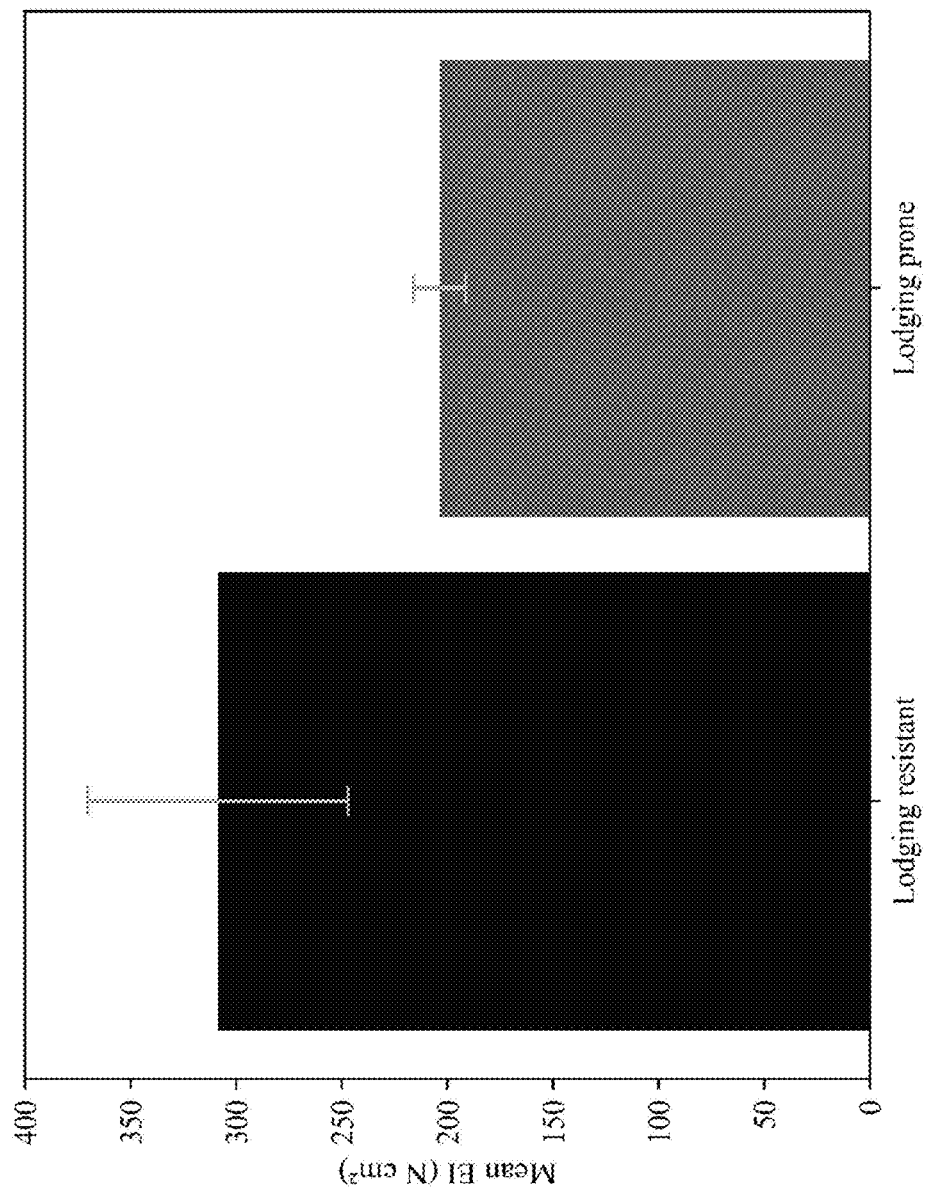
FIG. 31 is a bar graph of data related to mean estimated EI of lodging resistant varieties (<7% mean lodging) compared to a lodging prone variety (25% mean lodging).

The estimated mean EI values (averaged from the Interacting and Non-Interacting Models) were compared between the two groups, as shown in FIG. 31. Error bars represent the standard deviation. The lodging resistant plots had a mean, estimated EI of about 310 N cm$^2$ (SD.=62 N cm$^2$), whereas the lodging prone plots possessed a mean, estimated EI of about 200 N cm$^2$ (SD.=12 N cm$^2$). Both estimations are reasonable values as 270 N cm$^2$ is typically reported in the literature, such as Hirai, Yasumaru, Eiji Inoue, Masami Matsui, Ken Mori, and Koichi Hashiguchi. 2003. "Reaction Force of a Wheat Stalk Undergoing Forced Displacement."*Journal of the Japanese Society of Agricultural Machinery* 65 (2): 47-55, which is incorporated by reference herein. An independent t-test was conducted with $\alpha=0.01$ and the assumption of unequal variance. The t-test indicated the mean estimated EI values between the lodging resistant and lodging prone groups are significantly different with a p value<0.001.

It will be appreciated that the foregoing validation experiments and data are merely exemplary and do not limit the scope of the apparatus and methods disclosed herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An apparatus configured to evaluate crop lodging resistance, comprising:
    a body;
    a force bar coupled to the body via a height adjustment mechanism, the height adjustment mechanism configured to enable adjustment of a force bar height relative to a ground surface, the force bar configured to be moved through and contacted by a plot of stems;
    a force sensor coupled to the force bar and configured to detect a force acting on the force bar; and
    a processor in communication with the force sensor and configured to receive force signals therefrom, the force signals indicative of forces acting on the force bar, whereby force signals data is used to analyze flexural stiffness of the plot of stems.

2. The apparatus of claim 1, further comprising a displacement sensor in communication with the processor apparatus, the displacement sensor configured to detect a distance the apparatus travels during detection of the force signals for the plot of stems.

3. The apparatus of claim 2, further comprising a movement mechanism in communication with the displacement sensor to move the force bar through the plot of stems.

4. The apparatus of claim 3, comprising a manually operated movement mechanism configured to enable a user to move the force bar through the plot of stems.

5. The apparatus of claim 3, comprising an automated movement mechanism configured to move the force bar through the plot of stems.

6. The apparatus of claim 2 associated with a vehicle to move the force bar, and wherein the displacement sensor is configured to detect vehicle movement.

7. The apparatus of claim 1, further comprising one or more additional sensors in communication with the processor apparatus, the one or more additional sensors comprising one or more height sensors associated with the force bar and configured to detect or set the height of the force bar relative to the ground surface, a camera, an optical sensor, a LiDAR sensor, a photogate sensor, an ultrasonic sensor, a temperature sensor, a humidity sensor, a gyroscope, an accelerometer, and any and all combinations thereof.

8. The apparatus of claim 7, wherein the one or more additional sensors comprise at least one of the camera, the optical sensor, the LiDAR sensor, or the photogate sensor to detect an estimated stem height for the plot of stems, whereby data related to the estimated stem height is used to estimate flexural stiffness of the plot of stems.

9. The apparatus of claim 7, wherein the one or more additional sensors comprise at least one of the camera, the optical sensor, the LiDAR sensor, or the photogate sensor to detect an estimated stem density for the plot of stems, whereby data related to estimated stem density is used to estimate flexural stiffness of the plot of stems.

10. The apparatus of claim 1, further comprising a data communication interface in communication with the processor apparatus, wherein the processor apparatus comprises non-transitory memory apparatus having a plurality of computer-executable instructions stored therein, the plurality of computer-executable instructions configured to, when executed, cause the processor apparatus to:
    process the force signals to generate data related to the force signals; and
    cause transmission, via the data communication interface, of the data related to the force signals to a computerized user device, the computerized user device configured to calculate an estimation of flexural stiffness of the plot of stems.

11. The apparatus of claim 1, wherein the processor apparatus comprises non-transitory memory apparatus having a plurality of computer-executable instructions stored thereon, the plurality of computer-executable instructions configured to, when executed, cause the processor apparatus to:
    process the force signals to generate data related to the force signals;
    identify data related to one or more parameters, the data related to the one or more parameters comprising data to an estimation of stem density of the plot of stems, data related to an estimation of average stem length of the plot of stems, data related to a height of the force bar during collection of the force signals; and
    inputting the data related to the force signals and the data related to the one or more parameters into one more data models to calculate an estimation of flexural stiffness of the plot of stems.

12. The apparatus of claim 11, wherein the one or more data models comprises a non-interacting model and an interacting model, wherein estimating flexural stiffness of the plot of stems comprises averaging flexural stiffness data from the non-interacting model with flexural stiffness data from the interacting model.

13. The apparatus of claim 11, wherein the plurality of computer-executable instructions is further configured to, when executed, cause the processor apparatus to calculate a plurality of flexural stiffness values, each of the plurality of flexural stiffness values associated with a displacement value related to a position of the apparatus within the plot of stems.

14. The apparatus of claim 1, wherein the body comprises a frame and one or more wheels, the frame comprising a laterally disposed elongate member and a upwardly projecting elongate member, the one or more wheels comprising a first wheel rotatably attached to a first end of the laterally disposed elongate member and a second wheel rotatably attached to a second end of the laterally disposed elongate member, the force bar coupled to the laterally disposed elongate member and disposed in a parallel orientation relative to the laterally disposed elongate member, the upwardly projecting elongate member having a hand grip disposed at a top end thereof, the hand grip configured to enable a user to drive movement of the force bar through the plot of stems.

15. The apparatus of claim 14, wherein the frame further comprises a longitudinally disposed elongate member, a first end of the longitudinally disposed elongate member being coupled to the laterally disposed elongate member in a perpendicular orientation relative thereto, the upwardly projecting elongate member coupled to the longitudinally disposed elongate member, wherein the one or more wheels further comprises a third wheel coupled to a second end of the longitudinally disposed elongate member.

16. A method, comprising operating an apparatus according to claim 1 to evaluate crop lodging resistance.

17. A computerized apparatus configured to evaluate crop lodging resistance, the device comprising a force bar and a force bar sensor, the force bar configured to be moved through a plot of stems, the force bar sensor configured to detect forces acting on the force bar and generate force signal, the computerized apparatus comprising:
one or more processor apparatuses;
a non-transitory memory apparatus in communication with the one or more processor apparatus, the non-transitory memory apparatus having a plurality of computer-executable instructions stored thereon, the plurality of computer-executable instructions configured to, when executed by the processor apparatus, cause the computerized apparatus to generate data related to the force signals; identify data related to one or more parameters, the data related to the one or more parameters comprising data to estimate stem density of the plot of stems, data to estimate average stem length of the plot of stems, and data related to a height of the force bar during collection of the force signals; and input the data related to the force signals and the data related to the one or more parameters into one more data models to calculate an estimation of flexural stiffness of the plot of stems.

18. The computerized apparatus of claim 17, wherein the one or more data models comprise an interacting model.

19. The computerized apparatus of claim 18, wherein the one or more data models further comprises a non-interacting model, wherein estimating flexural stiffness of the plot of stems comprises averaging flexural stiffness data from a non-interacting model with flexural stiffness data from the interacting model.

20. The computerized apparatus of claim 17, wherein the plurality of computer-executable instructions is further configured to, when executed by the processor apparatus, cause the computerized apparatus to calculate a plurality of flexural stiffness values, each of the plurality of flexural stiffness values associated with a displacement value related to a position of the device within the plot of stems.

21. An apparatus for evaluating crop lodging resistance, the apparatus comprising:
a body;
a force bar coupled to the body via a height adjustment mechanism, the height adjustment mechanism configured to enable adjustment of a height of the force bar relative to a ground surface, the force bar configured to be moved through a plot of stems;
a force sensor coupled to the force bar and configured to detect an amount of force acting on the force bar;
a movement mechanism configured to enable the movement of the force bar through the plot of stems;
a displacement sensor in communication with the processor apparatus, the displacement sensor configured to detect displacement of the apparatus evaluation of crop lodging resistance; and
one or more processor apparatus in communication with each of the force sensor and the displacement sensor, the one or more processor apparatus configured to receive force signals from the force sensor and further configured to receive displacement signals from the displacement sensor, the force signals indicative of forces acting on the force bar and the displacement signals indicative of a distance travelled by the apparatus for evaluation of crop lodging resistance during collection of the force signals, data related to the force signals and data related to the displacement signals configured for use in analysis of flexural stiffness of the plot of stems.

* * * * *